United States Patent
Pendergast et al.

(10) Patent No.: US 9,536,564 B2
(45) Date of Patent: Jan. 3, 2017

(54) ROLE-FACILITATED EDITING OPERATIONS

(75) Inventors: Colleen Pendergast, Livermore, CA (US); Giovanni Agnoli, San Mateo, CA (US); Brian Meaney, Livermore, CA (US); Aaron M. Eppolito, Santa Cruz, CA (US); Mike Stern, San Francisco, CA (US); Kelly B. Jacklin, Cupertino, CA (US); Linda L. Dong, San Francisco, CA (US); Adam J. Leonard, Cambridge, MA (US)

(73) Assignee: APPLE INC., Cupertino, CA (US)

(*) Notice: Subject to any disclaimer, the term of this patent is extended or adjusted under 35 U.S.C. 154(b) by 738 days.

(21) Appl. No.: 13/400,542

(22) Filed: Feb. 20, 2012

(65) Prior Publication Data

US 2013/0073963 A1 Mar. 21, 2013

Related U.S. Application Data

(63) Continuation-in-part of application No. 13/250,853, filed on Sep. 30, 2011, now Pat. No. 9,240,215, and (Continued)

(51) Int. Cl.
G06F 3/00 (2006.01)
G11B 27/034 (2006.01)
(Continued)

(52) U.S. Cl.
CPC ........... G11B 27/034 (2013.01); G11B 27/34 (2013.01); *G06F 3/048* (2013.01)

(58) Field of Classification Search
CPC ....... G11B 27/34; G11B 27/034; G11B 27/28; G11B 27/10; G06F 3/0482; G06F 3/04842; G06F 3/048; H04N 19/0023; H04N 5/44543
See application file for complete search history.

(56) References Cited

U.S. PATENT DOCUMENTS 5,521,841 A 5/1996 Arman et al.
5,659,539 A 8/1997 Porter et al.
(Continued)

FOREIGN PATENT DOCUMENTS

WO WO 2007/120694 10/2007
WO WO 2009/026159 2/2009
(Continued)

OTHER PUBLICATIONS

U.S. Appl. No. 13/250,853, filed Sep. 30, 2011, Eppolito, Aaron M., et al.
(Continued)

*Primary Examiner* — Jeffrey A Gaffin
*Assistant Examiner* — Ayesha Huertas Torres
(74) *Attorney, Agent, or Firm* — Adeli LLP

(57) ABSTRACT

Some embodiments of the invention provides a media editing application that includes tools to perform a variety of different editing operations based on roles assigned to media content. In some embodiments, the media editing application includes focus-editing tools to emphasize or de-emphasize different sets of clips based on the assigned roles. In some embodiments, the media editing application allows one or more sets of clips to be disabled or enabled during playback based on the assigned roles.

18 Claims, 49 Drawing Sheets

Related U.S. Application Data a continuation-in-part of application No. 13/250,855, filed on Sep. 30, 2011, and a continuation-in-part of application No. 13/250,857, filed on Sep. 30, 2011, now abandoned.

(60) Provisional application No. 61/537,041, filed on Sep. 20, 2011, provisional application No. 61/537,567, filed on Sep. 21, 2011.

(51) Int. Cl.
*G11B 27/34* (2006.01)
*G06F 3/048* (2013.01)

(56) References Cited

U.S. PATENT DOCUMENTS

| | | |
|---|---|---|
| 5,659,792 A | 8/1997 | Walmsley |
| 5,664,216 A | 9/1997 | Blumenau |
| 5,682,326 A | 10/1997 | Klingler et al. |
| 5,732,184 A | 3/1998 | Chao et al. |
| 5,752,029 A | 5/1998 | Wissner |
| 5,781,188 A | 7/1998 | Amiot et al. |
| 5,930,446 A | 7/1999 | Kanda |
| 6,134,380 A | 10/2000 | Kushizaki |
| 6,144,375 A | 11/2000 | Jain et al. |
| 6,154,600 A | 11/2000 | Newman et al. |
| 6,154,601 A | 11/2000 | Yaegashi et al. |
| 6,161,115 A | 12/2000 | Ohanian |
| 6,366,296 B1 | 4/2002 | Boreczky et al. |
| 6,476,826 B1 | 11/2002 | Plotkin et al. |
| 6,477,315 B1 | 11/2002 | Ohomori |
| 6,539,163 B1 | 3/2003 | Sheasby et al. |
| 6,546,399 B1 | 4/2003 | Reed et al. |
| 6,628,303 B1 | 9/2003 | Foreman et al. |
| 6,629,104 B1 | 9/2003 | Parulski et al. |
| 6,650,826 B1 | 11/2003 | Hatta |
| 6,658,194 B1 | 12/2003 | Omori |
| 6,674,955 B2 | 1/2004 | Matsui et al. |
| 6,741,996 B1 | 5/2004 | Brechner et al. |
| 6,744,968 B1 | 6/2004 | Imai et al. |
| 6,928,613 B1 | 8/2005 | Ishii et al. |
| 6,970,859 B1 | 11/2005 | Brechner et al. |
| 7,035,435 B2 | 4/2006 | Li et al. |
| 7,035,463 B1 | 4/2006 | Monobe et al. |
| 7,062,713 B2 | 6/2006 | Schriever et al. |
| 7,073,127 B2 | 7/2006 | Zhao et al. |
| 7,313,755 B2 | 12/2007 | Rahman et al. |
| 7,325,199 B1 | 1/2008 | Reid |
| 7,336,264 B2 | 2/2008 | Cajolet et al. |
| 7,362,946 B1 | 4/2008 | Kowald |
| 7,432,940 B2 | 10/2008 | Brook et al. |
| 7,434,155 B2 | 10/2008 | Lee |
| 7,437,674 B2 | 10/2008 | Chen |
| 7,444,593 B1 | 10/2008 | Reid |
| 7,480,864 B2 | 1/2009 | Brook et al. |
| 7,539,659 B2 | 5/2009 | Wong et al. |
| 7,561,160 B2 | 7/2009 | Fukuya |
| 7,606,444 B1 | 10/2009 | Erol et al. |
| 7,668,869 B2 | 2/2010 | Weinberger et al. |
| 7,710,439 B2 | 5/2010 | Reid et al. |
| 7,720,349 B2 | 5/2010 | Ogikubo |
| RE41,493 E | 8/2010 | Marcus |
| 7,779,358 B1 | 8/2010 | Gupta et al. |
| 7,889,946 B1 | 2/2011 | Bourdev |
| 7,890,867 B1 | 2/2011 | Margulis |
| 7,925,669 B2 | 4/2011 | Freeborg et al. |
| 7,975,062 B2 | 7/2011 | Krikorian et al. |
| 8,522,144 B2 | 8/2013 | Lyons et al. |
| 8,566,721 B2 | 10/2013 | Langmacher et al. |
| 8,612,858 B2 | 12/2013 | Meaney et al. |
| 8,745,499 B2 | 6/2014 | Pendergast et al. |
| 2001/0036356 A1 | 11/2001 | Weaver et al. |
| 2001/0056434 A1 | 12/2001 | Kaplan et al. |
| 2002/0023103 A1* | 2/2002 | Gagne .................. 707/501.1 |
| 2002/0069218 A1 | 6/2002 | Sull et al. |
| 2003/0002715 A1 | 1/2003 | Kowald |
| 2003/0090504 A1 | 5/2003 | Brook et al. |
| 2003/0234803 A1 | 12/2003 | Toyama et al. |
| 2004/0027369 A1 | 2/2004 | Kellock et al. |
| 2004/0046804 A1 | 3/2004 | Chang |
| 2004/0078761 A1 | 4/2004 | Ohanian |
| 2004/0098379 A1 | 5/2004 | Huang |
| 2004/0125124 A1 | 7/2004 | Kim et al. |
| 2004/0151469 A1 | 8/2004 | Engholm et al. |
| 2004/0201609 A1 | 10/2004 | Obrador |
| 2004/0212637 A1 | 10/2004 | Varghese |
| 2004/0215643 A1 | 10/2004 | Brechner et al. |
| 2004/0268224 A1 | 12/2004 | Balkus et al. |
| 2005/0120127 A1 | 6/2005 | Bradley et al. |
| 2006/0008247 A1 | 1/2006 | Minami et al. |
| 2006/0078288 A1 | 4/2006 | Huang et al. |
| 2006/0136556 A1 | 6/2006 | Stevens et al. |
| 2006/0155684 A1 | 7/2006 | Liu et al. |
| 2006/0161867 A1 | 7/2006 | Drucker et al. |
| 2006/0233514 A1 | 10/2006 | Weng et al. |
| 2006/0236245 A1 | 10/2006 | Agarwal et al. |
| 2006/0242164 A1 | 10/2006 | Evans et al. |
| 2006/0253781 A1 | 11/2006 | Pea et al. |
| 2006/0277454 A1 | 12/2006 | Chen |
| 2007/0079321 A1 | 4/2007 | Ott |
| 2007/0124282 A1 | 5/2007 | Wittkotter |
| 2007/0136656 A1 | 6/2007 | Nydam et al. |
| 2007/0154190 A1 | 7/2007 | Gilley et al. |
| 2007/0203945 A1 | 8/2007 | Louw |
| 2007/0204238 A1 | 8/2007 | Hua et al. |
| 2007/0240072 A1 | 10/2007 | Cunningham et al. |
| 2007/0266304 A1 | 11/2007 | Fletcher et al. |
| 2008/0072166 A1 | 3/2008 | Reddy |
| 2008/0104127 A1 | 5/2008 | Billmaier et al. |
| 2008/0120328 A1 | 5/2008 | Delgo et al. |
| 2008/0126191 A1 | 5/2008 | Schiavi |
| 2008/0138034 A1 | 6/2008 | Hiroi et al. |
| 2008/0155459 A1* | 6/2008 | Ubillos .................. 715/783 |
| 2008/0184121 A1 | 7/2008 | Kulas |
| 2008/0222170 A1 | 9/2008 | Farnham et al. |
| 2008/0288869 A1 | 11/2008 | Ubillos |
| 2008/0306921 A1 | 12/2008 | Rothmuller et al. |
| 2009/0006475 A1 | 1/2009 | Udezue et al. |
| 2009/0031239 A1 | 1/2009 | Coleran et al. |
| 2009/0089690 A1 | 4/2009 | Chi et al. |
| 2009/0150947 A1 | 6/2009 | Soderstrom |
| 2009/0182644 A1 | 7/2009 | Panagopulos et al. |
| 2009/0201316 A1 | 8/2009 | Bhatt et al. |
| 2009/0249185 A1 | 10/2009 | Datar et al. |
| 2009/0254825 A1 | 10/2009 | Sichart et al. |
| 2009/0259623 A1 | 10/2009 | Mooneyham et al. |
| 2010/0050080 A1 | 2/2010 | Libert et al. |
| 2010/0063961 A1 | 3/2010 | Guiheneuf et al. |
| 2010/0077289 A1 | 3/2010 | Das et al. |
| 2010/0080528 A1 | 4/2010 | Yen et al. |
| 2010/0082585 A1 | 4/2010 | Barsook et al. |
| 2010/0083173 A1 | 4/2010 | Germann et al. |
| 2010/0158471 A1 | 6/2010 | Ogikubo |
| 2010/0194763 A1* | 8/2010 | Niles et al. .................. 345/474 |
| 2010/0275123 A1* | 10/2010 | Yu et al. .................. 715/731 |
| 2010/0281366 A1 | 11/2010 | Langmacher et al. |
| 2010/0281371 A1 | 11/2010 | Warner et al. |
| 2010/0281377 A1 | 11/2010 | Meaney et al. |
| 2010/0281378 A1 | 11/2010 | Pendergast et al. |
| 2010/0281386 A1 | 11/2010 | Lyons et al. |
| 2010/0333026 A1 | 12/2010 | Hooper et al. |
| 2011/0010624 A1 | 1/2011 | Vanslette et al. |
| 2011/0047163 A1 | 2/2011 | Chechik et al. |
| 2011/0072037 A1 | 3/2011 | Lotzer |
| 2011/0113331 A1 | 5/2011 | Herberger et al. |
| 2011/0116769 A1 | 5/2011 | Sugiyama et al. |
| 2011/0161348 A1 | 6/2011 | Oron |
| 2011/0246889 A1* | 10/2011 | Moore .................. 715/719 |
| 2011/0258547 A1* | 10/2011 | Symons .............. G06F 3/04817 715/723 |
| 2011/0276881 A1* | 11/2011 | Keng et al. .................. 715/723 |
| 2012/0017152 A1 | 1/2012 | Matsuda et al. |
| 2012/0017153 A1 | 1/2012 | Matsuda et al. |

(56) References Cited

U.S. PATENT DOCUMENTS

| | | |
|---|---|---|
| 2012/0209889 A1 | 8/2012 | Agnoli et al. |
| 2012/0210218 A1 | 8/2012 | Pendergast et al. |
| 2012/0210219 A1 | 8/2012 | Agnoli et al. |
| 2012/0210220 A1 | 8/2012 | Pendergast et al. |
| 2013/0073933 A1 | 3/2013 | Eppolito |
| 2013/0073959 A1 | 3/2013 | Eppolito et al. |
| 2013/0073960 A1 | 3/2013 | Eppolito et al. |
| 2013/0073961 A1 | 3/2013 | Agnoli et al. |
| 2013/0073962 A1 | 3/2013 | Pendergast et al. |
| 2013/0073964 A1 | 3/2013 | Meaney et al. |
| 2013/0132839 A1 | 5/2013 | Berry |

FOREIGN PATENT DOCUMENTS

| | | |
|---|---|---|
| WO | WO 2009/114134 | 9/2009 |
| WO | WO 2010/106586 | 9/2010 |

OTHER PUBLICATIONS

U.S. Appl. No. 13/115,966, filed May 25, 2011, Pendergast, Colleen, et al.

U.S. Appl. No. 13/115,970, filed May 25, 2011, Agnoli, Giovanni, et al.

U.S. Appl. No. 13/115,973, filed May 25, 2011, Pendergast, Colleen, et al.

U.S. Appl. No. 13/250,855, filed Sep. 30, 2011, Eppolito, Aaron M.

U.S. Appl. No. 13/250,857, filed Sep. 30, 2011, Eppolito, Aaron M., et al.

U.S. Appl. No. 13/400,539, filed Feb. 20, 2012, Agnoli, Giovanni, et al.

U.S. Appl. No. 13/400,540, filed Feb. 20, 2012, Pendergast, Colleen, et al.

U.S. Appl. No. 13/400,545, filed Feb. 20, 2012, Meaney, Brian, et al.

Author Unknown, "Apple Announces Final Cut Pro 4," NAB, Apr. 6, 2003, 3 pages, Apple Inc., Las Vegas, NV, USA.

Author Unknown, "Using Adobe Premiere Elements 8 Editor," last updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Brenneis, Lisa, "Final Cut Pro 3 for Macinotsh: Visual QuickPro Guide," Month Unknown, 2002, 288 pages, Peachpit Press, Berkeley, California, USA.

Casares, Juan, et al., "Simplifying Video Editing Using Metadata", Processing of Designing Interactive Systems (DIS 2002), Jun. 2002, 10 pages, London, UK, available at http://www.informedia.cs.cmu.edu/documents/silver-dis02-draft.pdf.

Diakopoulos, Nicholas, et al., "Videotater: An Approach for Pen-Based Digital Video Segmentation and Tagging", UIST'06, Oct. 15-18, 2006, 4 pages, Montreux, Switzerland, available at http://www.deakondesign.com/Documents/tn151-diakopoulos.pdf.

Kutics, Andrea, et al., "Use of Adaptive Still Image Descriptors for Annotation of Video Frames", Lecture Notes in Computer Science, Month Unknown, 2007, pp. 686-697, vol. 4633, Springer-Verlag, Berlin, Heidelberg.

Long, A. Chris, et al., "Video Editing Using Lenses and Semantic Zooming", Human Computer Interaction Institute, Carnegie Mellon University, Month Unknown, 2009, pp. 1-9, Pittsburgh, PA.

Myers, Brad A., et al., "A Multi-View Intelligent Editor for Digital Video Libraries", The First ACM+IEEE Joint Conference on Digital Libraries (JCDL'01), Jun. 24-28, 2001, 10 pages, Roanoke, VA, available at http://www.informedia.cs.cmu.edu/documents/dl2001paper.pdf.

Shaw, Ryan, et al., "Toward Emergent Representations for Video", Proceedings of the 13th annual ACM International Conference on Multimedia, Nov. 6-11, 2005, 4 pages, Singapore.

Ulges, Adrian, et al., "Content-based Video Tagging for Online Video Portals", Proceedings of the 3rd MUSCLE/Image CLEF Workshop on Image and Video Retrieval Evaluation, Sep. 2007, 10 pages, Budapest, Hungary.

Wang, Yijin, et al. "MyVideos-A System for Home Video Management", Proceedings of the 10th ACM International Conference on Multimedia '02, Dec. 1-6, 2002, pp. 412-413, Juan-les-Pins, France.

\* cited by examiner

ROLE-FACILITATED EDITING OPERATIONS

CLAIM OF BENEFIT TO PRIOR APPLICATIONS

This application claims the benefit of U.S. Provisional Application 61/537,041, filed Sep. 20, 2011, and U.S. Provisional Application 61/537,567, filed Sep. 21, 2011. U.S. Provisional Application 61/537,041 and U.S. Provisional Application 61/537,567 are incorporated herein by reference. This application is also a continuation in part of U.S. patent application Ser. No. 13/250,853, issued as U.S. Pat. No. 9,240,215, filed Sep. 30, 2011, U.S. patent application Ser. No. 13/250,855, published as U.S. Patent Publication 2013/0073933, filed Sep. 30, 2011, and U.S. patent application Ser. No. 13/250,857, published as U.S. Patent Publication 2013/0073960, filed Sep. 30, 2011 now abandoned. U.S. patent application Ser. Nos. 13/250,853, 13/250,855, and 13/250,857 are incorporated herein by reference.

BACKGROUND

To date, many media editing applications exist for creating media presentations by compositing several pieces of media content such as video, audio, animation, still image, etc. Such applications give users the ability to edit, combine, transition, overlay, and piece together different media content in a variety of manners to create and output a resulting composite presentation.

Some media content producers (e.g., movie studios, broadcast stations) require a particular type of content in a composite media presentation to be separate from other types of content. For instance, a movie studio may require the video content to be separate from the dialogue or music content. This content separation allows the movie studio to easily replace the dialogue content in a first language with dialogue content in a second different language.

To output separate content, several media editing applications allow their users to create multiple tracks and specify different output channels for these tracks. FIG. 1 provides an example of such a media editing application 100. The media application 100 includes a composite display area 105 that includes different tracks 110-125. As shown, the application's user has created several tracks with the media editing application, and arranged one set of clips (e.g., "Dialogue" clips) along one track, another set of clips (e.g., "Music" clips) along another track, etc. The user has also specified whether these tracks should be output to separate channels. In the example illustrated in FIG. 1, the user has specified that the track 115 (e.g., with three "Dialogue" clips) should be output to a first channel, while the track 125 (e.g., with two "Music" clips) should be output to a second channel.

There are a number of shortcomings with such media editing applications as described above. For instance, the media editing application requires its user to create multiple tracks for different output channels and arrange clips along these different tracks. This constrains the application's user as the tracks are used for outputting the composite presentation when they could be used for other purposes. For instance, each particular track can be used to edit clips, create transitions between clips (e.g., keyframing), define compositing order, etc.

As another example, in the track-based system as described above, the editing operations are intrinsically tied to output operations. That is, if a composite presentation was edited without initially considering different output channels, then the user may have to re-edit the composite presentation by creating additional tracks and rearranging the media clips along the additional tracks. Such re-editing can be time consuming, especially when there are many clips that are part of the same composite presentation.

In addition to the different output channels, the media editing application requires its user to know what type of content is included in each clip. The application's user may have to input descriptive names for different clips so that it is clear what types of content are contained in those clips. For example, the user may have to input a particular clip name that indicates whether the clip contains dialogue, effect, music, etc. Otherwise, one or more clips could be placed on a wrong track if the user does not know what type of content is included in each clip.

BRIEF SUMMARY

Some embodiments of the invention provide a media editing application for assigning roles to media content. Examples of media content include video clips, audio clips, closed-caption, sub-titles, still images, etc. In some embodiments, the media editing application assigns one or more roles to each piece of content in order to categorize each piece of content that it imports. In categorizing audio content, the media editing application of some embodiments uses industry standard terms such as "Dialogue", "Effects", and "Music". For example, the media editing application may analyze the metadata of each audio clip to assign any one of the aforementioned different roles.

In some embodiments, the media editing application extends the categorization to other types of content such as video content, textual content (e.g., annotations, sub-titles), image content, etc. For example, the media editing application of some embodiments assigns a video role (e.g., "Video" role, "Titles" role, etc.) to each video clip imported into the media editing application. When the video clip includes audio content, the media editing application might also assigns an audio role to the video clip. In other words, a video clip imported in the media editing application may be assigned a video role as well as an audio role.

In some embodiments, the media editing application allows its users to perform a variety of different post-import operations based on the roles assigned to the media content. These different operations include organizing, editing, and/or exporting operations. For example, the media editing application of some embodiments organizes clips on a display by grouping the clips into different categories according to the clips' roles. The application's user can also search for clips based on the assigned roles and/or create a collection (e.g., folder, bin) that is dynamically updated with different clips that are assigned one or more roles. In this manner, the application's user can easily locate different types of clips for various purposes (e.g., to use in creating a composite presentation).

The media editing application of some embodiments provides editing tools to edit or modify the assigned roles. The modification, in some embodiments, entails reassigning roles and/or creating custom roles such as sub-roles. For example, the application's user can reassign a particular role that was previously assigned to a clip with a different role. Alternatively, the user can create and assign a custom role that differently categorizes the clip. For example, the application's user can create or specify a sub-role for a "Dialog" role that identifies a name of an actor speaking the dialogue in a particular audio clip.

To assist in creating a composite presentation, the media editing application of some embodiments provides focus-editing tools to emphasize or de-emphasize different sets of clips based on the assigned roles. This focus-editing feature allows the application's user to focus on a set of clips that are assigned a particular role when creating a composite presentation, in some embodiments. For example, one or more sets of clips in a composite display area can be highlighted and/or minimized based on the assigned roles. In some embodiments, the media editing application allows one or more sets of clips to be disabled during playback based on the assigned roles. For example, when a composite presentation includes "Dialogue" clips and "Video" clips, the media editing application provides user-selectable items for disabling all "Dialogue" clips and/or all "Video" clips or their combination.

Once the composite presentation is created, the media editing application of some embodiments allows the presentation to be exported based on the assigned roles. In some such embodiments, the media editing application provides an export tool that can be used to select one or more roles for different output files. For example, a multi-file output can be specified such that all "Dialogue" clips are combined and output to a first audio file, all "Music" clips are combined and output to a second audio file, etc.

In some embodiments, the media editing application extends the stem export feature to include other types of content (e.g., video, sub-titles, closed caption, etc.). For example, instead of only audio stem export, different sub-titles in different languages can be output to separate files based on the assigned roles. In this way, the movie studio can easily replace a first sub-title in one language with a second sub-title in another language. In addition, the media editing application of some embodiments provides export tools that can be used to output a composite presentation to a single file (e.g., movie file) that include different types of content (e.g., audio content, video content) based on the assigned roles.

By assigning different roles to different pieces of content, the export operations have been separated from editing operations. That is, the application's user is no longer required to create different tracks for a composite presentation and/or arrange different types of clips along the different tracks for the purpose of exporting the composite presentation. Instead, the user can choose what type of content should be included in one or more output file. This can be done prior to editing a composite presentation or even after the user has edited the composite presentation. In other words, the application's user does not have to edit or arrange clips in a certain way to export the composite presentation to different files.

The preceding Summary is intended to serve as a brief introduction to some embodiments of the invention. It is not meant to be an introduction or overview of all inventive subject matters disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media editing application that assigns different roles to media content (e.g., video clip, audio clip, closed-caption, sub-title, etc.) when importing the media content into the media editing application. Once assigned, the media editing application allows its users to perform a variety of different editing operations using the assigned roles. For example, the media editing application of some embodiments allows its users to focus on different subsets of clips based on the assigned roles. In some embodiments, the media editing application provides different tools to modify the assigned roles or create custom roles.

Alternatively or conjunctively with these editing features, the media editing application provides several tools to output (e.g., play, export) a composite presentation based on the assigned roles. For example, the media editing application of some embodiments allows all clips that are assigned one role (e.g., "Dialogue", "Music", "Effects", etc.) to be output to a particular file, and all clips that are assigned another role (e.g., "Video", "Tittles", "Sub-Titles", "Closed-Caption", etc.) to be output to a separate file. In some embodiments, the media editing application outputs the composite presentation by allowing the user to select one or more roles and compositing clips that are associated with the selected roles.

Several examples of the role-based import, edit, and output operations will now be described by reference to FIGS. 2-5. These figures introduce several features of the media editing application. Many more examples will be descried in the following sections.

Figure 1:
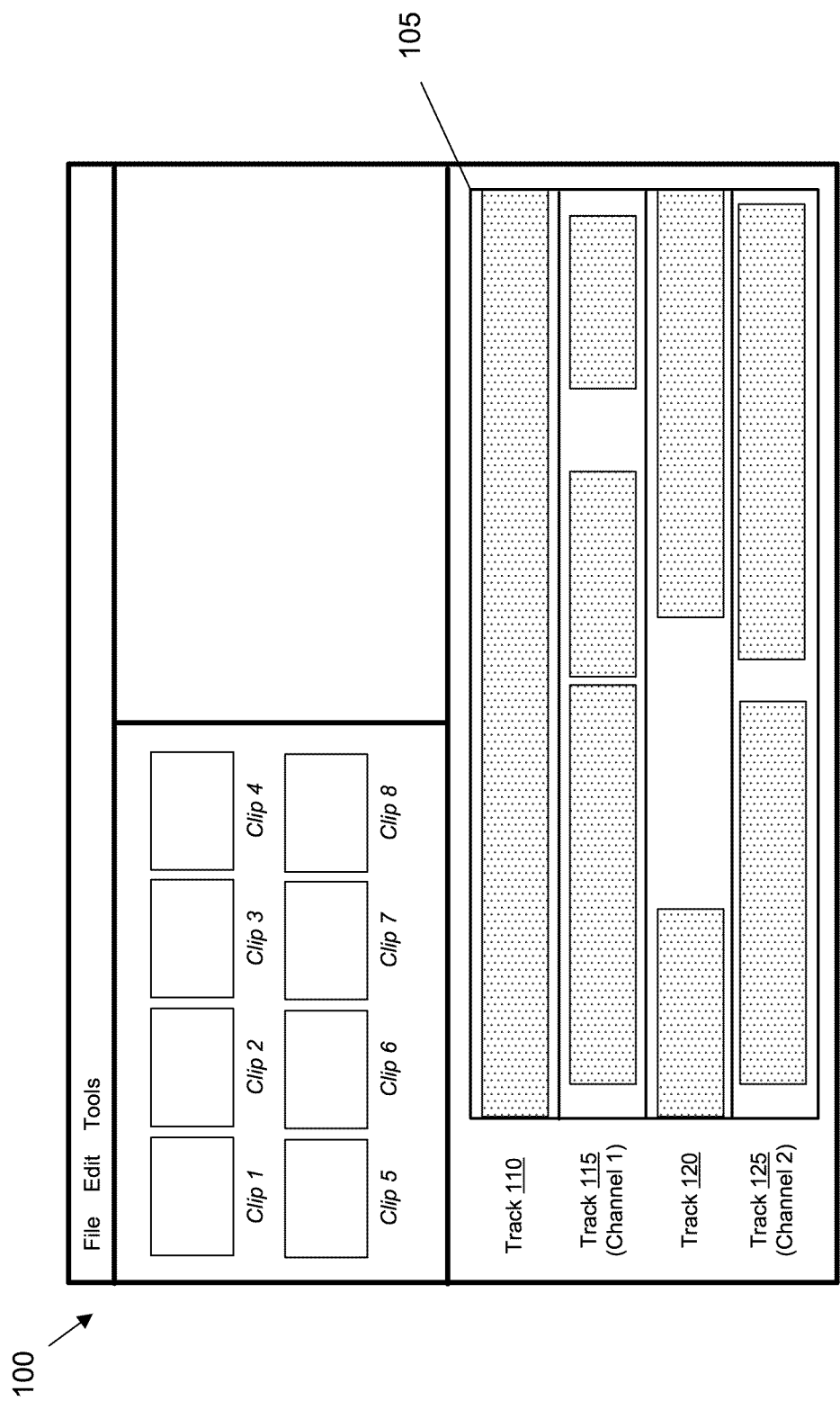
FIG. 1 provides an example of a track-based media editing application.
Figure 2:
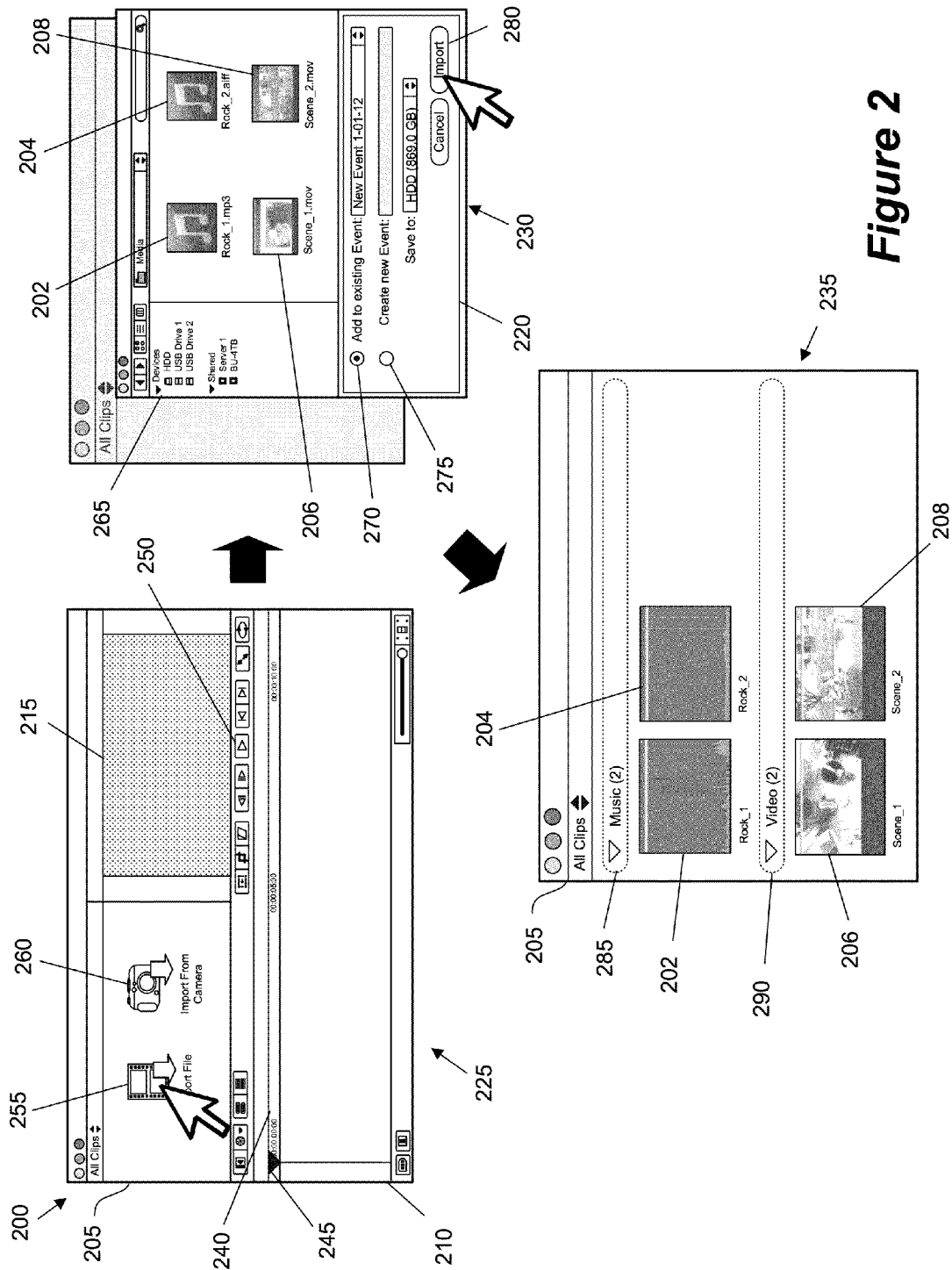
FIG. 2 illustrates a graphical user interface of a media editing application with role-facilitated editing features.

For some embodiments of the invention, FIG. 2 illustrates a graphical user interface ("GUI") 200 of a media editing application with such role-based editing features. This figure illustrates the GUI 200 at three different stages 225, 230, and 235. Specifically, these stages show how the media editing application assigns different roles to media content when importing the content into media editing application. As shown in FIG. 2, the GUI 200 includes (1) a clip browser 205, (2) a composite display area 210, (3) a preview display area 215, and (4) a set of import controls 255 and 260.

The clip browser 205 is an area in the GUI 200 through which the application's user can view media content imported into the media editing application. Specifically, the clip browser 205 displays different pieces of content that can be used to create and output a composite presentation. To allow the user to easily find content, the clip browser 205 of some embodiments displays content by grouping or sorting them (e.g., by creation date, import date, duration, file type, etc.). As will be described in detail below, the media editing application of some embodiments display the content by grouping or sorting them according to the assigned roles.

In the example illustrated in FIG. 2, the clip browser 205 displays the media clips as thumbnail images. However, depending on the user's preference, the clips may be represented differently. For instance, a video clip may be represented as a filmstrip with several images of the clip displayed as a sequence of thumbnail images. In some embodiments, audio clips are represented differently from video clips. For example, instead of a filmstrip representation, an audio clip may be represented as a waveform. That is, the representation of the audio clip may indicate the clip's signal strength at different instances in time. In some embodiments, when the video clip includes audio, the clip's representation includes a waveform that corresponds to the video clip's audio.

The composite display area 210 provides a visual representation of a composite presentation (or project) being created by the application's user. The composite display area 210 displays one or more geometric shapes (e.g., filmstrip representations) that represent media clips that are part of the composite presentation. In some embodiments, the arrangement of the clips in the composite display area 210 represents the sequence or order in which each clip is presented (e.g., played) in the composite presentation. In the example illustrated in FIG. 2, the composite display area 210 spans a displayed timeline 240 which displays time (e.g., the elapsed time of clips displayed in the composite display area).

The preview display area 215 (also referred to as a "viewer") displays images from media files that the user is skimming through, playing back, or editing. These images can be from a composite presentation in the composite display area 210 or from a media clip in the clip browser 205. As shown in FIG. 2, a playhead 245 is situated on the timeline 240. The user can drag the playhead along the timeline 240 to display a preview of the composite presentation at a particular point in the presentation, or to play the preview starting from the particular point by selecting the play button 250.

The set of import controls 255 and 260 allows content to be imported into the media editing application. Specifically, the control 255 allows the application's user to import content from a local or network drive, while the control 260 allows the user to import content directly from a camera. In the example illustrated in FIG. 2, the set of controls 255 and 260 are displayed in the clip browser 205. However, one of ordinary skill in the art would understand that these controls might be presented differently. For example, the media editing application of some embodiments provides these controls 255 and 260 as menu items, toolbar buttons, shortcut keys, etc.

Having described the elements of the GUI 200, the operations of assigning different roles to media clips will now be described by reference to the state of the GUI during the three stages 225, 230, and 235 that are illustrated in FIG. 2. In the first stage 225, as no media clips have been imported into the media editing application, the clip browser 205 does not display any clip representations. As shown, the user selects the import control 255 to import media clips from the local or network drive.

The second stage 230 shows the GUI 200 after the selection of the import control 255. The selection causes an import options window 220 to appear. This window 220 includes a browser 265 for browsing and displaying content to import into the media editing application. In the example illustrated in FIG. 2, the import options window 220 includes radio buttons 270 and 275 for adding imported content to an existing collection (e.g., bin, folder) or adding the imported content to a new collection.

In the second stage 230, the user browses through the local drive using the browser 265. The user selects a folder labeled "Media". This folder contains two audio clips (202 and 204) and two video clips (206 and 208). The user then selects the radio button 270 to add the clips into an existing collection. Finally, the user selects an import button 280 to import all of the media clips contained in the "Media" folder into the media editing application.

The third stage 235 shows the clip browser 205 after importing the audio and video clips 202-208. In particular, this stage 235 illustrates that the media editing application has assigned each clip with a particular role. The two audio clips 202 and 204 have been assigned a "Music" role, while the two video clips 206 and 208 have been assigned a "Video" role. This is shown in the clip browser 205 as the clips are grouped into different categories according to the assigned roles. Specifically, the two audio clips 202 and 204 are grouped under a "Music" role heading 285. Also, the two video clips 206 and 208 are grouped under a "Video" role heading 290. By automatically assigning different roles, the media editing application can save its user a significant amount of time as it removes the task of manually categorizing clips from the workflow in creating the composite presentation.

Figure 3:
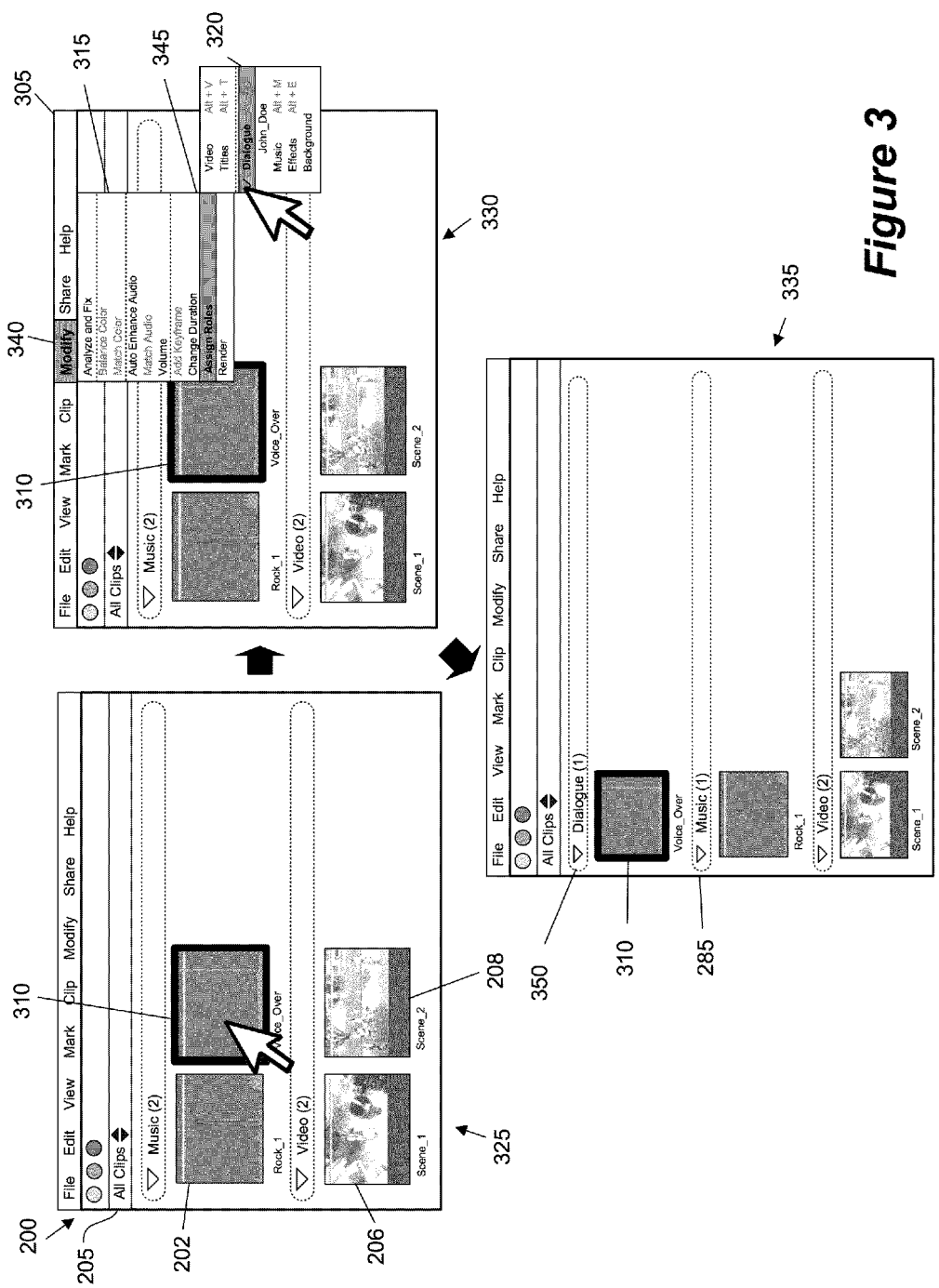
FIG. 3 provides an illustrative example of modifying a role assigned to a media clip.

In the previous example, several different roles are assigned to the media clips by the media editing application during import. In some embodiments, the media editing application provides various different tools to modify the assigned roles (e.g., reassign roles, create custom roles, etc.). FIG. 3 provides an illustrative example of modifying the "Music" role assigned to the media clip 310. Three operational stages 325-335 of the GUI 200 are illustrated in this figure.

In the first stage 325, the clip browser 205 displays representations of the two audio clips 202 and 310 that are assigned the "Music" role, and the two video clips 206 and 208 that are assigned the "Video" role. Here, the audio clip 310 contains dialogue but has been incorrectly assigned the "Music" role. To reassign the role, the user initially selects the audio clip 310 from the clip browser 205.

The second stage 330 illustrates reassigning the role of the audio clip 310. After selecting the audio clip 310, the user selects a drop-down menu 340 labeled "Modify" from the menu bar 305. The selection results in a display of a list of menu items 315 for modifying the selected audio clip 310. In the example illustrated in FIG. 3, the list 315 includes menu items for analyzing and fixing the audio clip, auto-enhancing the clip, changing the clip's duration, retiming the clip, modifying the clip's assigned role, etc. The user then selects the "Assign Roles" menu item 345 to reveal several different roles. The roles include video roles such as "Video" and "Titles", and audio roles such as "Dialog", "Music", and "Effects". Lastly, the user selects the menu item 320 to assign the "Dialog" role to the audio clip 310.

The third stage 335 illustrates the clip browser 205 after assigning the "Dialog" role to the audio clip 310. Specifically, the media editing application relists the audio clip 310 under a "Dialog" role heading 350. As such, the audio clip 310 is no longer grouped under the "Music" role heading 285.

The previous example illustrated associating an existing role (e.g., provided by the media editing application) to a clip. In some embodiments, the media editing application allows its users to create custom roles. Different from predefined roles provided by the media editing application, custom roles are specified by the application's users. In conjunction with or instead of these custom roles, the media editing application of some embodiment provides tools to create sub-roles for the existing roles (e.g., the predefined roles, the custom roles). These sub-roles allow the user to not only categorize a clip with more detail, but they also allow the clip to be identified based on a particular role and the particular role's sub-role. For example, the application's user can create a sub-role for the "Dialogue" role and assign the sub-role to different media clips. The user can then search for the clip using either the "Dialogue" role or the sub-role. Several examples of such user-defined roles will be described below by reference to FIGS. 26 and 27.

Figure 4:
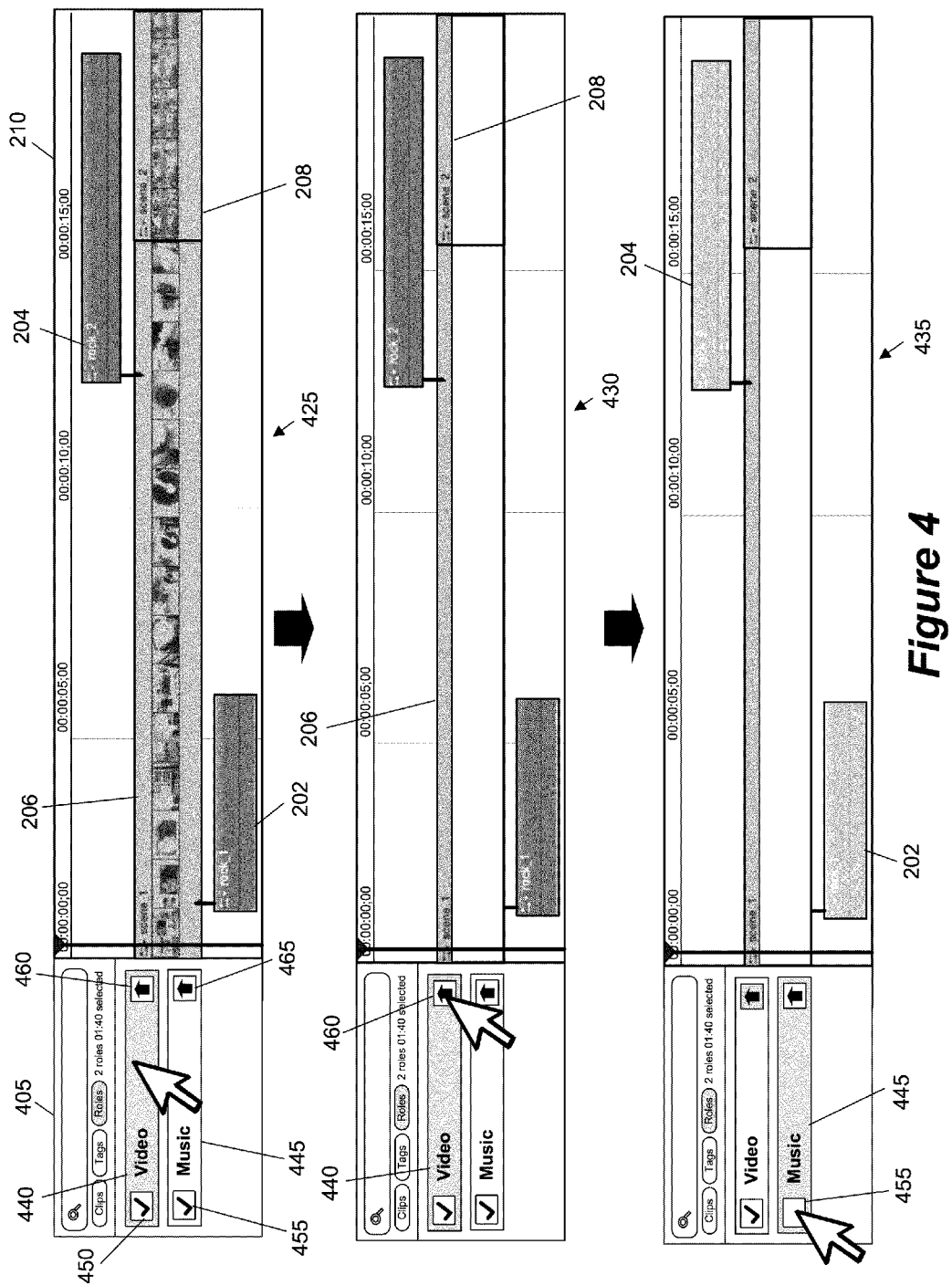
FIG. 4 illustrates several tools for emphasizing and deemphasizing media clip based on assigned roles.

In some embodiments, the media editing application provides focus-editing tools to emphasize or de-emphasize different sets of clips based on the assigned roles. These focus-editing tools can be used by the application's user to hone in on the composite display area in order to work on focused task such as dialogue editing, effects design, titles work, etc. FIG. 4 provides an illustrative example of such tools. Specifically, this figure shows in three operational stages 425-435 how the media editing application can be used to highlight, minimize, and disable certain clips based on the assigned roles. This figure includes a timeline search tool 405 with such focus-editing tools.

The first stage 425 illustrates highlighting clips that are assigned the "Video" role. As shown, the composite display area 210 displays representations of the two audio clips (202 and 204) and the two video clips (206 and 208). The user might have added these clips by dragging and dropping them from the clip browser (not shown) to the composite display area 210. Alternatively, the user might have selected one or more of these clips from the clip browser and selected a shortcut key.

In the example illustrated in FIG. 4, the timeline search tool 405 displays different roles in a roles view. Alternatively, the timeline search tool 405 of some embodiments can be in a clips view for searching clips in the composite display area 210 or a tags view for searching clips in the composite display area based on different tags such as keywords. Several examples of these different views will be described below by reference to FIG. 29.

As shown in FIG. 4, the timeline search tool's roles view displays a list of different roles that are assigned to clips in the composite display area 210. The list includes the "Video" role 440 that is assigned to the two video clips 206 and 208, and the "Music" role 445 that is assigned to the two audio clips 202 and 204. In the first stage 425, the user selects the "Video" role 440 listed in the timeline search tool 405. As the video clips 206 and 208 are assigned the "Video" role, the selection causes both clips' representations to be highlighted in the composite display area 210. The user can reselect the role 440 from the timeline search tool 405 to un-highlight the "Video" clips 206 and 208. Different embodiments modify the appearance of clips in the composite display area differently. For example, the appearance of the clips can be modified by changing the color, transparency, 3D effect, etc.

The second stage 430 illustrates de-emphasizing clips that are assigned the "Video" role. Specifically, this stage 430 shows how the "Video" clips in the composite display area 210 can be minimized so that the application's user can focus on other clips. This minimization feature is particularly useful when the composite display area 210 is dense with many clips that are part of the composite presentation. In such situation, the user can use the minimization feature to focus on certain type or category of clips such as "Dialogue" clips, "Video" clips, "Music" clips, etc.

To minimize clips, the timeline search tool 405 includes a minimize button (460 or 465) for each of the roles (440 and 445). This allows the user to optimize workspace for specific editing operations on different categories of clips. In minimizing clips that are assigned the "Video" role, the application's user selects the minimize button 460. The selection causes the two video clips 206 and 208 to be minimized in the composite display area 210. Specifically, the video clips 206 and 208 are minimized such that that clips' images or filmstrip representations are not displayed in the composite display area 210. Instead, the video clips 206 and 208 are represented as horizontal bars that cover less space than representations of other clips in the composite display area 210. In some embodiments, the media editing application allows the user to restore or expand the clips by reselecting the minimize button 460.

The third stage 430 illustrates disabling clips in the composite display area 210 based on the assigned roles. This feature allows the application's user to focus on non-disabled clips by playing back only those clips (e.g. when playing a preview of the composite presentation). In some embodiments, the clips can be disabled during playback. For example, the user can select a particular role during playback of a composite presentation and no clips that are assigned the particular role will be played back. By allowing different roles to be turned off and on, the user of the media editing application does not have to disable clips one by one. Instead, the user can select one or more roles and all clips that are assigned to the selected roles are disabled.

As shown, the timeline search tool 405 includes a disable button (450 or 455) for each of the roles (440 and 445). To disable clips that are assigned the "Music" role, the application's user selects the disable button 455. The selection causes the two "Music" clips 202 and 204 to be disabled during playback of the composite presentation. In the example illustrated in FIG. 4, the media editing application indicates that the clips 202 and 204 are disabled by modifying their appearance in the composite display area 210. Specifically, the disabled clips 202 and 204 are colored differently (e.g., grayed out) from other non-disabled clips.

In the example described above, several clips are highlighted, minimized, and disabled based on the assigned roles. The media editing application of some embodiments provides several tools to output (e.g., play, export) a composite presentation to different tracks (e.g., files) based on the assigned roles. Outputting content to different files is particularly useful because one track can easily be replaced with another track. For example, when audio content is mixed, a movie studio cannot replace a dialogue track in one language with another dialogue track in another language. With audio content output to different tracks (e.g., audio files), the movie studio can easily replace one dialogue track with another track such that the dialogue is in a different language.

Figure 5:
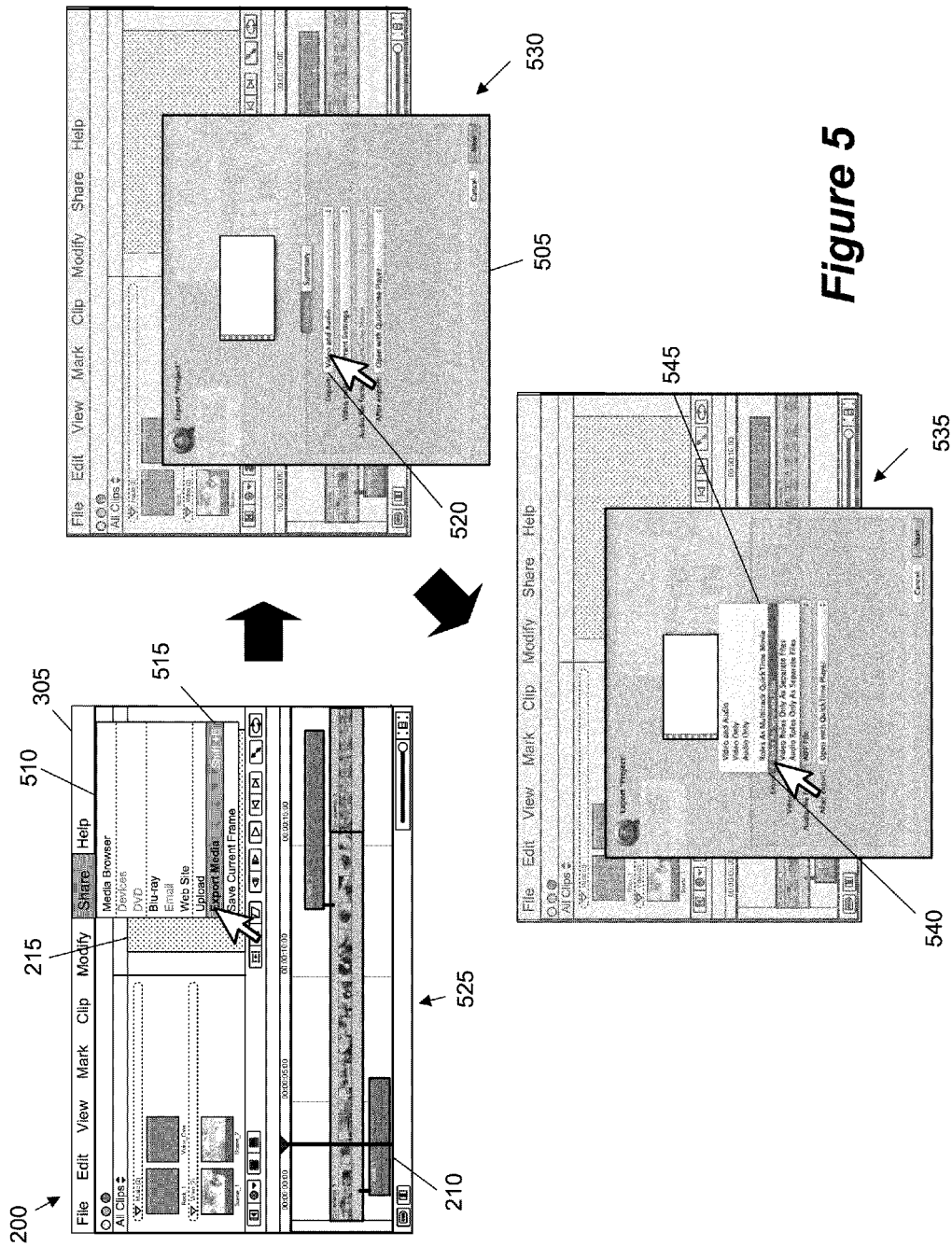
FIG. 5 provides an illustrative example of outputting a composite presentation to different tracks.

FIG. 5 provides an illustrative example of outputting a composite presentation to different tracks. Specifically, this figure illustrates in three operational stages 525-535 how the media editing application can be used to combine and output clips based on the assigned roles. The first stage 525 illustrates the GUI 200 after the user has created the composite presentation (e.g., by adding and arranging clips in the composite display area 210). The preview display area 215 displays a preview of the composite presentation. To export the composite presentation, the user selects a drop-down menu labeled "Share" from the menu bar 305. The selection results in a display of a list of menu items 510 for outputting the composite presentation. In this first stage 525, the user selects a menu item 515 that is labeled "Export Media".

The selection of the menu item 515 causes the media editing application to display an export tool 505, as illustrated in the second stage 530. As shown, this export tool 505 includes different export options. Specifically, it includes options to specify a video codec, to specify an output file format, and to open one or more files that are exported. The export tool 505 also includes an option 520 to specify what to export from the composite presentation.

The third stage 535 illustrates the selection of the export option 520. The selection causes a list of different export options 545 to appear. The list 545 includes (1) options for exporting video and audio, (2) video only, (3) audio only, (4) roles as a multitrack movie file, (5) roles as separate files, (6) video roles only as separate files, and (7) audio roles only as separate file. The user can select any one of these options to output the composite presentation. Several of these options will be described in detail below by reference to FIGS. 39-44. In the example illustrated in FIG. 5, the user selects an option 540 for outputting roles as separate files to output different files. With this selection, all the audio "Music" clips are combined and outputted as one audio file (e.g., MP3 file, AIFF file, WAV file), and all the "Video" clips are combined and outputted as a separate video file (e.g., MOV file, MP4 file, etc.).

Many more examples of the role-based import, edit, and output operations are described below. Section I describes an exemplary media editing application that implements such role features. Section II then describes additional examples of assigning different roles when importing content into the media editing application. Section III describes different examples of how the roles are integrated into the media editing application. Section IV then describes several editing tools to reassign roles and create custom roles. This selection is followed by Section V that describes additional examples of how different clips can be emphasized or de-emphasized based on the assigned roles. Section VI then describes several example export operations.

Section VII describes a software architecture of a media editing application of some embodiments. Finally, Section VIII describes a computer system which implements some embodiments of the invention.

I. Example Media Editing Application

Many more examples of the role-based import, edit, and output operations will be described below. However, before describing these examples, an exemplary media editing application will be described by reference to FIG. 6.

Figure 6:
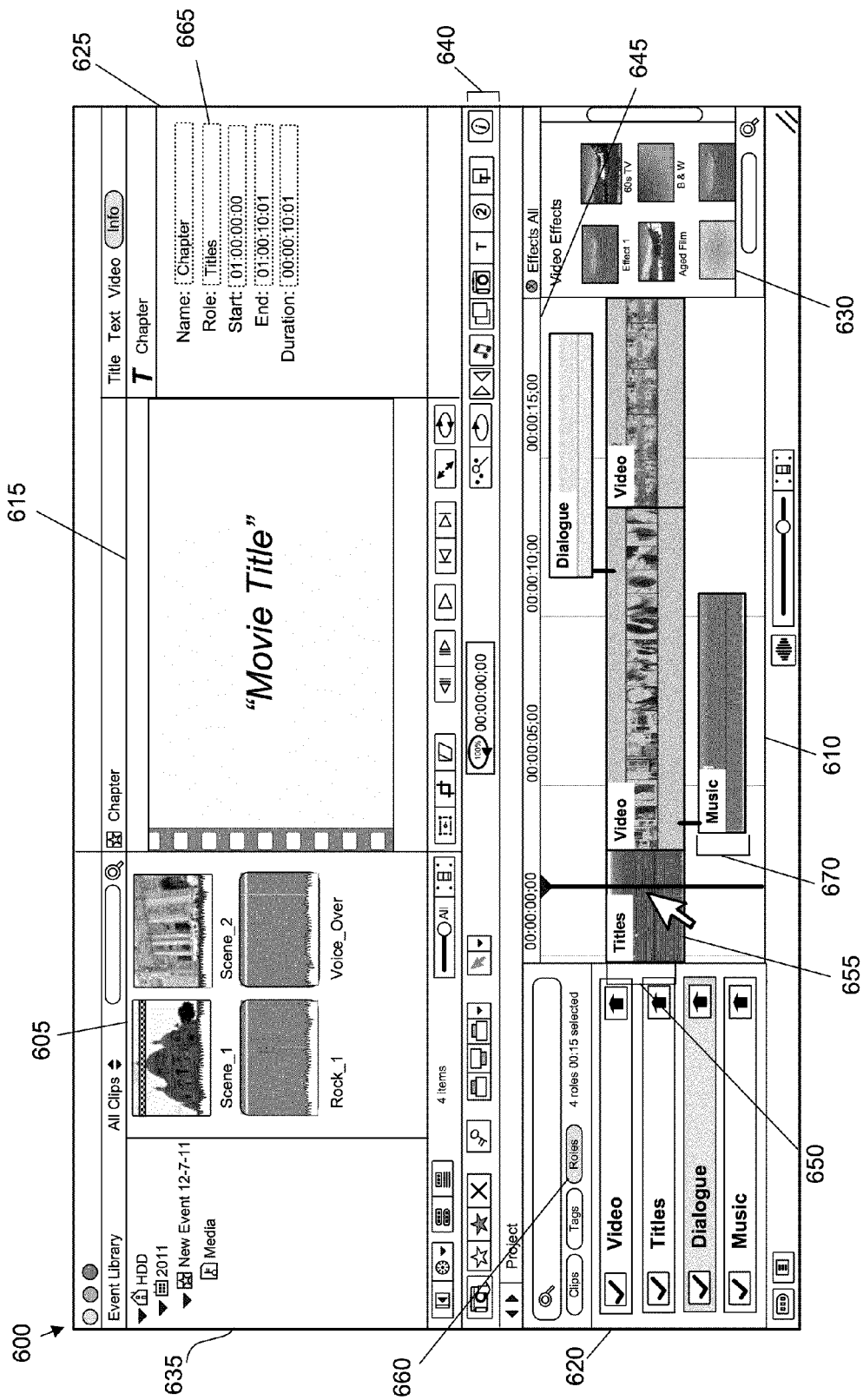
FIG. 6 illustrates a media-editing application of some embodiments that implements many of the role-based features.

FIG. 6 illustrates a graphical user interface (GUI) 600 of a media-editing application of some embodiments that implements many of the role-based features. Specifically, this media editing application can be used to assign different roles to media content when importing the content into the media editing application. The media editing application can also be used to perform a variety of different post-import operations using the assigned roles. These post-import operations include organizing media content based on the assigned roles, modifying the assigned roles, editing the composite presentation based on the assigned roles, and exporting a composite presentation to one or more files based on the assigned roles.

As shown in FIG. 6, the GUI 600 includes a clip library 635 (also referred to as an event library), a clip browser 605 (also referred to as an event browser), a composite display area 610, a preview display area 615, a timeline search tool 620, a content inspector 625, an additional media display area 630, and a toolbar 640.

The clip library 635 includes a set of folder-like or bin-line representations through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera).

Within the clip library 635, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders or sub-collections of an event. These sub-folders may include media clips filtered based on tags (e.g., keyword tags). For instance, in the "New Event 12-7-11" event, all media clips showing children might be tagged by the user with a "kids" keyword. Then these particular media clips could be displayed in a sub-folder or keyword collection of the event that filters clips in the event to only display media clips tagged with the "kids" keyword.

The clip browser 605 allows the user to view clips from a selected folder or collection (e.g., an event, a sub-folder, etc.) of the clip library 635. As shown in this example, the collection "New Event 12-7-11" is selected in the clip library 635, and the clips belonging to that folder are displayed in the clip browser 605. In some embodiments, the clip browser displays different clips according to the roles assigned to the clips. Several such examples will be described below in detail by reference to FIGS. 9 and 10.

In some embodiments, the media editing application displays the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display audio waveforms the clips' audio. In some embodiments, as a user skims through or plays back the thumbnail filmstrip, the audio plays as well. Many of the features of the clip browser are user-modifiable. For instance, in some embodiments, the user can modify one or more of the thumbnail sizes, the percentage of the thumbnail occupied by the audio waveform, whether audio plays back when the user skims through the media files, etc.

In addition, some embodiments enable the user to view the clips in the clip browser 605 in a list view. In this view, the clips are presented as a list (e.g., with clip name, duration, role, etc.). This list view in some embodiments can be used to modify roles assigned to the clips. Some embodiments also display a selected clip from the list in a filmstrip view at the top of the clip browser 605 so that the user can skim through or playback the selected clip. The clip browser 605 in some embodiments allows users to select different ranges of a media clip and/or navigate to different sections of the media clip.

The composite display area 610 (also referred to as a timeline) provides a visual representation of a composite presentation (or project) being created by the user of the media editing application. As mentioned above, the composite display area 610 displays one or more geometric shapes that represent one or more media clips that are part of the composite presentation. In some embodiments, the composite display area displays the representation with one or more role names. That is, the composite display area displays each clip with one or more role names assigned to the clip. This is shown in FIG. 6 as each clip, in the composite display area 610, is identified by one or more role names. For example, the representation 670 of the audio clip (shown in the composite display area 610) indicates the audio clip is assigned the "Music" role. In some embodiments, the media editing application allow the application's user to switch from displaying role names to clip names. An example of switching between clip names and role names is described below by reference to FIG. 14.

In some embodiments, the composite display area 610 spans a displayed timeline 645 which displays time (e.g., the elapsed time of clips displayed on the composite display area). The composite display area 610 of some embodiments includes a primary lane 650 (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes (e.g., the anchor lane 670) may be used for compositing (e.g., removing portions of one video and showing a different video in those portions), B-roll cuts (i.e., cutting away from the primary video to a different video whose clip is in the anchor lane), audio clips, or other composite presentation techniques.

The user can select different media clips from the clip browser 605, and drag and drop them into the composite display area 610 in order to add the clips to a composite presentation represented in the composite display area 610. Alternatively, the user can select the different media clips and select a shortcut key, a tool bar button, or a menu item to add them to the composite display area 610.

Within the composite display area 610, the user can perform further edits to the media clips (e.g., move the clips around, split the clips, trim the clips, apply effects to the clips, etc.). The length (i.e., horizontal expanse) of a clip in the composite display area is a function of the length of the media represented by the clip. As the composite display area 610 is broken into increments of time, a media clip occupies a particular length of time in the composite display area. As shown, in some embodiments, the clips within the composite display area are shown as a series of images or filmstrip representations. The number of images displayed for a clip varies depending on the length of the clip (e.g., in relation to the timeline 645), as well as the size of the clips (as the aspect ratio of each image will stay constant). As with the clips in the clip browser, the user can skim through the composite presentation or play back the composite presentation. In some embodiments, the playback (or skimming) is not shown in the composite display area's clips, but rather in the preview display area 615.

The preview display area 615 (also referred to as a "viewer") displays images from media files which the user is skimming through, playing back, or editing. These images may be from a composite presentation in the composite display area 610 or from a media clip in the clip browser 605. In some embodiments, the media editing application allows the user to disable clips in a composite presentation based on the assigned roles. For example, the user can disable all clips that are assigned a particular role (e.g., "Video", "Titles", "Dialogue", "Music", etc.). The media editing application then allows the user to play the composite presentation based on only non-disabled clips. This allows the user to hear or see (e.g., in the preview display area 615) what other non-disabled clips are contributing to the composite presentation. An example of disabling different clips based on the assigned roles will be descried in detail below by reference to FIG. 34.

The content inspector 625 displays detailed properties about a selected item and allows a user to modify some or all of these properties. The selected item might be a clip (e.g., a clip from the clip browser 605 or composite display area 610), a composite presentation, an effect, etc. In some embodiments, the content inspector 625 displays different types of information depending on the type of content that is selected. Example of such information includes the assigned role, file format, file location, frame rate, date created, audio information, etc. In some embodiments, the content inspector is a role-editing tool that can be used to modify a role assigned to a clip. For instance, the application's user can input one or more role into the roles field 665. In some embodiments, the role field 665 is a selectable item that when selected causes a list of different roles to be displayed. The user can select any one or more of the roles in the list to assign the selected roles to the clip 655. This list in some embodiments includes an option to create custom roles. Several examples of creating custom roles will be described below by reference to FIGS. 26 and 27.

In the example illustrated in FIG. 6, a clip 655 is selected from the composite display area 610. The selection causes the preview display area 615 to display a preview of the clip 655. In addition, the content inspector 625 displays information about the selected clip 655. This information about the selected media clip includes the clip's role, name, duration, start and end time within the composite presentation.

The additional media display area 630 displays various types of additional media, such as video effects, transitions, still images, titles, audio effects, standard audio clips, etc. In some embodiments, the set of effects is represented by a set of selectable UI items, in which each selectable UI item represents a particular effect. In some embodiments, each selectable UI item also includes a thumbnail image with the particular effect applied. The display area 630 is currently displaying a set of effects for the user to apply to a clip.

The toolbar 640 includes various selectable items for editing, modifying items that are displayed in one or more display areas, etc. The toolbar 640 includes various selectable items for modifying the type of media that is displayed in the additional media display area 630. The illustrated toolbar 640 includes items for video effects, visual transitions between media clips, photos, titles, generators and backgrounds, etc. In addition, the toolbar 640 includes a selectable item that causes the display of the content inspector 625 as well as items for applying a retiming operation to a portion of the timeline, adjusting color, and other functions. The toolbar 640 also includes selectable items for media management and editing. Selectable items are provided for adding clips from the clip browser 605 to the composite display area 610. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

The timeline search tool 620 allows a user to search and navigate a timeline. The timeline search tool 620 of some embodiments includes a search field for searching for clips in the composite display area 610 based on their names or associated keywords. The timeline search tool 620 includes a display area for displaying search results. In some such embodiments, each result is user-selectable such that a selection of the result causes the timeline to navigate to the position of the clip in the timeline. Accordingly, the timeline search tool 620 allows a content editor to navigate the timeline to identify clips.

As shown in FIG. 6, the timeline search tool 620 includes a roles tab 660. When selected, the timeline search tool 620 presents the user with different user interface items for emphasizing and de-emphasizing different pieces of media content in the timeline based on the content's roles. Several examples operations with this timeline search tool will be described below by reference to FIGS. 29-34.

One or ordinary skill will also recognize that the set of display areas shown in the GUI 600 is one of many possible configurations for the GUI of some embodiments. For instance, in some embodiments, the presence or absence of many of the display areas can be toggled through the GUI (e.g., the content inspector 625, additional media display area 630, and clip library 635). In addition, some embodiments allow the user to modify the size of the various display areas within the GUI. For instance, when the display area 630 is removed, the composite display area 610 can increase in size to include that area. Similarly, the preview display area 615 increases in size when the content inspector 625 is removed.

II. Assigning Roles to Media Content During Import

Figure 7:
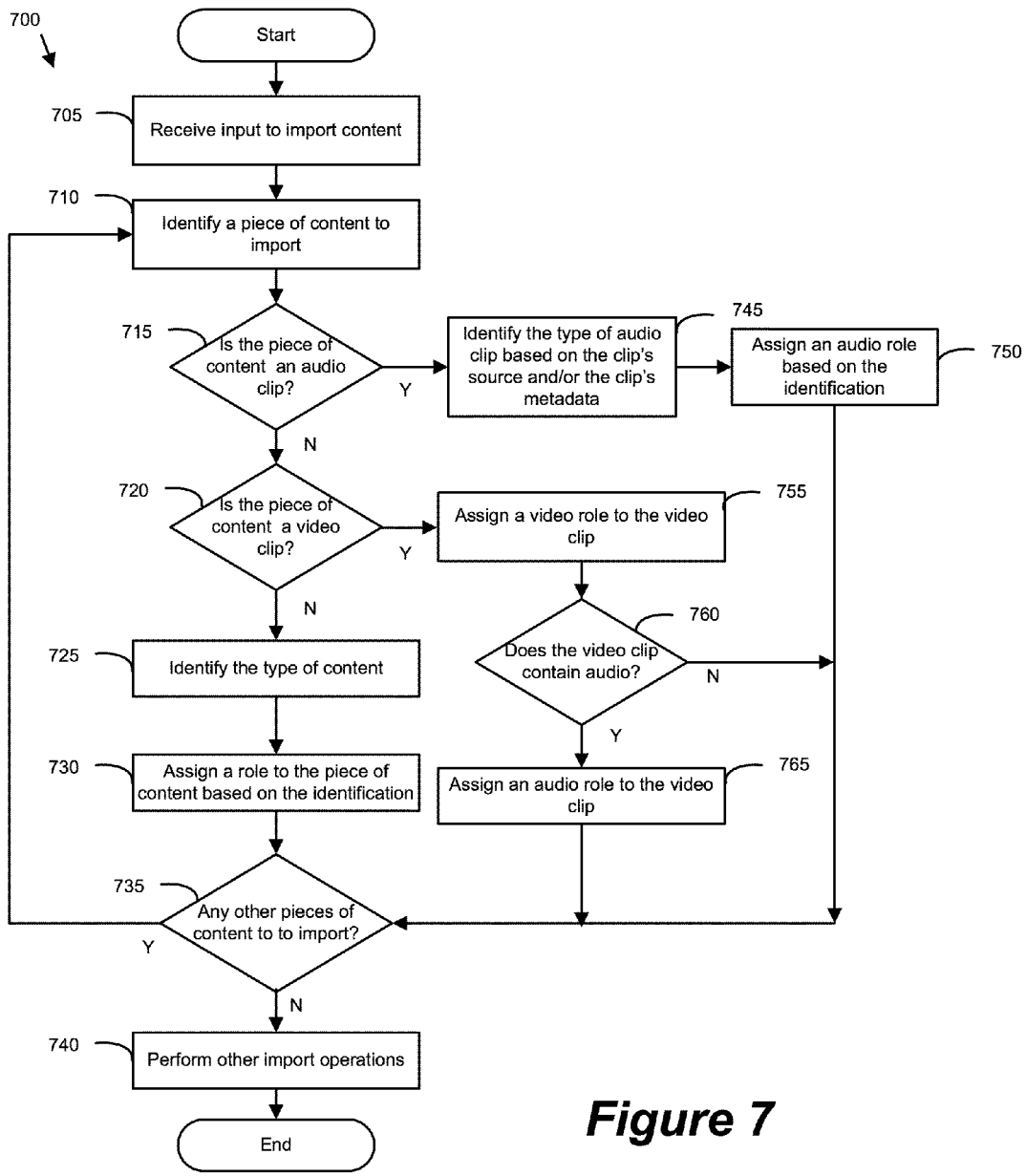
FIG. 7 conceptually illustrates a process that some embodiments perform to assign different roles.
Figure 8:
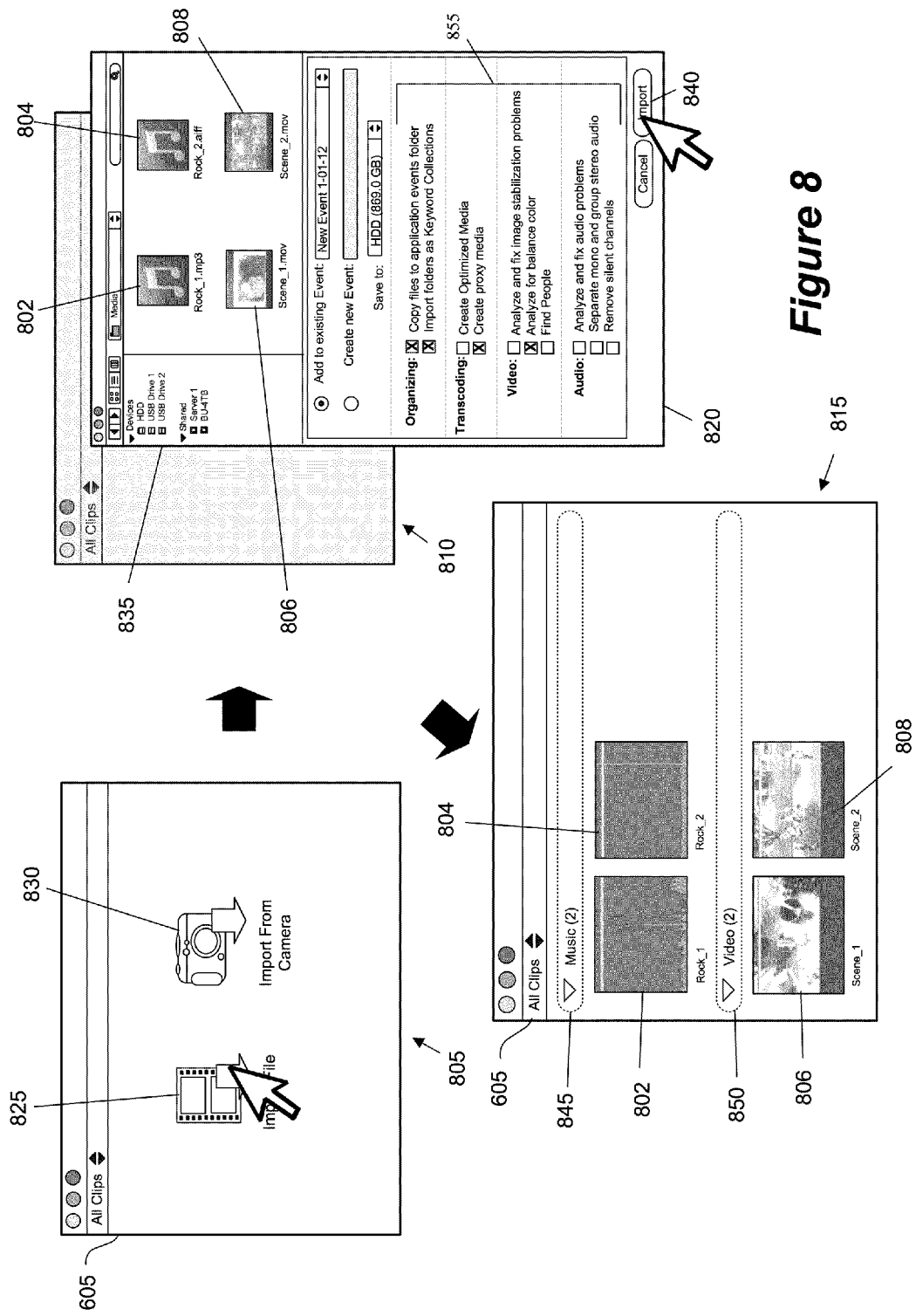
FIG. 8 illustrates an example of importing media clips with the media editing application.

As mentioned above, the media editing application of some embodiments assigns different roles to media content during an import operation. FIG. 7 conceptually illustrates a process 700 that some embodiments perform to assign different roles. The process 700 will be described by reference to FIG. 8. FIG. 8 illustrates in three operational stages 805-815 an example of importing media clips with the media editing application.

The process 700 begins when it receives (at 705) input to import content. As shown in the first stage 805 of FIG. 8, the clip browser 605 does not display any clip representations because no media clips have been imported into the media editing application. The application's user selects an import control 825 to import media clips from the local or network drive. Alternatively, the user can select an import control 830 to import media clips directly from a camera.

The second stage 810 shows the media editing application after the selection of the import control 825. The selection causes an import options window 820 to appear. This window 820 includes a browser 835 for browsing and displaying content to import into the media editing application. Here, the user selects a folder labeled "Media" that contains two audio clips (802 and 804) and two video clips (806 and 808). The user selects an import button 840 to import the clips.

Referring to FIG. 7, once the input is received, the process 700 identifies (at 710) a piece of content to import. The process 700 then determines (at 715) whether the piece of content is an audio clip. When the content is an audio clip, the process 700 identifies (at 745) the type of audio clip based on the clip's source and/or the clip's metadata. Based on the identification, the process 700 assigns (at 750) an audio role to the audio clip.

Different embodiments analyze the clip's metadata differently. The process 700 of some embodiments might analyze the audio clip's (e.g., the MP3 clip's) metadata to identify its ID3 tag. The process 700 may then determine whether the audio clip contains sound effects, music, etc. For example, when the metadata indicates that it contains looped audio, the process 700 may assign an effects role to the audio clip. Also, when the metadata indicates the audio clip include music (e.g., music genre, musical instrument, artist, etc.), the process 700 may assign a "Music" role to the audio clip.

In conjunction with this metadata analysis, or instead of it, the process 700 of some embodiments identifies the source of the audio clip. For example, when the source of the audio clip is a music library, the process 700 of some embodiments assigns a "Music" role to the audio clip. Similarly, if the source of the audio clip is an "Effect" directory (e.g., bin, folder), then the process 700 may assigns an "Effects" role to the audio clip.

After assigning the audio role, the process 700 proceeds to 735, which is described below. When the piece of content is not an audio clip, the process 700 determines (at 720) whether the content is a video clip. When it is a video clip, the process 700 assigns (at 755) a video role to the video content. In some embodiments, any piece of media content that includes at least one image (e.g., a still image) is assigned a video role.

At 760, the process 700 determines whether the video clip includes audio. When the video clip includes audio, the process 700 also assigns (at 765) an audio role to the video clip. Accordingly, the video clip is assigned (at 765) both a video role and an audio role. When the video clip does not include audio, the process 700 proceeds to 735, which is described below. In some embodiments, the process 700 analyzes the metadata of the video clip to assign a video role and/or an audio role. For example, the process 700 might analyze the metadata of a particular clip and determine that it contains both audio content and video content. The process 700 may then assign one of several different default video and audio roles to the particular clip. For example, in some embodiments, the process 700 automatically assigns a "Video" role and a "Dialogue" role to each video clip that contains audio. However, different embodiments may assign a different set of roles to the video clip.

Referring to FIG. 8, the third stage 815 shows the clip browser 605 after importing the audio and video clips 802-808. In particular, this stage 815 illustrates that the media editing application has assigned one or more roles to each clip. The two audio clips 802 and 804 have been assigned an audio role (i.e., "Music" role), while the two video clips 806 and 808 have been assigned a video role (i.e., "Video" role). This is shown in the clip browser 605 as the clips are categorized into different groups according to the assigned roles. Specifically, the two audio clips 802 and 804 are grouped under a "Music" role heading 845. Also, the two video clips 806 and 808 are grouped under a "Video" role heading 850.

As shown in FIG. 7, the process 700 identities (at 725) a type of content (e.g., other than the audio and video type) for the piece of content. For example, the piece of content may not be a video clip or an audio clip but an image, annotations, subtitles, closed-caption, etc. Based on the identification, the process 700 assigns (at 730) a role to the piece of content. For example, the process 700 of some embodiments assigns a language role (e.g., "Spanish" role, "English" role, etc.) for pieces of content that includes text.

The process 700 determines (at 735) whether there is another piece of content to import. When there is another content, the process 700 returns to 710, which is described above. Otherwise, the process 700 performs other import operations. Referring to FIG. 8, the media editing operation can perform several different operations when importing content. This is shown with the import tool 820 that lists several selectable options 855. These options include (1) copying files to a media editing application folder or collection, (2) importing the folders (e.g., such as the "Media" folder) as keyword collections, (3) transcoding by creating optimized media for the imported content, (4) transcoding by creating proxy media for the imported content, (5) analyzing video content for stabilization and/or rolling shutter, (6) analyzing the video content for balance color, (7) analyzing the video content to find people, (8) consolidating find people results, (9) creating smart collections after analysis, (10) analyzing and fixing audio problems, (11) separating mono and group stereo audio, and (12) removing silent channels. In some embodiments, several of these operations are performed as background tasks after importing the content into the media editing application.

As shown in FIG. 7, the process 700 ends after performing the other import operations. Some embodiments perform variations on process 700. For example, the specific operations of process 700 may not be performed in the exact order shown and described. The specific operations may not be performed in one continuous series of operations, and different specific operations may be performed in different embodiments. For example, the process of some embodiments analyzes different types of data to assign one or more roles to a piece of media content. These types of data includes camera specific data, proprietary metadata, closed captioning, spotlight extracted metadata (e.g., metadata extracted for searching and indexing), etc. In essence, any data associated with a piece of media content can be scraped and analyzed for additional information that might assist in determining the content's role. The analysis can be extended to voice recognition, ambient noise analysis, etc. For example, such audio signal analysis can determine if the audio is someone speaking, was recorded outdoors or indoors, came from a boom mike, etc.

III. Roles Integration

The previous section described examples of how the media editing application of some embodiments associates different roles to the content that it imports. In some embodiments, the media editing application organizes the content based on the assigned roles. Instead of, or in conjunction with this organization feature, the media editing application of some embodiments allows the clips to be search using the assigned roles. Several such examples will now be described by reference to FIGS. 2-16.

A. Organizing Clips by Assigned Roles

Figure 9:
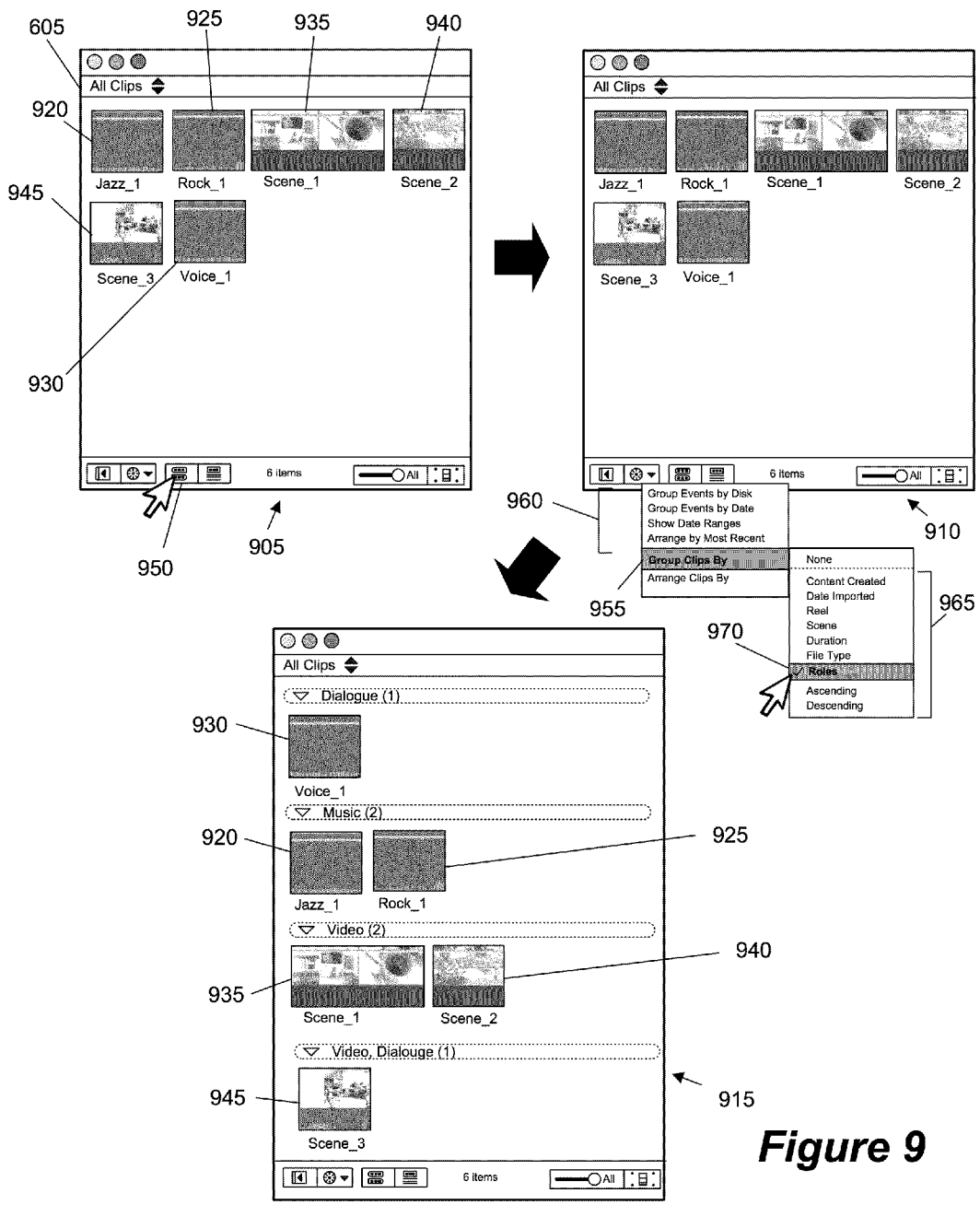
FIG. 9 provides an illustrative example of the role-facilitated editing features are integrated into the clip browser.

FIG. 9 provides an illustrative example of how the roles are integrated into the clip browser. Specifically, this figure shows in three operational stages 905-915 how the media editing application displays the roles assigned to clips in the clip browser 605. The clip browser 605 is the same as the one described above by reference to FIG. 6.

The first stage 905 illustrates the clip browser 605 displaying several media clips imported into the media editing application. Specifically, the clip browser 605 displays three audio clips 920-930 and three video clip 935-945. The video clips 935 and 940 do not include audio content, while the video clip 945 includes audio content. This is shown in the clip browser 605 as the representation of the video clip 945 includes a waveform that indicates the signal strength of the video clip's audio at different instances in time, while each of the other two video clips 935 and 940 does not include such waveform or includes one that is blank.

As shown in FIG. 9, the media editing application includes a grouping tool 950 for grouping and/or arranging clips in the clip browser 605. In the first stage 905, the user selects the grouping tool 950 to group the clips in the clip browser 605 into different groups.

The selection of the grouping tool causes the media editing application to display a drop-down list 955 of different grouping options, as illustrated in the second stage 910. The drop-down list 955 includes a first set of options 960 for grouping collections (e.g., events, bins, folders) in a clip library (not shown) and a second set of options 965 for grouping clips in the clip browser. Specifically, the first set of options 960 includes options for (1) grouping collections by disk, (2) grouping collections by date, (3) showing date ranges in the clip library, and (4) arranging collections by most recent. The second set of options 965 includes options for grouping the clips in the clip browser by content created, date imported, reel, scene, duration, file type, roles, etc. There is also an option to display the clips by ascending or descending order. To group the clips 920-945, the user selects a "Roles" option 970 from the drop-down list 955.

The third stage 915 illustrates the clip browser after grouping the clips 920-945 by different roles. As shown, each of the audio clips 920-930 is grouped under a particular audio role heading (i.e., "Music" or "Dialogue"), and each of the video clips 935-945 is grouped under a "Video" role heading. In the example illustrated in FIG. 9, the video clip 945 has a dual role as it includes both video and audio. This is shown in the third stage 915 as the video clip 945 is grouped under a heading that includes both a video role and an audio role (i.e., "Video, Dialogue"). Each of the headings also indicates the number of clips that are in the particular group. For example, as there are two audio clips 920 and 925 assigned the "Music" role, the number two is displayed adjacent to the "Music" role heading.

Figure 10:
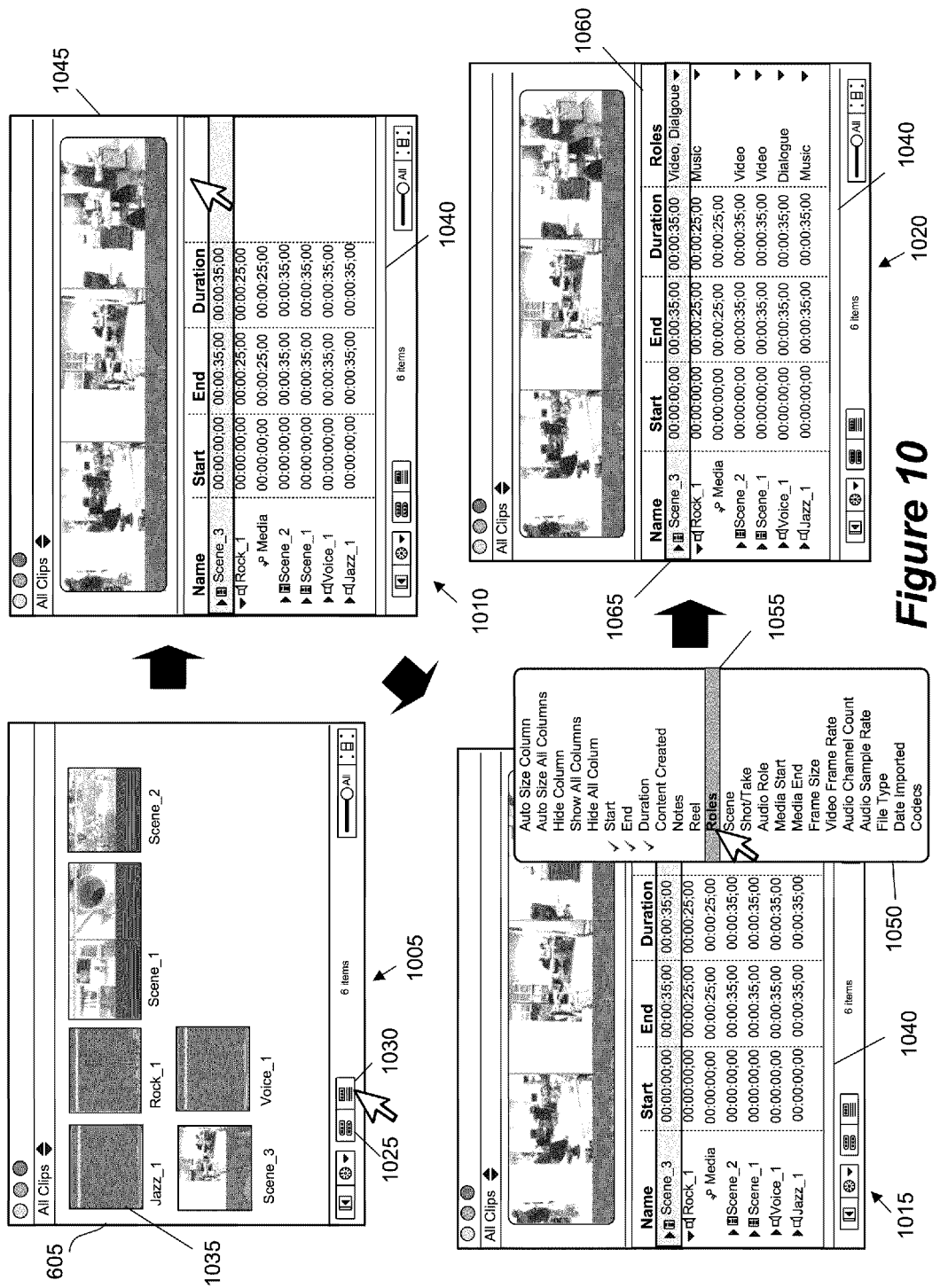
FIG. 10 provides an illustrative example of a list view that displays the roles that are assigned to different media clips.

In some embodiments, the media editing application provides a list view that displays clips as a list of clips with information related to each clip. The list view in some embodiments allows users to view and modify roles associated with the clips. FIG. 10 provides an illustrative example of such a list view. Four operational stages 1005-1020 of the media editing application are illustrated in this figure. The clip browser 605 is the same as the one described above by reference to FIG. 6. As shown, the media editing application includes a clip view control 1025 for switching to a clips view (e.g., a filmstrip view) and a list view control 1030 for switching to a list view.

The first stage 1005 illustrates the clip browser 605 displaying representations of media clips in a clips view (e.g., filmstrip view). This is shown with each clip being displayed only with its representation (e.g., filmstrip representation, waveform representation) and name. For example, the audio clip 1035 is represented in the clip browser 605 by a thumbnail image that represents the clip's waveform. Also, the name of the audio clip 1035 is displayed below the thumbnail image. The media editing application further indicates that the clip browser 605 is displaying clips in the clips view as the clips view control 1025 for switching to the clips view is highlighted. To switch from the clips view to the list view, the user selects the list view control 1030.

The selection of the list view control 1030 causes the clips in the event browser to be displayed in a list, as illustrated in the second stage 1010. The list view includes a list section 1040 and a preview section 1045. The preview section 1045 in some embodiments displays a filmstrip and/or waveform representation of a media clip selected from the list section 1040. In the example illustrated in FIG. 10, the list section 1040 displays the clips in a list along with information related to the clips. Specifically, the list section 1040 displays the name of each clip, the clip's start and end times, and the clip's duration. The information is displayed in different columns with a corresponding column heading (e.g., name, start, end, duration). The user can sort the clips in the list by selecting any one of the different column headings. Each column can also be resized (e.g., by moving column dividers in between the columns). In addition, the columns may be rearranged by selecting a column heading and moving it to a new position.

In some embodiments, the media editing application allows the user to choose what type of information is displayed in the list view. For example, when a column heading is selected (e.g., through a control click operation), the media editing application of some embodiments presents a list of different types of information that the user can choose from.

The second stage 1010 shows the selection of a column heading of the list section 1040 (e.g., through a control click operation). The selection causes the media editing application to display a list of different information 1050. With this list, the user can choose different types of information that are displayed in the list section 1040. As shown in FIG. 10, the type of information or metadata includes start time, end time, duration, content creation date, notes, reel, scene, shot/take, audio role, media start, media end, frame size, video frame rate, audio channel count, audio same rate, file type, date imported, and codec. However, depending on the type of content (e.g., document, image), the list 1050 can include other types of information. To displays the one or more roles associated with each clip, the user selects the "Roles" 1055 from the list 1050.

As shown in the fourth stage 1020, the selection of the "Roles" 1055 causes the list section 1040 to display a separate column 1060 for roles. In the example illustrated in FIG. 10, the roles column 1060 lists one or more roles assigned to each clip in the clip browser 605. For example, the video clip 1065 is listed as being associated with a "Video" role and a "Music" role. In some embodiments, the roles listed in the roles column 1060 are selectable items that can be used to modify the roles associated with the clips in the list view. Several examples of modifying roles in the list view will be described below by reference to FIGS. 17 and 18.

B. Searching for Clips Using Assigned Roles

Figure 11:
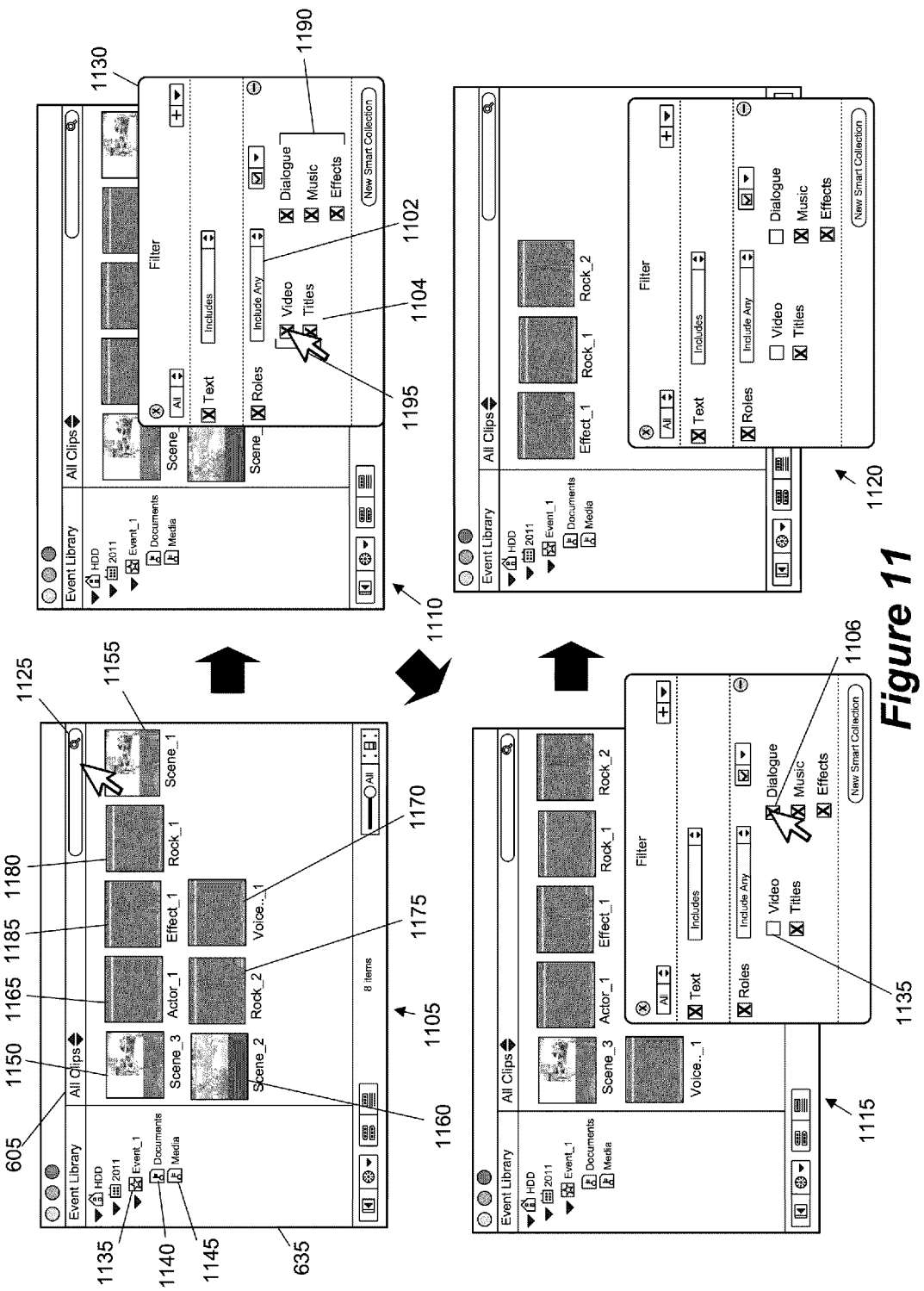
FIG. 11 provides an example of searching for clips based on the clips' assigned role.

In several of the examples described above, the media editing application organizes clips into different groups based on the clip's assigned roles. In some embodiments, the media editing application allows the user to search for clips based on the assigned roles. FIG. 11 provides an example of such role-based search feature. Specifically, this figure illustrates in four operational stages 1105-1120 how the clip browser can be used to search for clips based on the roles assigned to the clips. The figure includes the clip browser 605 and clip library 635 that have been described above by reference to FIG. 6. The media editing application also includes a search control 1125 for searching clips.

In the first stage 605, the clip library 635 displays a collection 1135 (e.g., folder, bin). The collection 1135 includes two other collections 1140 and 1145. In some embodiments, each of these other collections 1140 and 1145 is a keyword collection that contains different ranges of media clips from the collection 1135 that has been tagged with a particular keyword. For instance, the "Media" collection 1140 includes different ranges of media clips tagged with the keyword "Media".

As shown in the first stage 1105, the clip browser 605 displays several media clips 1150-1185 that are part of the collection 1135. Each of these clips is assigned one or more roles. For example, the video clip 1150 is assigned both the "Dialogue" role and the "Video" role, while the two other video clips 1155 and 1160 are assigned the "Video" role. In addition, the audio clips 1165 and 1170 are assigned the "Dialogue" role, while the other audio clips 1175-1185 are assigned some other audio roles (e.g., the "Music" role, the "Effects" role).

In the first stage 1105, the user selects the search control 1125 to search for clips in the collection 1135. Alternatively, the user can select another collection (e.g., 1140, 1145) to search for clips in the selected collection or search for clips at a higher level (e.g., at the disk level). The selection of search control 1125 causes a filter tool 1130 to be displayed.

The second stage 1110 shows the filter tool 1130. The filter tool 1130 displays different audio and video roles as user selectable items. Specifically, the audio roles include "Dialogue", "Music", and "Effect", and the video roles include "Video" and "Titles". The user can select any one or more of the selectable items (e.g., uncheck one or more check boxes) associated with the roles to filter the clip browser 605 by removing any clips assigned to those roles. In addition, one or more of the selectable items can be re-selected to displays the clips assigned to those roles.

As shown in FIG. 11, the filter tool 1130 includes a control 1102 for modifying how the clips are filtered in the clip browser. The user can select this control 1102 to modify the search to include each clip that is assigned all the selected roles. For instance, the user can select several items to find clips that are assigned multiple roles that correspond to the selected items. In the example illustrated in FIG. 11, the control 1102 is set to search for clips that are assigned any one of the selected roles. In some embodiments, the filter tool includes other controls to search for clips using other search parameters such as clip names, clip metadata, keywords, etc.

In the second stage 1110, the user selects the selectable item 1104 (e.g., unchecks the checkbox) associated with the "Video" role. The selection causes the media editing application to filter the clip browser 605 by excluding each clip that is assigned only the "Video" role. This is illustrated in the third stage 1115 as the two "Video" clips 1155 and 1160 are removed from the clip browser 605. However, the video clip 1150, which is also associated with another role (i.e., the "Dialogue" role), is not removed from the clip browser 605, as it is shown in the figure.

In the third stage 1115, the user selects the selectable item 1106 (e.g., unchecks the checkbox) associated with the "Dialogue" role. As shown in the fourth stage 1120, the selection causes the media editing application to filter the clip browser 605 by excluding each clip that is assigned the "Dialogue" role. Specifically, the audio clips 1165 and 1170, which are assigned the "Dialogue" role, are removed from the clip browser 605. As both the "Dialogue" and "Video" roles are filtered out, the video clip 1150 is also removed from the clip browser 605.

In some embodiments, the media editing application allows its users to create smart collections according to different role-based filters. For example, when a search is performed, the media editing application of some embodiments allows the user to save result by creating a new smart collection. Smart collections are dynamic collections because their contents change according to the search results. For example, upon several additional clips being assigned the "Dialogue" role, a smart collection associated with the role is dynamically updated to include those additional clips. In other words, each smart collection is associated with a particular filter or filter set that defines its content (i.e., the search results).

Figure 12:
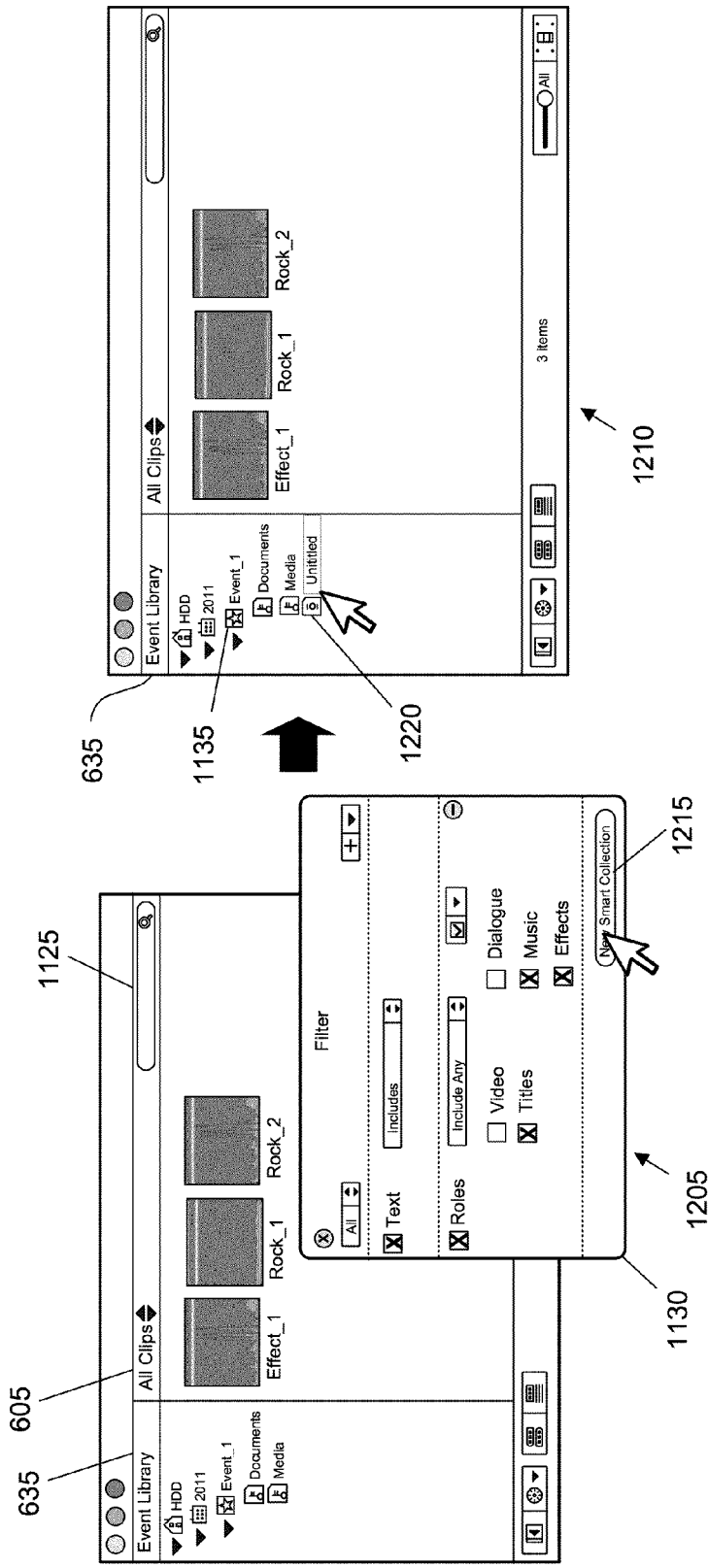
FIG. 12 provides an illustrative example of creating a smart collection using different roles.

FIG. 12 provides an illustrative example of creating a smart collection using different roles. Two operational stages 1205 and 1210 are illustrated in this figure. In the first stage 1205, the filter tool has been activated with the user selecting the search tool 1125. As shown, the filter tool 1130 is used to filter the clip browser 605 to display clips that are assigned the "Music", "Effects", and "Titles". Specifically, the clips that are assigned only the "Video" role, only the "Dialogue" role, or both the "Video" and "Dialogue" roles (and without any other role) have been excluded from the clip browser 605. The clips that are assigned any one of the "Music", "Effect" and "Titles" are still shown in the clip browser as part of the search result.

As shown in FIG. 12, the filter tool 1130 includes a button 1215. The user can select this button 1215 to create a new smart collection according to the search or filter specified with the filter tool 1130. In the first stage 1205, the user selects the button 1215 to create the new smart collection. Specifically, the filter tool 1130 indicates that the new smart collection should include each clip that is assigned any one of the "Titles", "Music", and "Effects" role.

The second stage 1210 illustrates the media editing application after the selection of the button 1215. The selection causes a new smart collection 1220 to be shown in the clip library 635. In the example illustrated in FIG. 12, the smart collection 1220 is created under the collection 1135. This is because the search or filter is based on the contents of the collection 1135. However, different smart collections can be created at different levels. For example, a new smart collection can be created at a sub-collection level or at the disk level, in some embodiments.

As shown in second 1210, the smart collection 1220 is given a default name. Here, the user can input another name for the smart collection 1220. The user can also select this new smart collection 1220 at any time to see all of the clips in the collection 1135 that satisfy the search criteria or pass the filter. In the example illustrated in FIG. 12, the smart collection is defined to include all clips that are assigned any one of the "Titles", "Music", and "Effects" roles.

In some embodiments, the media editing application treats smart collections similar to folders. That is, the application's users can rename them, delete them, etc. The media editing application of some such embodiments prevent users from adding content by dragging and dropping items onto them. Instead, the media editing application allows the users to modify the content of the smart collections by modifying the filters or search criteria.

In the previous example, the filter tool 1130 is used to define a filter for a new smart collection. This filter tool is displayed when the user selects the search control 1125. In some embodiments, the same or similar filter tool is displayed when the user selects a menu item, a toolbar button, shortcut key, etc. For example, the media editing application of some embodiments displays the filter tool when an area of the clip library or clip browser is selected and a new smart collection option is selected from a context menu.

C. Example Data Structures

In the examples described above, the media editing application displays the media clips in the clip browser based on the assigned roles. The media clips can also be searched using the assigned roles. To facilitate such role-based displaying and searching features, the media editing application of some embodiments uses several different data structures.

Figure 13:
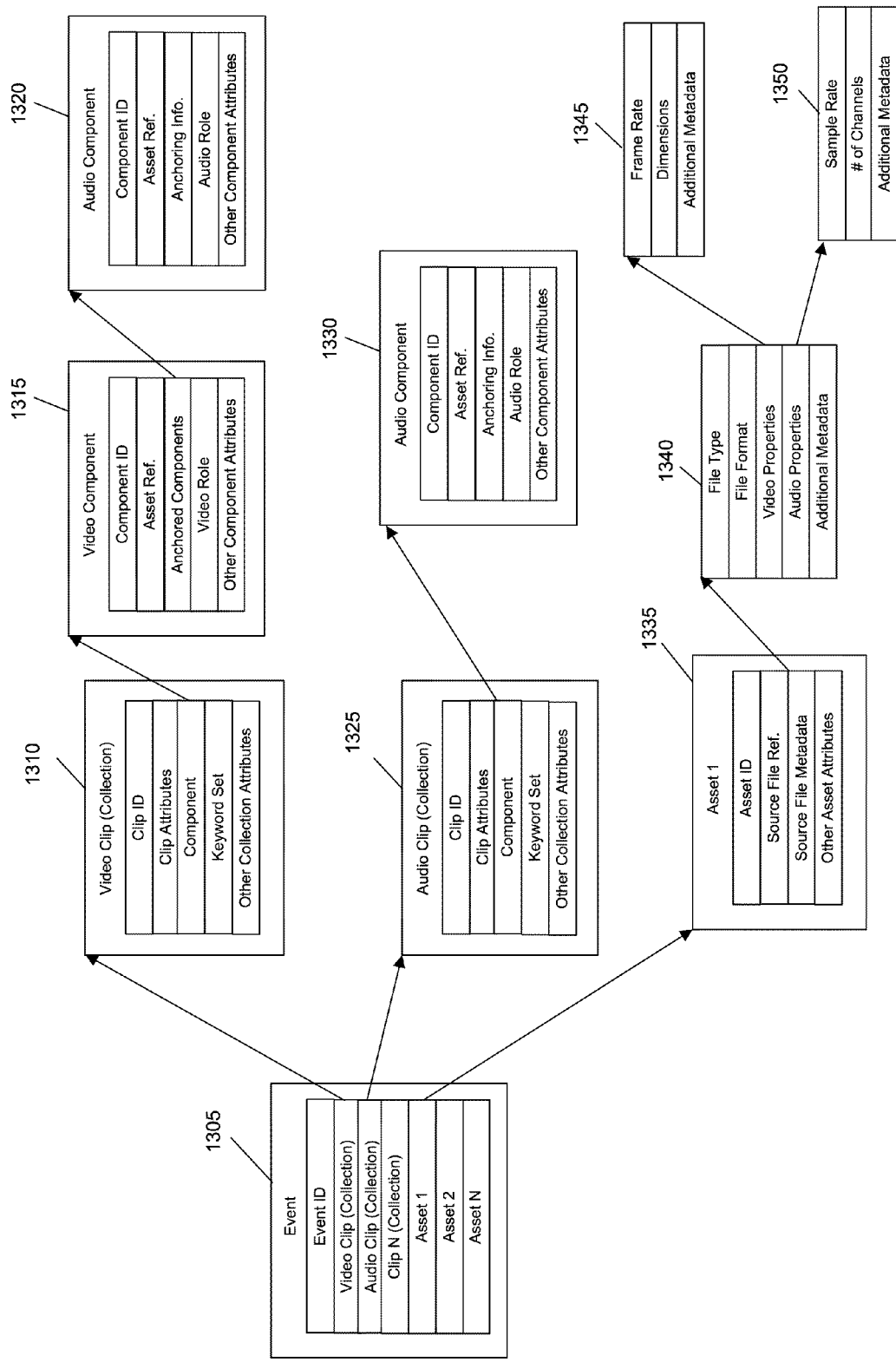
FIG. 13 conceptually illustrates example data structures of several objects that are associated with the media editing application.

FIG. 13 conceptually illustrates example data structures for several objects associated with the media editing application. Specifically, this figure illustrates the relationships between these objects that allow content to be searched and/or displayed based on the assigned roles. As shown, the figure illustrates an event object 1305, a video clip object 1310, and an audio clip object 1325. The video clip object 1310 is associated with a video component 1315 and an audio component 1320. The audio clip object 1325 is associated with an audio component 1330. In some embodiments, one or more of the objects in this figure are subclasses of other objects. For example, in some embodiments, the video clip object 1310 (i.e., collection object) and the component objects 1315, 1320, and 1330 are all subclasses of a general clip object.

The event object 1305 of some embodiments represents a folder or collection (e.g., "Event" collection) in the clip library (as described above). When selected from the clip library, the media editing application of some embodiments displays its content in the clip browser. In the example illustrated in FIG. 13, the event object 1305 includes an event ID and a number of different clip collections (including the clip objects 1310 and 1325). The event ID is a unique identifier for the event object 1305. In some embodiments, the different clip collections represent clips that are displayed in the clip browser.

The data structure of the event object 1305 may include additional fields in some embodiments, such as the event name, event date (which may be derived from an imported clip), etc. The event data structure may be a Core Data (SQLite) database file that includes the assets and clips as objects defined with the file, an XML file that includes the assets and clips as objects defined with the file, etc.

The video clip object 1310 or collection object, in some embodiments, is an ordered array of clip objects. This clip object in some embodiment represents a media clip imported in the media editing application. That is, when the media clip is imported, the media editing application of some embodiments defines this object by populating the data structures of this object and the object's associated components (e.g., 1315 and 1320).

In the example illustrated in FIG. 13, the clip object stores one or more component clips (e.g., the video component 1315) in the array. In addition, the clip object 1310 stores a clip ID that is a unique identifier for the clip object. In some embodiments, the clip object 1310 is a collection object that can include different components as well as additional collection objects. In some embodiments, the video clip object 1310 only stores the video component clip in the array, and any additional components (generally one or more audio components) are then anchored to that video component.

As shown in FIG. 13, the video clip object 1310 also includes a keyword set. In some embodiments, the keyword set represents one or more keywords that are associated with the video clip. For example, the media editing application of some embodiments allows the application's user to tag different ranges of a media clip with keywords.

The video component object 1315 represents the video content associated with the video clip object 1310. In some embodiments, the video role of an imported media clip is stored at the component level. This is illustrated in FIG. 13 as the video component object includes a role attribute (e.g., a video role attribute). In some embodiments, the media editing application identifies this role attribute when it is displaying clips or searching for clips based on the assigned roles.

The media editing application of some embodiments automatically populates this role attribute with a particular video role when importing a media clip (e.g., video clip) into the media editing application. The media editing application of some embodiments allows the user to modify this role attribute with another role such as a custom role. In some embodiments, a role can be a parent role have multiple sub-roles. In some such embodiments, the media editing application allows media clips to be identified by their sub-role as well as the sub-role's parent role. Several examples of modifying roles and creating custom roles will be described in detail below by reference to FIGS. 17-28.

In the example illustrated in FIG. 13, the video component 1315 also includes a component ID, an asset reference, a reference to each of its anchored components (e.g., the audio component 1320), and a set of other attributes. The component ID identifies the component. The asset reference of some embodiments stores an event ID and an asset ID, and uniquely identifies a particular asset object (e.g., the asset object 1335). In some embodiments, the asset reference is not a direct reference to the asset but rather is used to locate the asset when needed. For example, when the media-editing application needs to identify a particular asset, the application uses the event ID to locate the event that contains the asset, and then the asset ID to locate the particular desired asset.

As mentioned above, the video clip object 1310 of some embodiments only stores the video component clip in its array, and any additional components (generally one or more audio components) are then anchored to that video component. This is illustrated in FIG. 13 as the video component 1315 is associated with the audio component 1320.

The audio component 1320 represents the audio content associated with the video clip object 1310. Similar to the video component 1315, the audio component 1320 includes a component ID, an asset reference, and a set of other component attributes. The component ID identifies the component. The asset reference of some embodiments stores an event ID and an asset ID, and uniquely identifies a particular asset object. In some embodiments, each component that is anchored to another clip or collection stores an anchor offset that indicates a particular instance in time along the range of the other clip or collection. That is, the anchor offset may indicate that the component is anchored x number of seconds and/or frames into the other clip or collection. These times refer to the trimmed ranges of the clips in some embodiments. This is shown in FIG. 13 as the audio component 1320 includes an anchoring information attribute.

In some embodiments, the clip's audio role is stored at the component level. FIG. 13 illustrates this as the audio component 1320 includes an audio role. Similar to the video role, the media editing application of some embodiments automatically populates this role attribute with a particular audio role when importing a media clip (e.g., video clip) into the media editing application. In some embodiments, the media editing application identifies this role attribute when it is displaying clips or searching for clips based on the assigned roles.

In some embodiments, the audio clip object 1325 is a collection object that is similar to the video clip object 1310. That is the audio clip is an ordered array of clip objects with similar or same attributes (e.g., clip ID, clip attributes, keyword set, etc.). The audio clip object stores one or more component clips in the array. In the example illustrated in FIG. 13, the audio clip object 1325 represents an audio clip as it includes a reference to the audio component 1330. Several example attributes of such an audio component has been described above by reference to the audio component 1320.

As shown in FIG. 13, the asset object 1335 includes an asset ID, reference to a source file, a set of source file metadata, and a set of other asset attributes. The asset ID identifies the asset, while the source file reference is a pointer to the original media file. As shown, the source file metadata 1340 includes the file type (e.g., audio, video, movie, still image, etc.), the file format (e.g., ".mov", ".avi", etc.), a set of video properties 1345, a set of audio properties 1350, and additional metadata. The set of video properties includes 1345 includes frame rate, dimensions, and additional metadata. The set of audio properties 1350 includes a sample rate, a number of channels, and additional metadata. Some embodiments include additional properties, such as encoding info, the file creation date (i.e., the date and/or time at which the media was captured (e.g., filmed, photographed, recorded, etc.)).

In some embodiments, a set of metadata from the source file metadata 1340 is displayed in the clip browser (e.g., as part of the list view). The data structure of the asset object 1335, as well as several other objects, may be populated when the source file is imported into the media editing application. In some embodiments, the asset object 1335 additionally store override data that modifies one or more of the video or audio properties. For instance, a user might enter that a media file is actually 1080p, even though the file's metadata, stored in the asset object, indicates that the video is 1080i. When presented to the user, or used within the application, the override will be used and the media file will be treated as 1080p.

One of ordinary skill will also recognize that the objects and data structures shown in FIG. 13 are just a few of the many different possible configurations for implementing the role-facilitated editing features of some embodiments. For instance, in some embodiments, instead of the clip object indirectly referencing a source file, the clip object may directly reference the source file. Also, the roles may be assigned at the clip level instead of at the component level. For example, the video clip 1310 may be assigned the video role and/or the audio role instead of these roles being assigned to the video component 1315 and the audio component 1320.

C. Composite Display Area

Figure 14:
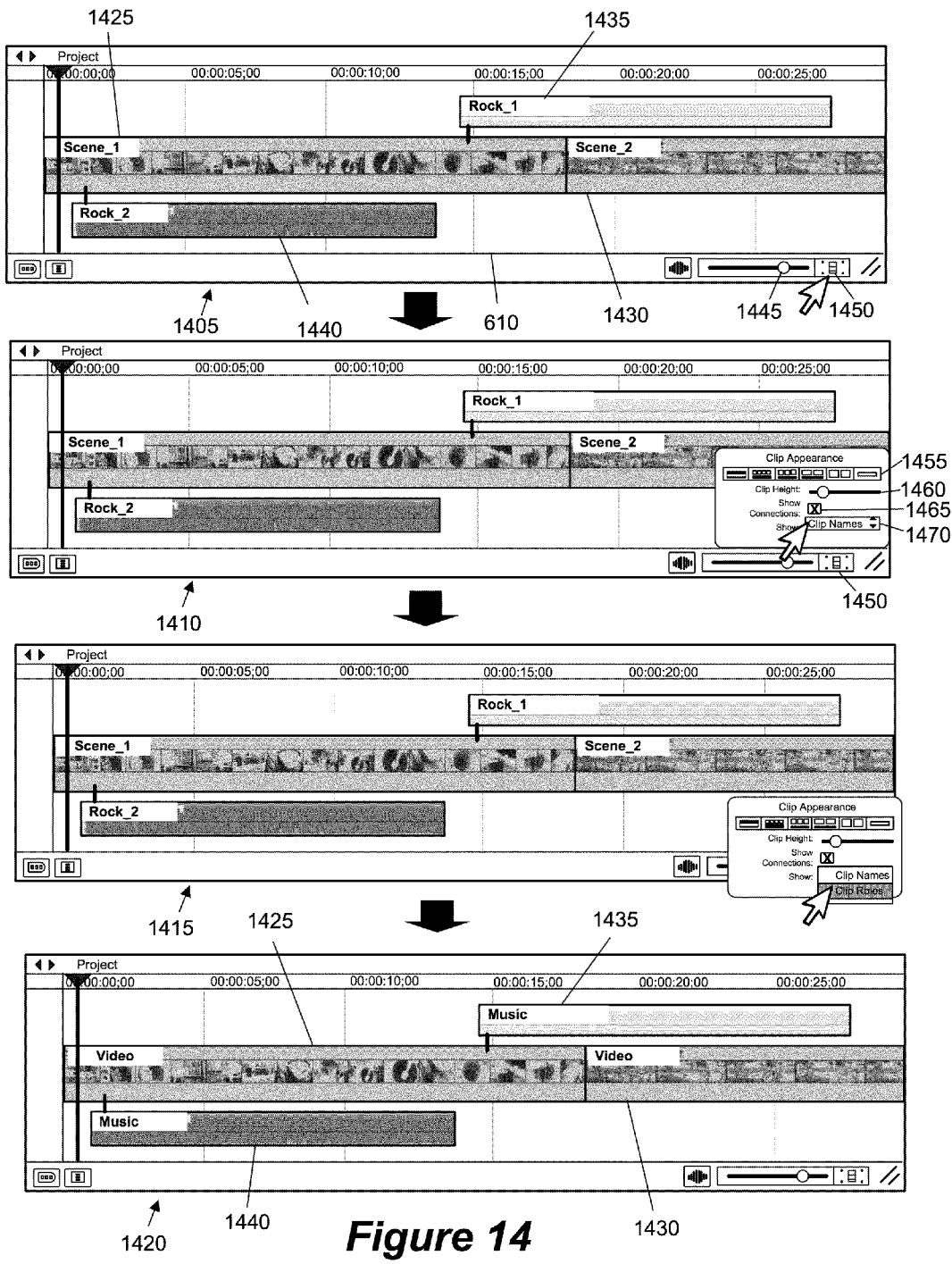
FIG. 14 illustrates an example of switching from displaying clip names to role names in a composite display area.

The previous examples described several role-based operations performed with the clip browser. In some embodiments, the media editing application allows its users to view the clips' roles in the composite display area. FIG. 14 illustrates an example of displaying different roles. Specifically, this figure illustrate in four operational stages 1405-1420 how the media editing application switches from displaying clip names to role names in the composite display area 610. The composite display area 610 is the same as the one described above by reference to FIG. 6.

The first stage 1405 illustrates the composite display area 610 displaying representations of media clips in a composite presentation. The user might have added these clips by dragging and dropping them from the clip browser (not shown) to the composite display area 610. Alternatively, the user might have selected one or more of these clips from the clip browser and selected a shortcut key.

As shown in the first stage 1405, the composite display area 610 displays representations of two video clips (1425 and 1430) and two audio clips (1435 and 1440). Specifically, each clip is displayed with its name. For example, the representation of the video clip 1425 includes the clip's name (i.e., "Scene_1"). Also, the representation of the audio clip 1435 includes the clip's name (i.e., "Rock_2"). Here, the two video clips (1425 and 1430) are displayed as filmstrip representations that include several frames from the corresponding video clips. Different from the video clips, the two audio clips (1435 and 1440) are displayed as waveform representations that indicate the signal strength of the corresponding audio clips at different instances of time. In some embodiments, if the video clip includes audio content, the video clip's representation includes both the filmstrip and waveform.

In the example illustrate in FIG. 14, the media editing application includes several controls for changing how clips are presented in the composite display area 610. The media editing application includes a slider 1445 for adjusting the zoom level of the composite display area 610 and a clip appearance tool 1450 for changing the appearance of the clip in the composite display area. In some embodiments, the movement of the slider 1445 along one direction increases the amount of time represented in the composite display area, while the movement along the opposite direction decreases the amount of time represented in the composite display area. Accordingly, the movement of the slider causes each clip representation to expand or contract horizontally, which in turn displays more or less detail (e.g., more frames, less frames) about the clip. Different from the zoom level slider 1445, the appearance tool 1450 includes different selectable items for modifying the appearance of the clip representation without adjusting how much time is represented in the composite display area 610.

The second stage 1410 illustrates the media editing application after the selection of the appearance tool 1450. As shown, the selection causes the media editing application to display different controls for modifying the appearance of the clips in the composite display area 610. The control includes (1) a set of buttons 1455 for displaying the clip's waveform or frames, (2) a slider 1460 for changing the clip's height, (3) a checkbox 1465 for specifying whether connections between two clips are shown, and (4) a field 1470 or selectable list for switching between displaying clip and role names in the composite display area 610.

In the third stage 1415, the user selects the field 1470 to switch from displaying clip names to role names. The fourth stage 1420 illustrates the composite display area 610 after switching to role names. As shown, the selection causes the media editing application to display the different roles that are assigned to the clips (1425-1440). Specifically, the names of the two video clips (1425 and 1430) are replaced by the "Video" role, and the names of the two audio clips (1435 and 1440) are replaced by the "Music" role. This allows the application's user to easily identify what roles are assigned to the clips in the composite display area 610. In some embodiments, the media editing application displays both the clip name and the role for each clip. For example, instead of replacing the clip name with the role name, the media editing application of some embodiments might display the role name adjacent to the clip name.

Figure 15:
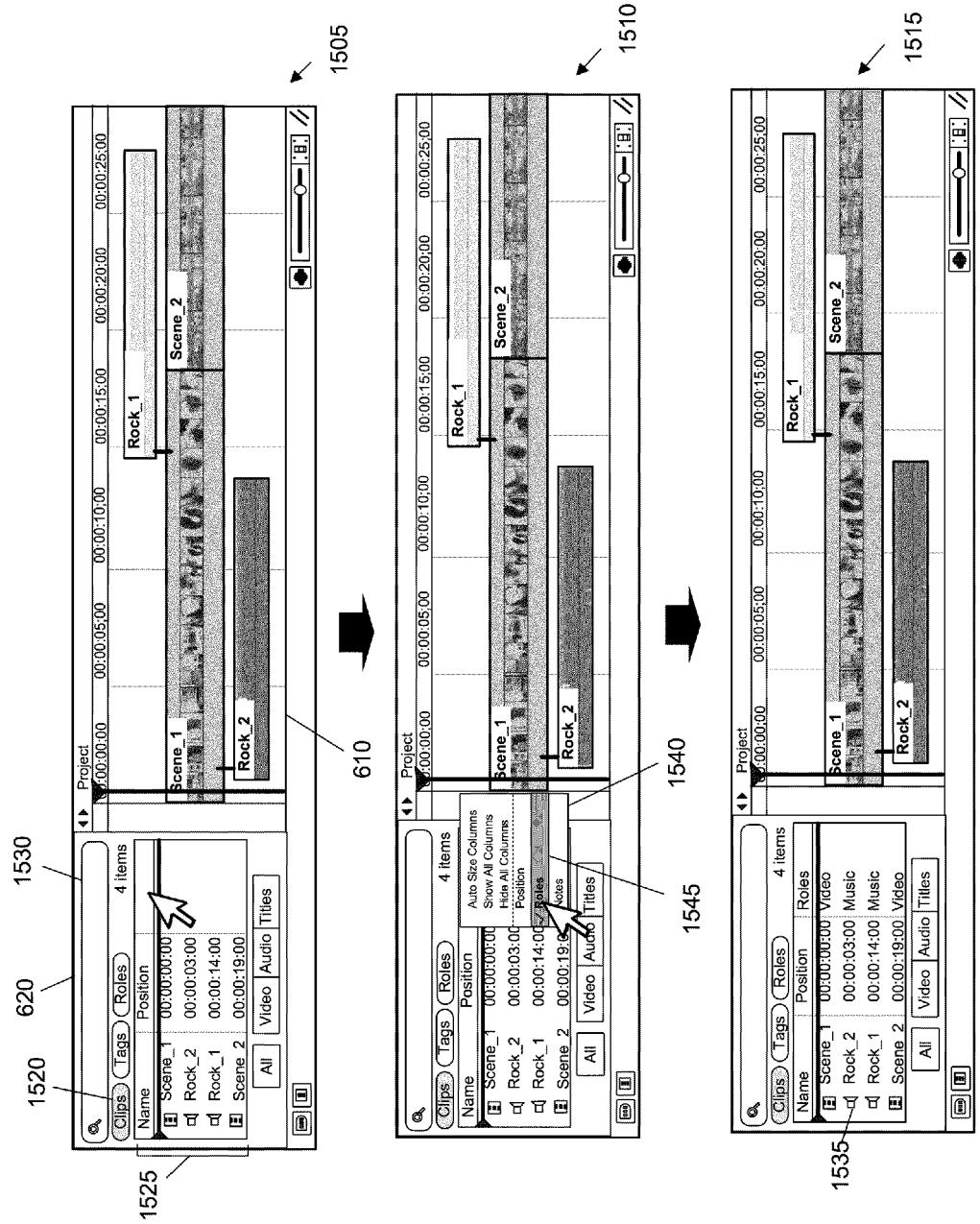
FIG. 15 illustrates displaying assigned roles in a timeline search tool.

In the above example, the media editing application switches from displaying clip names to roles names in the composite display area 610. The media editing application of some embodiments provides a timeline search tool that displays different roles that are assigned to clips in the composite display area 610. FIG. 15 illustrates displaying assigned roles in the timeline search tool 620. Three operational stages 1505-1515 of the media editing application area illustrated in this figure. This figure includes the timeline search tool 620 and the composite display area 610 that are the same as the ones described above by reference to FIG. 6.

The first stage 1505 illustrates the timeline search tool 620 displaying clips in the composite display area 610. Specifically, as the clips tab 1520 is selected, the timeline search tool is in a clips mode that displays a list of all clips 1525 in the composite display area 610. The user can filter this list by inputting a search parameter in the search field 1530. In the list 1525, the timeline search tool 620 displays a corresponding name and starting position for each clip in the composite display area 610. The starting point of a clip represents a particular point in time when the clip is presented in the composite presentation.

As shown in the first stage 1505, the clip information is displayed in different columns with a corresponding column heading (i.e., name and position). The user can sort the clips in the list 1525 by selecting any one of the column headings. Each column can also be resized (e.g., by moving column dividers in between the columns). In addition, the columns may be rearranged by selecting a column heading and moving it to a new position.

In some embodiments, the timeline search tool 620 allows a user to choose what types of information is displayed in the list 1525. For example, when a column heading is selected (e.g., through a control click operation), the media editing application of some embodiments displays a list of different types of information from which the user can choose. The first stage 1505 shows the selection of a column heading of the timeline search tool 620.

The selection causes the media editing application to display a context menu 1540 as illustrated in the second stage 1510. As shown, this menu 1540 includes a list of different types of information. In the example illustrated in FIG. 15, the types of information or metadata includes the clip's position, roles, and notes. In some embodiments, the notes are metadata specified by the application's user to describe content. To displays the one or more roles associated with each clip, the user selects a menu item 1545 labeled "Roles" from the context menu 1540.

The third stage 1515 illustrates the media editing application after selecting the "Roles" from the context menu 1540. As shown, the selection results in the timeline search tool 620 displaying one or more roles associated with each clip. For example, the audio clip 1535 is listed as being associated with a "Music" role. In some embodiments, the roles in the timeline search tool 620 are selectable items that can be used to modify the roles associated with the clips in the composite display area 610. Several different examples of modifying roles and creating custom roles will be described in the following section.

D. Data Structure for a Composite Presentation

In the examples described above, the media editing application displays each media clip in a composite presentation with the clip's assigned role. For some embodiments of the invention, FIG. 16 conceptually illustrates several example data structures that is used to display such roles in the composite display area and/or the timeline search tool. Specifically, this figure illustrates example data structures associated with a composite presentation that allow the clips to be displayed with the assigned roles.

Figure 16:
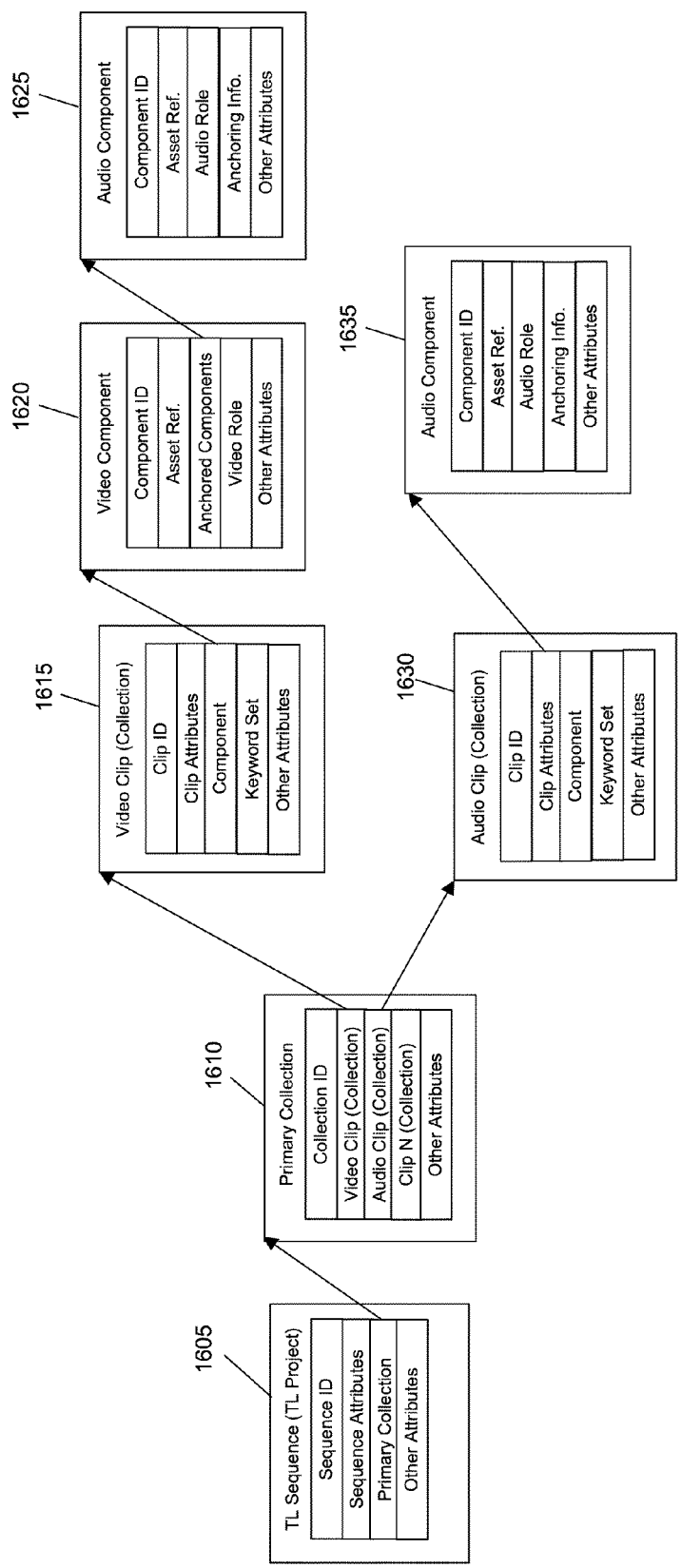
FIG. 16 conceptually illustrates several example data structures that is used to provide role-facilitated editing feature in the composite display area.

In some embodiments, the data structures are all contained within a project data structure that contains a single sequence for generating the composite presentation. FIG. 16 illustrates a timeline sequence 1605 that includes a primary collection data structure 1610. Here, the primary collection data structure 1610 is in itself an array of one or more clip objects or collection objects. Several examples of such clip objects are described above by reference to FIG. 13.

As shown in FIG. 16, the sequence 1605 includes (1) a sequence ID, (2) sequence attributes, and (3) the primary collection 1610. The sequence ID identifies the timeline sequence 1605. In some embodiments, the sequence attributes for the project in the timeline are specified by the user of the media editing application. For example, the user might have specified several settings that correspond to these sequence attributes when creating the project.

The primary collection 1610 includes the collection ID and the array of clips. The collection ID identifies the primary collection. The elements of the array includes several clips (e.g., a video clip 1615, an audio clip 1630).

These represent clips or collections that have been added to the composite display area. In some embodiments, the array is ordered based on the locations of media clips in the composite display area and only includes clips in the primary lane of the primary collection. The application assumes that there is no gap between these items, and thus no timing data is needed between the items. When a clip collection stored in an event is added to a project in the composite display area, some embodiments remove a sequence container data structure and copy the rest of the data structure (e.g., the clip and its components) into the data structure for the clip in the timeline.

The video clip object 1615 and the audio clip object 1630 are the same as the ones described above by reference to FIG. 13. As mentioned, each of these objects in some embodiments is an ordered array of clip objects. The clip object stores one or more component clips (e.g., the video component 1620) in the array. In addition, the clip object stores a clip ID that is a unique identifier for the clip object. In some embodiments, the clip object is a collection object that can include different components as well as additional collection objects. In some embodiments, the clip object for a video clip only stores the video component clip in the array, and any additional components (generally one or more audio components) are then anchored to that video component.

As shown in FIG. 16, each of the clip objects 1615 and 1630 also include a keyword set. In some embodiments, the keyword set represents one or more keywords that are associated with the corresponding media clip. For example, the media editing application of some embodiments allows the application's user to tag different ranges of a media clip with keywords.

The video component object 1620 is similar to the one described above by reference to FIG. 13. The video component object 1620 represents the video content associated with the video clip object 1615. In some embodiments, the video role of a media clip in the composite presentation is stored at the component level. This is illustrated in FIG. 16 as the video component object 1620 includes a role attribute (e.g., a video role attribute). In some embodiments, the media editing application identifies this role attribute when it is displaying clips in the timeline search tool and/or the composite display area based on the assigned role.

The media editing application of some embodiments uses the role attribute field to perform a number of different operations. For example, the media editing application identifies the role attribute field when modifying the appearance of clips in the composite display area. In some embodiments, the media editing application identifies the role attribute field when disabling clips in the composite display area. The media editing application of some embodiments uses the role attribute field to generate one or more render graphs.

In the example illustrated in FIG. 16, the video component 1625 also includes a component ID, a reference to each of its anchored components (e.g., the audio component 1625), and a set of other component attributes (e.g., an asset reference). The component ID identifies the component.

The audio component object 1625 is similar to the one described above by reference to FIG. 13. The audio component 1625 represents the audio content associated with the video clip object 1615. The audio component 1625 includes a component ID, an asset reference, and a set of other component attributes. The component ID identifies the component. The asset reference of some embodiments stores an event ID and an asset ID, and uniquely identifies a particular asset object.

In some embodiments, the clip's audio role is stored at the component level. FIG. 16 illustrates this as the audio component 1625 includes an audio role. Similar to the video component 1620, the media editing application of some embodiments identifies this role attribute when displaying clips in the timeline search tool and/or the composite display area based on the assigned role. As mentioned above, the media editing application of some embodiments uses the role attribute field to perform a number of different operations. For example, the media editing application identifies the role attribute field when modifying the appearance of clips in the composite display area. In some embodiments, the media editing application identifies the role attribute field when disabling clips in the composite display area. The media editing application of some embodiments uses the role attribute field to generate one or more render graphs.

In some embodiments, the audio clip object 1630 is a collection object that is similar to the video clip object 1615. That is, the audio clip is an ordered array of clip objects with similar or same attributes (e.g., clip ID, clip attributes, keyword set, etc.). The audio clip object stores one or more component clips in the array. In the example illustrated in FIG. 16, the audio clip object 1630 represents an audio clip as it includes a reference to the audio component 1635. The audio component 1635 includes the same set of attribute fields as the audio component 1625.

One of ordinary skill in the art will also recognize that the objects and data structures shown in FIG. 16 are just a few of many different possible configurations for representing a timeline sequence or composite presentation in the composite display area.

IV. Editing Roles

In some embodiments, the media editing application provides different tools to reassign roles and/or create custom roles. Several examples of such editing operations will now be described below by reference to FIGS. 17-27.

A. Reassigning Roles

Figure 17:
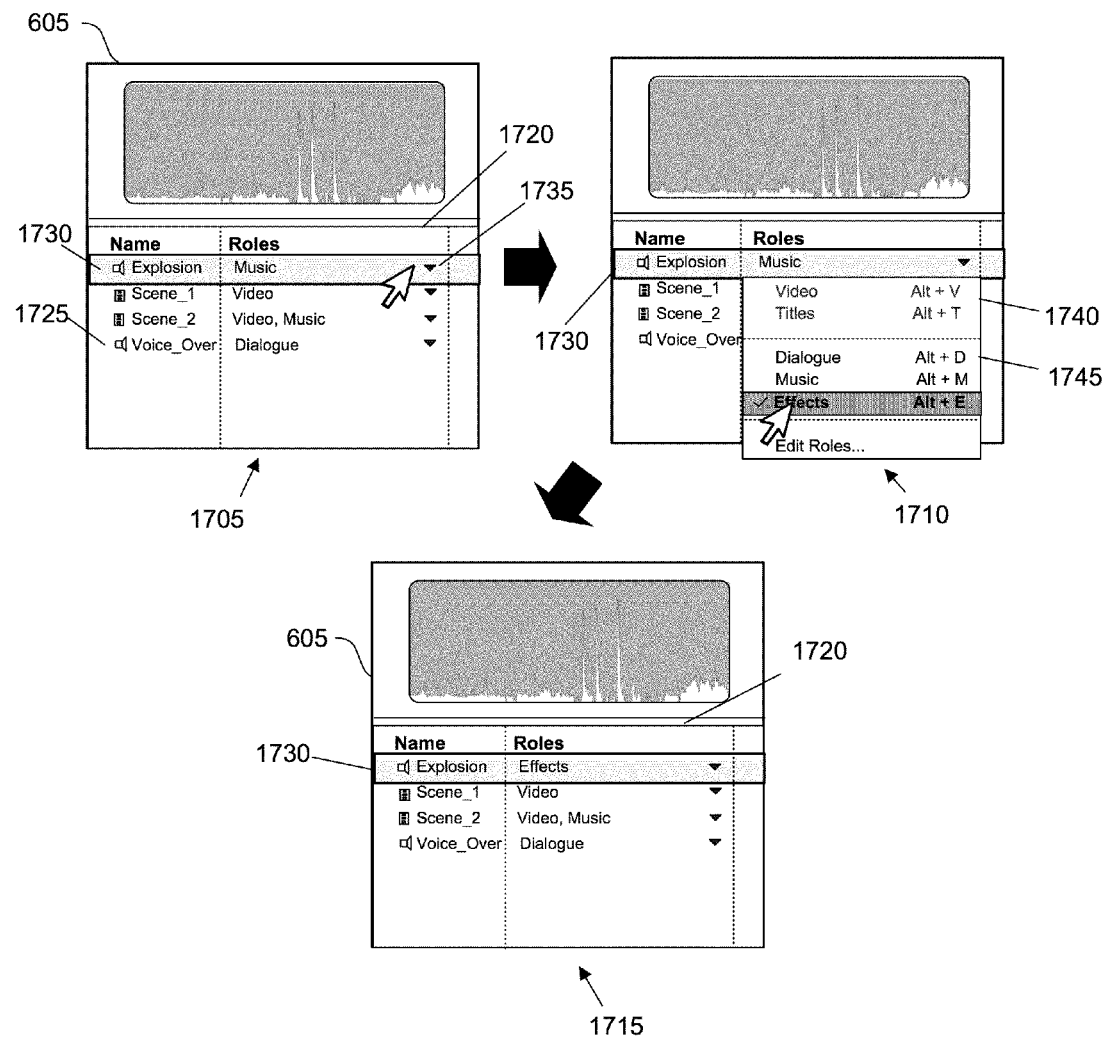
FIG. 17 provides an illustrative example of reassigning a role assigned to a clip.

FIG. 17 provides an illustrative example of reassigning a role that was previously assigned to a clip. Specifically, this figure shows in three operational stages 1705-1715 how the role can be reassigned using the clip browser 605. In this example, the clip browser 605 displays clips in a list view that is described above by reference to FIG. 10.

The first stage 1705 shows the clip browser 605 displaying media clips in a list view. As shown by the "Roles" column 1720, each clip is assigned one or more roles. For example, the audio clip 1725 is assigned an audio role of "Dialogue". In addition, the audio clip 1730 contains an effect but has been incorrectly assigned the "Music" role. To modify this assignment, the user selects the audio clip's role 1735 from the "Roles" column 1720.

The second stage 1710 illustrates reassigning the "Music" role of the audio clip 1730. As shown, the selection of the role 1735 caused a drop-down list 1740 to appear. As the clip 1730 is an audio clip, this drop-down list 1740 lists several different audio roles (e.g., "Dialog", "Music", "Effects") that the user can choose from. In some embodiments, different types are of roles are mutually exclusive to one another. For example, the media editing application of some embodiments prevents audio roles from being assigned to video content. Similarly, the media editing application prevents video roles from being assigned to audio content. In the example illustrated in FIG. 17, the media editing application prevents selection of video roles (e.g., "Video", "Title") for the audio clip as these roles are disabled and shaded out in the drop-down list 1740. The user then selects the "Effects" role 1745 from the drop-down list 1740.

The third stage 1715 illustrates the clip browser 605 after assigning the "Effects" role to the audio clip 1730. Specifically, after the assignment, the "Roles" column 1720 indicates that the audio clip 1730 is no longer assigned the "Music" role but is assigned the "Effects" role.

Figure 18:
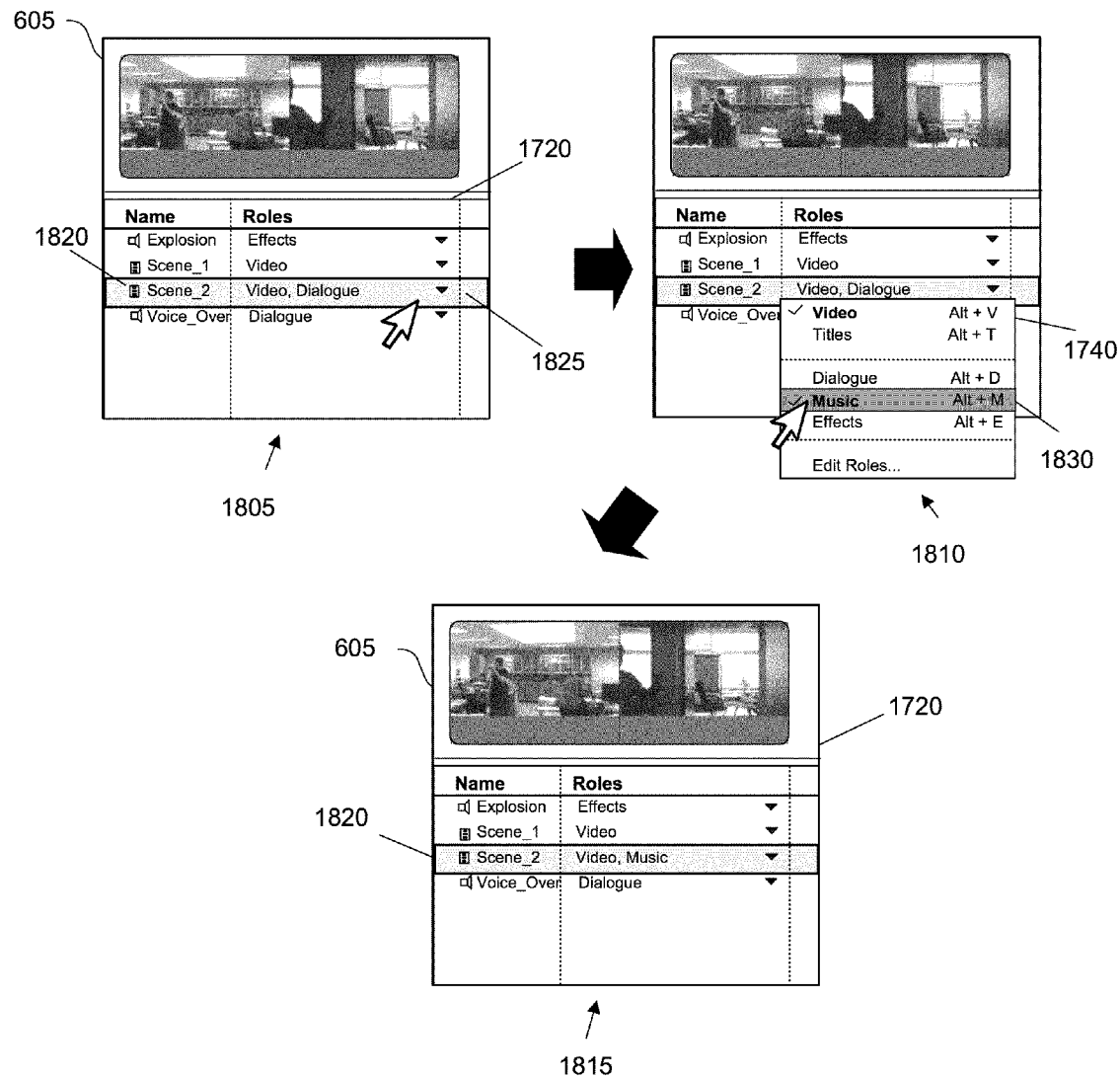
FIG. 18 provides an illustrative example of modifying an audio role assigned to a video clip.

In the previous example, the clip browser 605 is used to modify the audio role assigned to the audio clip. In some embodiments, the media editing application assigns both a video role and an audio role to a video clip. FIG. 18 provides an illustrative example of modifying an audio role assigned to a video clip 1820. Three operational stages 1805-1815 of the media editing application are illustrated in this figure.

The first stage 1805 shows the clip browser 605 displaying several clips in a list view. As shown by the "Roles" column 1720, the video clip 1820 has been assigned (1) a video role of "Video" and (2) an audio role of "Dialogue". To modify the audio role, the user selects the video clip's role 1825 from the "Roles" column 1720.

The second stage 1810 illustrates reassigning the "Dialogue" role of the video clip 1820. As shown, the selection of the role 1825 caused the drop-down list 1740 to appear. As the clip is a video clip, this drop-down list 1740 lists several different video roles (e.g., "Video", "Title"). In the example illustrated in FIG. 18, the media editing application allows selection of the audio roles (e.g., "Dialog", "Music", and "Effects") because the video clip 1820 also includes audio content. The user then selects the "Music" role 1830 from the drop-down list 1740.

The third stage 1815 illustrates the clip browser 605 after assigning the "Music" role to the video clip 1820. Specifically, after the assignment, the "Roles" column 1720 indicates that the video clip 1820 is no longer assigned the "Dialogue" role but is assigned the "Music" role.

Figure 19:
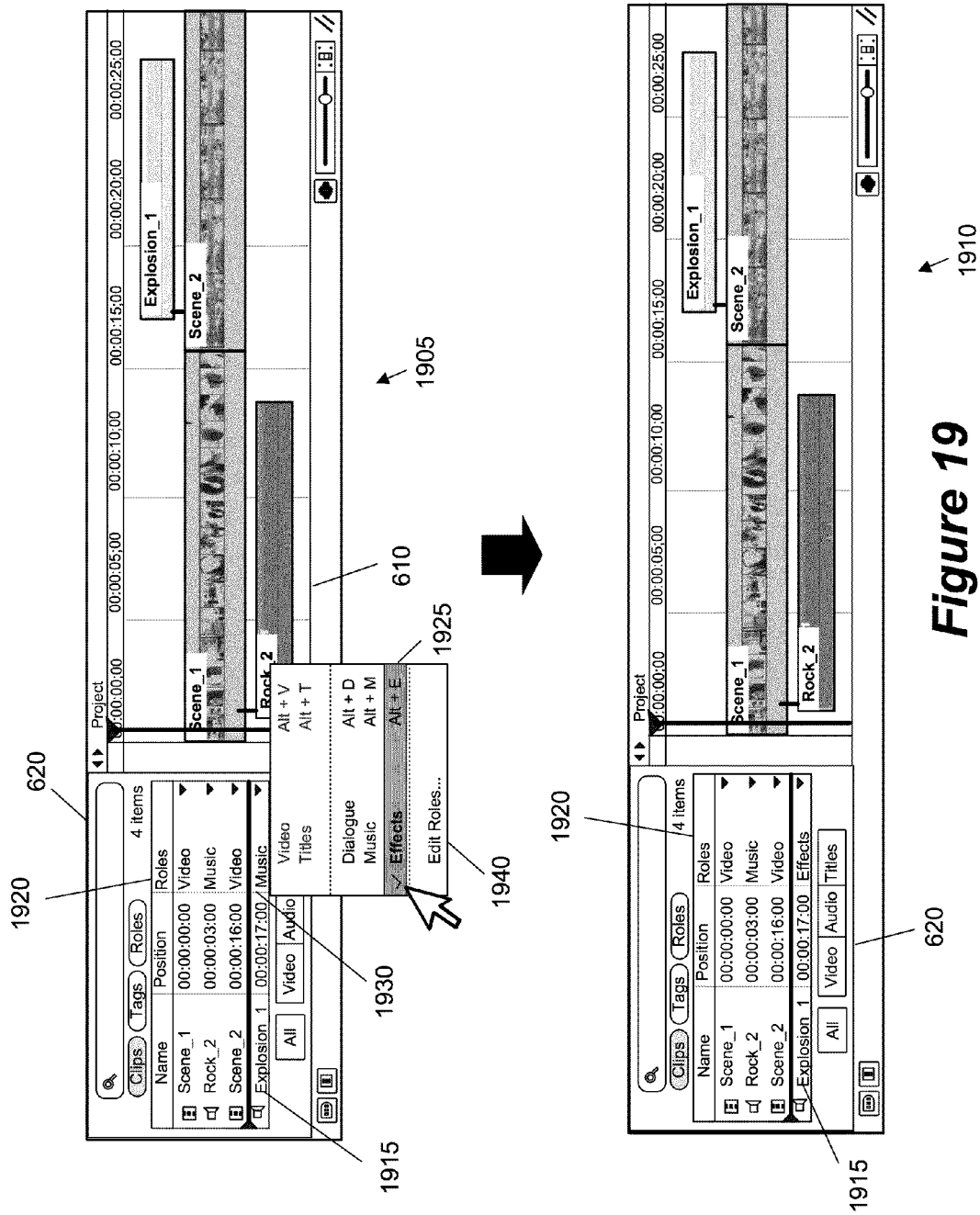
FIG. 19 provides an illustrative example of modifying an audio role assigned to an audio clip in the composite display area.

In the previous two examples, the clip browser 605 is used to modify the audio roles assigned to the audio and video clips. In some embodiments, the media editing application provides different tools to modify clip roles after adding the clips to a project or composite presentation. FIG. 19 provides an illustrative example of modifying an audio role assigned to an audio clip in the composite display area 610. Two operational stages 1905 and 1910 of the media editing application are illustrated in this figure. The composite display area 610 and the timeline search tool 620 are the same as the ones described above by reference to FIG. 6.

The first stage 1905 shows the timeline search tool 620 and the composite display area 610. The composite display area 610 displays representations of several audio and video clips. The user might have added these clips to this area by dragging and dropping them from the clip browser (not shown) to the composite display area 610. The timeline search tool 620 displays a list of clips in the composite display area. As shown by the "Roles" column K20, each clip is assigned one or more roles. For example, the audio clip 1915 is mistakenly assigned an audio role of "Music". To modify this assignment, the user selects the audio clip's role 1930 from the "Roles" column 1920. The selection of the role 1930 causes a drop-down list 1940 to appear. As the clip 1915 is an audio clip, this drop-down list 1940 lists several different audio roles (e.g., "Dialog", "Music", "Effects") that the user can choose from. The user then selects the "Effects" role from the drop-down list 1940.

The second stage 1910 illustrates the timeline search tool 620 after assigning the "Effects" role to the audio clip 1915. Specifically, after the assignment, the "Roles" column 1920 indicates that the audio clip 1915 is no longer assigned the "Music" role but is assigned the "Effects" role.

In some embodiments, the media editing application auto-assigns roles to objects added to the composite display area. For example, the media editing application of some embodiments assigns a "title" role to a title object that is added to the composite display area. The user can modify the "title" role similar to audio and video roles. In some embodiments, other types of object are assigned different roles. For example, if closed captioning and subtitles are represented (e.g., as markers, or edits) in the composite display area, then they would be assigned the appropriate role on creation much as title objects are assigned the "title" role.

B. Compound Clips

The media editing application of some embodiments allows the user to create a compound clip from multiple different clips and assign one or more roles to the compound clip. Several examples of creating a compound clip and assigning different roles to the compound clip will now be described by reference to FIGS. 20-26.

In some embodiments, a compound clip is any combination of clips (e.g., in the composite display area or in the clip browser) and nests clips within other clips. Compound clips, in some embodiments, can contain video and audio clip components, clips, and other compound clips. As such, each compound clip can be considered a mini project or a mini composite presentation with its own distinct project settings. In some embodiments, compound clips function just like other clips. That is, a user can add them to a project or timeline, trim them, retime them, and add effects and transitions.

Figure 20:
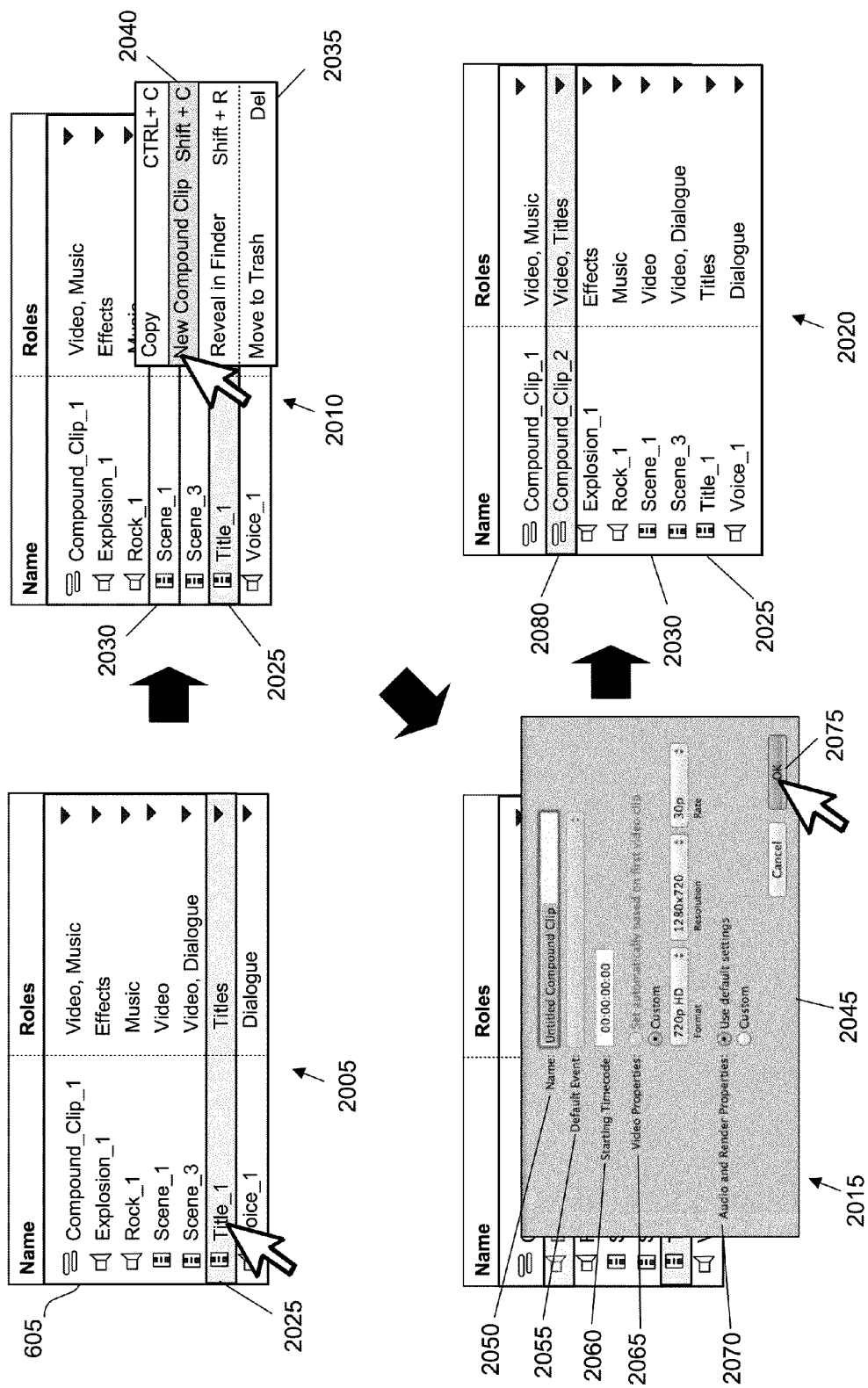
FIG. 20 provides an illustrative example of creating a compound clip from several different clips.

FIG. 20 provides an illustrative example of creating a compound clip from several different clips. Specifically, this figure shows in four operational stages 2005-2020 how the media editing application can be used to create the compound clip. The clip browser 605 is the same as the one described above by reference to FIG. 6.

The first stage 2005 shows the clip browser 605 in a list view mode. The clip browser 605 lists several video and audio clips. Here, the user selects a video clip 2025 as a first clip for the compound clip. The video clip 2025 is assigned a video role of "Titles".

The second stage 2010 shows a selection of a video clip 2030 as a second clip for the compound clip. Specifically, the user selects this video clip 2030 along with the video clip 2025. The user might have selected both of these clips by first selecting the video clip 2025 and then selecting the video clip 2030 while holding down a hotkey that facilitates multiple selections. The second stage 2010 also shows the activation of a context menu 2035. This menu includes an option 2040 to create a compound clip from the selected clips 2025 and 2030.

As shown in the third stage 2015, the selection of the option 2040 causes a compound clip options window 2045 to appear. The window 2045 includes (1) a text field 2050 for inputting a name for the compound clip, (2) a selection box 2055 for selecting a default collection for the compound clip, (3) a set of radio buttons 2065 for specifying video properties (e.g., automatically based on the properties of the first video clip, custom), and (4) a set of radio buttons 2070 for specifying audio properties (e.g., default settings, custom). In the third stage 2015, the user specifies different settings for the compound clip and selects the "OK" button 2075.

As shown in the fourth stage 2020, the selection causes a compound clip 2080 to appear in the clip browser 605. In some embodiments, when a compound clip is created in the clip browser 605, the original clips are retained after creating the compound clip. This is illustrated in the fourth stage 2020 as the two clips 2025 and 2030 are still displayed in the clip browser 605 with their corresponding roles. Alternatively, the media editing of some embodiments removes the clips that are used to create the compound clip. In some embodiments, the roles of the nested clips are inherited by the compound clip. That is, the compound clip of some embodiments retains the roles that are assigned to its nested clips. This is illustrated in the fourth stage as the compound clip 2080 is listed as having two video roles, namely the "Titles" role of the clip 2025 and the "Video" role of the clip 2030.

Figure 21:
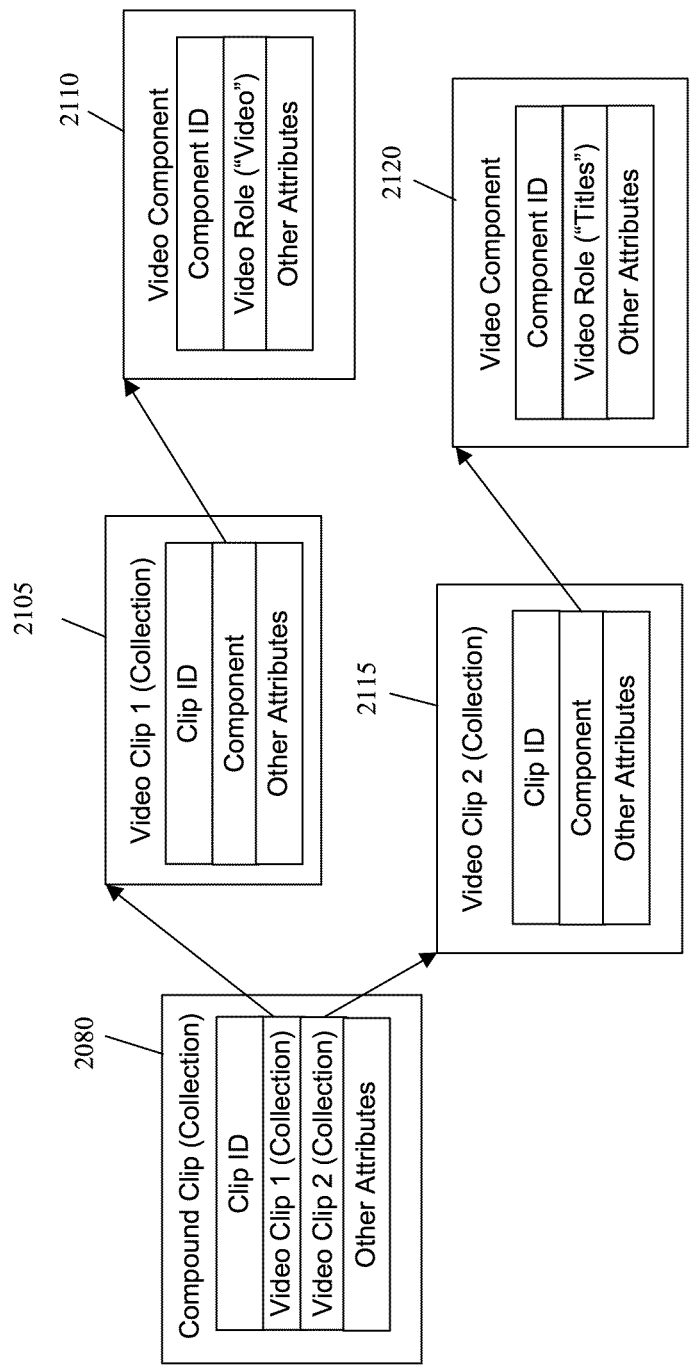
FIG. 21 conceptually illustrates several example data structure associated with the compound clip.

FIG. 21 conceptually illustrates several example data structure associated with the compound clip 2080. Specifically, this figure shows how the roles of the compound clip 2080 are inherited from its nested clips. As shown, the figure includes the compound clip 2080 and video clips (2105 and 2115).

In some embodiments, the compound clip 2080 is defined by a collection object that is described above by reference to FIG. 13. As mentioned, the collection object of some embodiments is an ordered array that includes a reference to one or more collection objects as well as additional components. Here, the compound clip includes a reference to two clip objects 2105 and 2115. These two clip objects represent the two video clips 2025 and 2030 from which the compound clip was created. In the example illustrated in FIG. 21, the compound clip 2080 is defined by a clip ID and other clip attributes (e.g., video properties specified with the compound clip options window 2045).

As shown, in FIG. 21, the compound clip 2080 does not include role attributes. Instead, the role attributes are derived from the video clip objects 2105 and 2115. Specifically, each of the video clip objects 2105 and 2115 includes a reference to a particular video component that includes a video role attribute. Here, the video clip object 2105 includes a reference to a video component 2110 with a video role of "Video". The video clip object 2115 includes a reference to a video component 2120 with a video role attribute of "Titles". As such, the media editing application of some embodiments displays the compound clip's role by identifying each role that is assigned at the component level.

Figure 22:
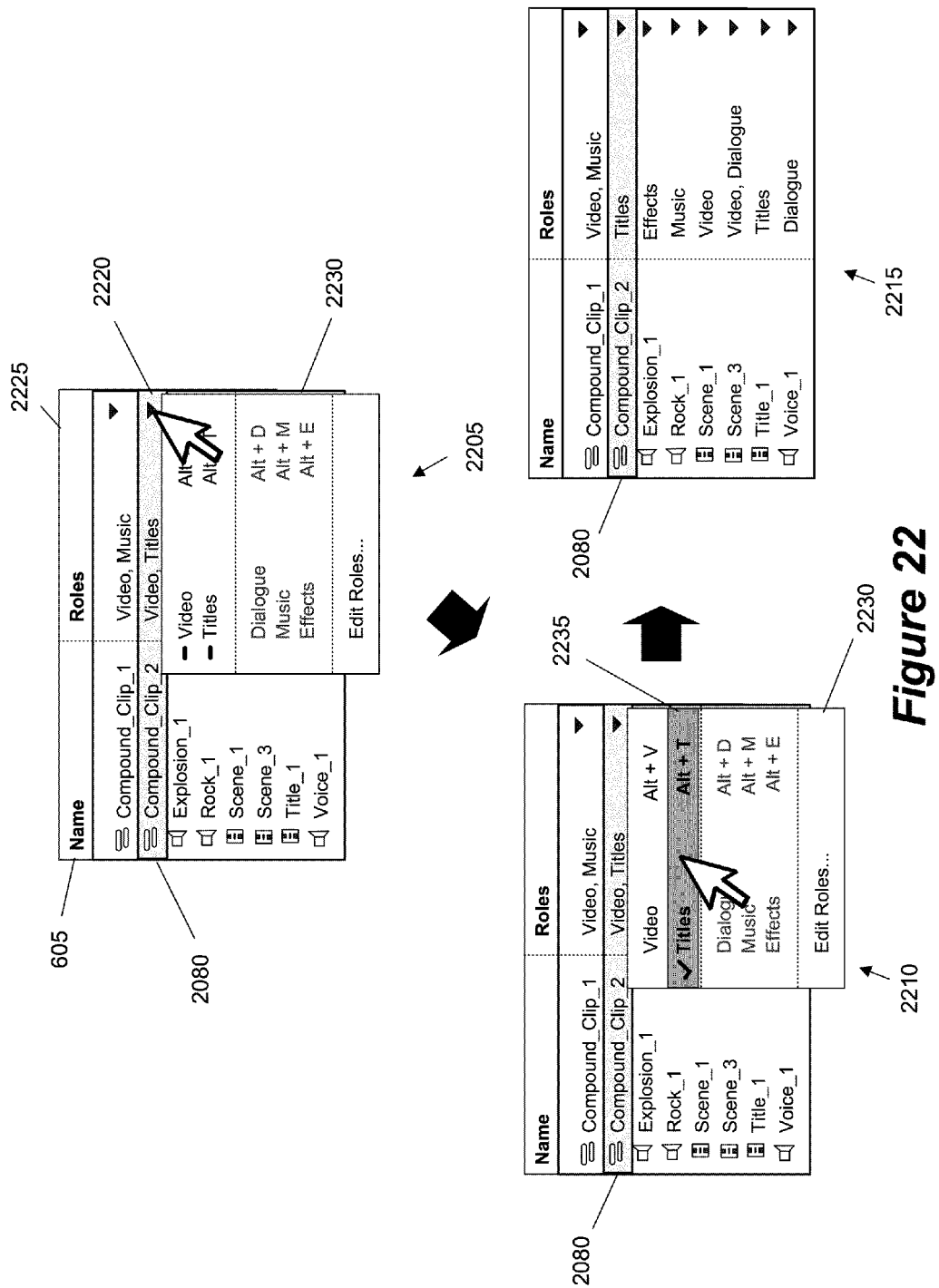
FIG. 22 provides an illustrative example of modifying the roles of the compound clip.

The previous example illustrated creating the compound clip 2080 with the clip browser 605. In some embodiments, the media editing application allows its user to modify one or more roles of the compound clip. FIG. 22 provides an illustrative example of such modification. Three operational stages 2205-2215 of the media editing application are illustrated in this figure.

The first stage 2205 shows the compound clip 2080 in the clip browser 605. As shown, the compound clip 2080 is assigned both the "Titles" and "Video" roles. Here, the user selects the roles 2220 from the roles column 2225. The selection of the roles 2220 causes a drop-down list 2230 to appear. The drop-down list 2230 indicates (e.g., with markings) that both of the "Titles" and "Video" roles are assigned to the compound clip 2080.

The second stage 2210 illustrates assigning the "Titles" role to the compound clip 2080. Specifically, the user selects "Titles" role 2235 from the drop-down list 2230. As shown in the third stage 2215, the selection causes the compound clip 2080 to be assigned the "Titles" role. In some embodiments, the media editing application replaces each role inherited from the nested clips with the specified role. For example, when the compound clip inherits multiple video roles, the assignment of a video role to the compound clip replaces all inherited video roles with the assigned video role. This is shown in the third stage 2215, as the compound clip is assigned only the "Titles" role and not both "Video" and "Titles" roles.

Figure 23:
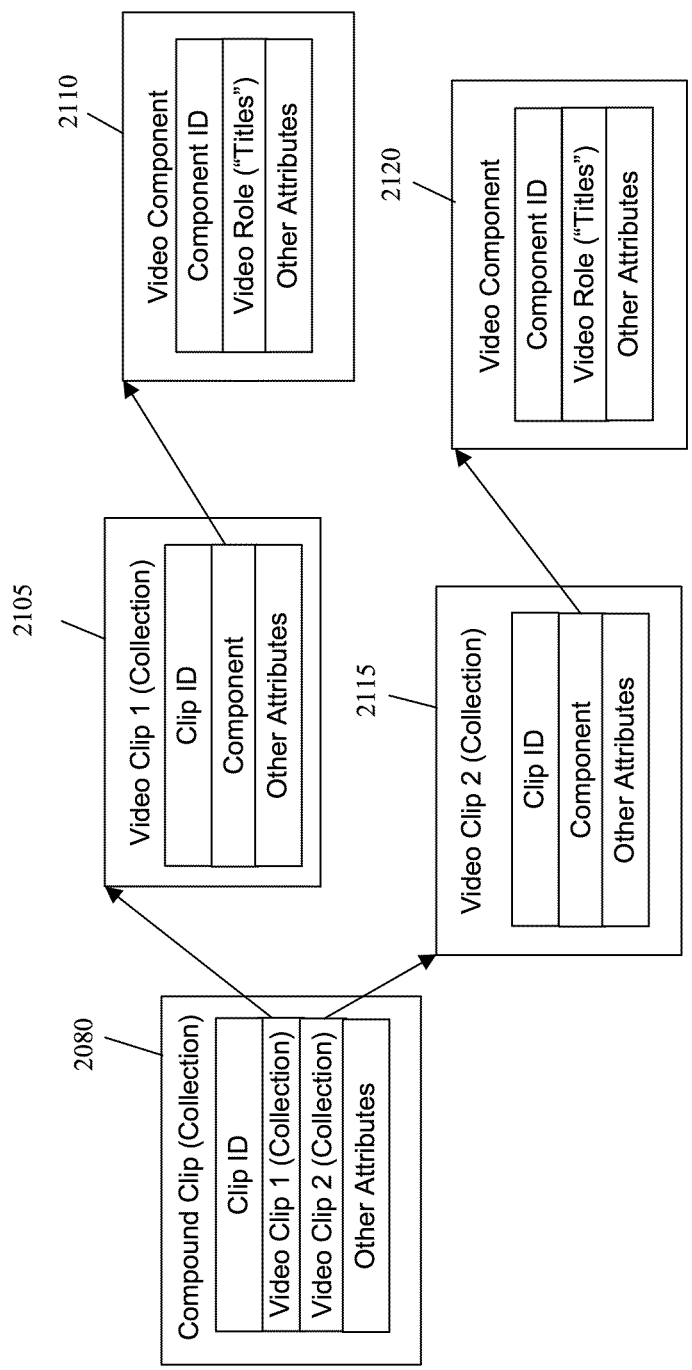
FIG. 23 conceptually illustrates the example data structures after reassigning the compound clip's roles.

FIG. 23 conceptually illustrates the example data structures after reassigning the compound clip's roles. This figure is identical to FIG. 21; however, the video components 2110 and 2120 are both assigned the "Titles" role. As such, the media editing application of some embodiments reassigns the compound clip's role by modifying each role that is assigned at the component level. In other words, changing one or more roles of a compound clip at the container level causes the media editing application of some embodiments to dive in and change all the roles inside the compound clip. For example, when a compound clip is assigned a new audio role, the media editing application replaces all the different audio roles associated with the compound clip's inner clips with the new audio role.

One of the reasons for this role assignment feature is that editing operations are usually performed at the container level, in some embodiments. That is, the media editing application's user does not have to break apart or separate a compound clip to convert its content to individual clips. Instead, the user can perform editing operations directly on the compound clip.

In the example described above, the compound clip initially includes multiple video roles. In some embodiments, when the compound clip is reassigned one particular video or audio role, the media editing application treats the compound clip similar to a non-compound clip. For example, once the compound clip is assigned one video role, the media editing application of some embodiments prevents the compound clip from being assigned two different video roles.

Figure 24:
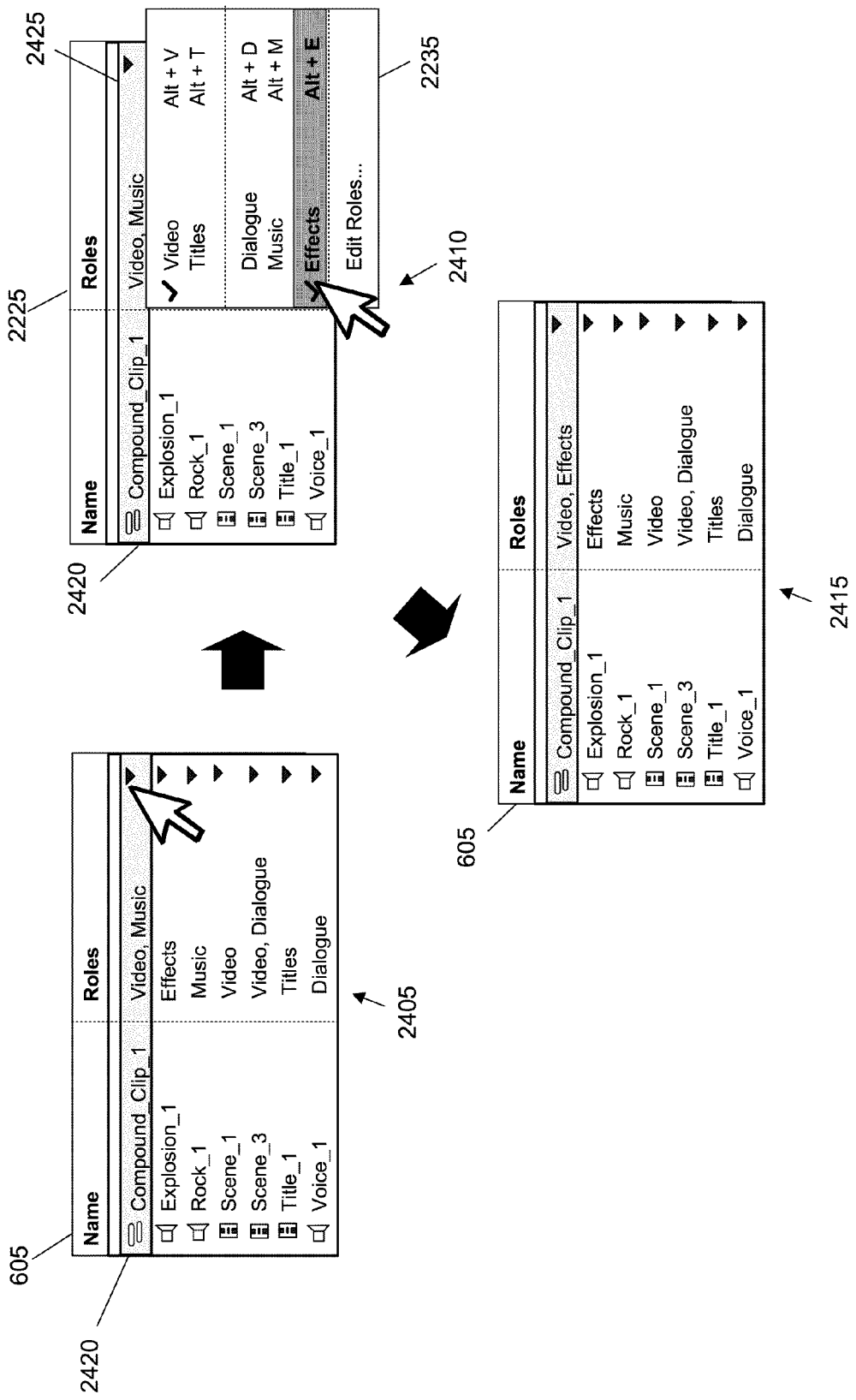
FIG. 24 provides an illustrative example of modifying an audio role assigned to a compound clip.

In some embodiments, the media editing application assigns both a video role and an audio role to a compound clip when its nested clips include video and audio content. This is similar to a video clip that is assigned a video role and an audio role when the video clip includes audio content. FIG. 24 provides an illustrative example of modifying an audio role assigned to a compound clip. Three operational stages 2405-2415 are illustrated in this figure.

As shown in the first stage 2405, the compound clip 2420 is assigned both the "Video" role and the "Music" role. The compound clip 2420 might have inherited one or more of these roles from its nested clips. The second stage 2410 illustrates the selection of the roles 2425 from the roles column 2225. The selection of the roles 2425 causes the drop-down list 2235 to appear. The drop-down list 2235 displays several different video and audio roles. Here, the user selects the "Effects" role for the compound clip 2420. This results in the compound clip 2420 being assigned the "Effects" role for its audio role. The third stage 2415 shows the reassignment of the audio role as the clip browser 605 lists the compound clip's audio role as "Effects".

Figure 25:
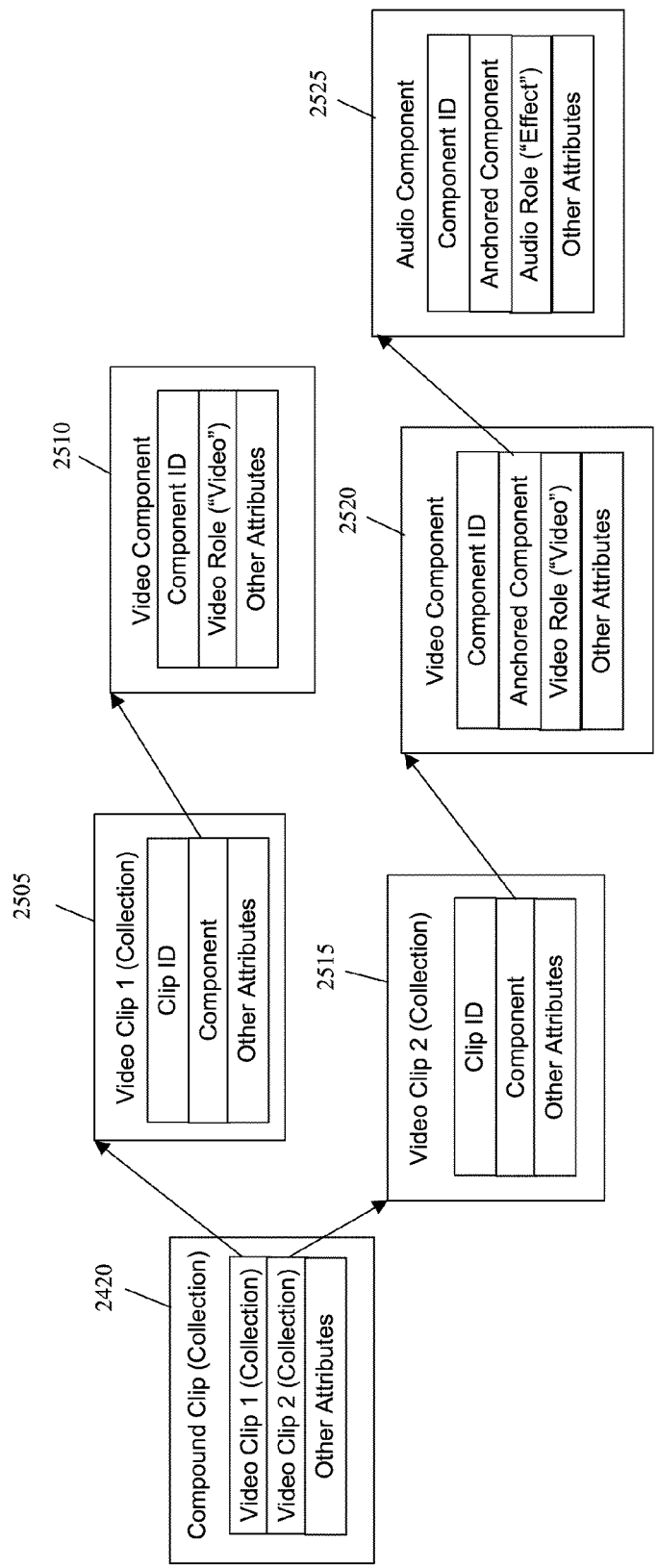
FIG. 25 conceptually illustrates several example data structure after modifying the audio role assigned to the compound clip.

FIG. 25 conceptually illustrates several example data structures associated with the compound clip 2420. Specifically, this figure shows the data structures after reassigning the compound clip's audio role. The figure includes the compound clip 2420 and two video clips 2505 and 2515. The two video clip 2505 and 2515 represent the compound clip's nested clips.

As shown in FIG. 25, the video clip 2505 is associated with the video component 2510. The video component 2510 is assigned a video role of "Video". The video clip 2515 is associated with a video component 2520. The video component 2520 is assigned the same video role as the video component 2510. Since the video clip 2515 includes audio, an audio component 2525 is anchored to the video component 2520.

As mentioned above, the media editing application of some embodiments reassigns the compound clip's role by modifying each role that is assigned at the component level. This is illustrated in FIG. 25 as the role attribute of the audio component 2525 has been changed from "Music" to "Effects".

D. Custom Roles

Figure 26:
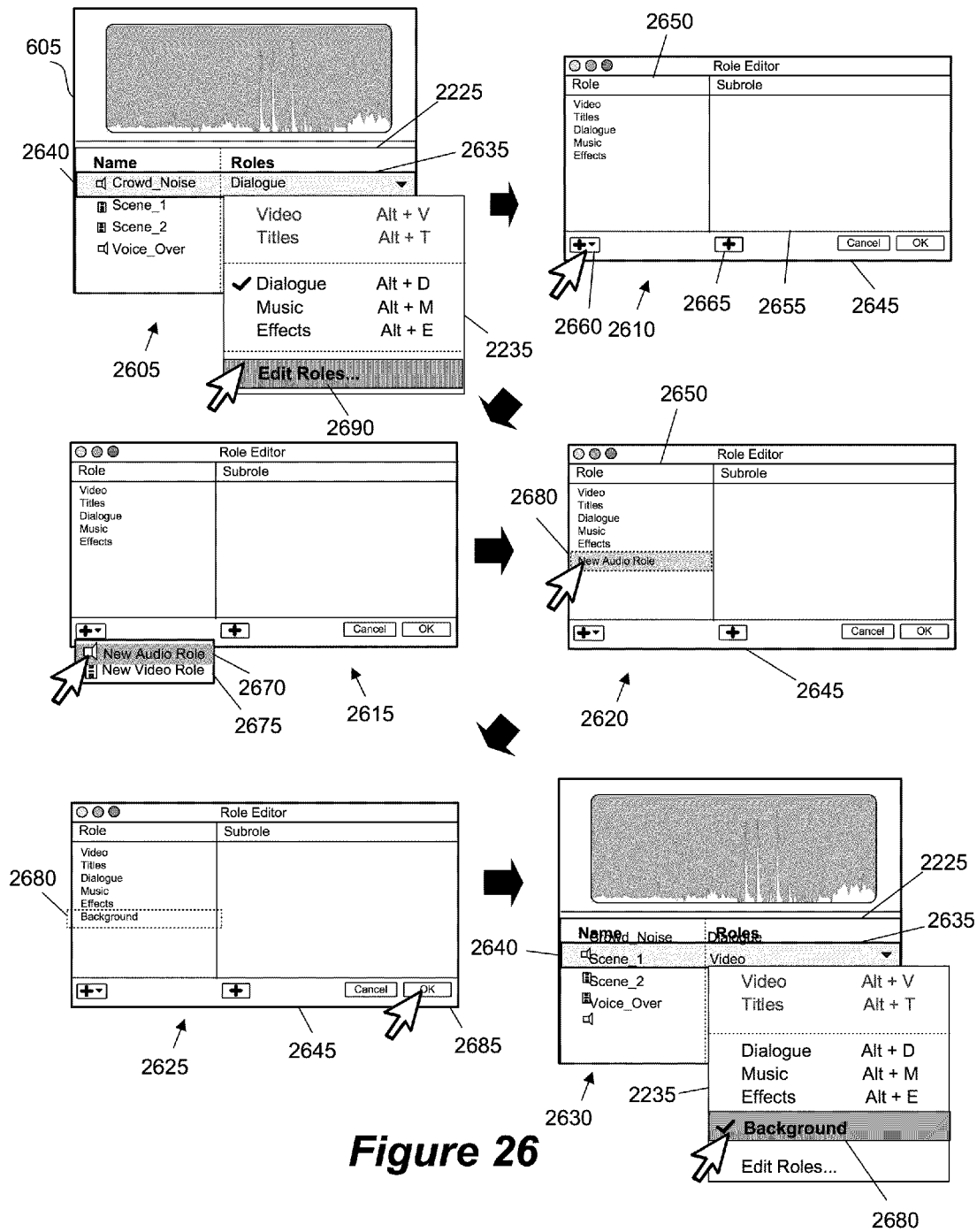
FIG. 26 provides an illustrative example of creating and assigning a custom role to a media clip.

The previous section described several examples of assigning roles to media content. In some embodiments, the media editing application allows its users to create custom roles. Different from several predefined roles provided by the media editing application, custom roles are specified by the application's users. FIG. 26 provides an illustrative example of creating and assigning a custom role to a media clip. Six operational stages 2605-2630 are shown in this figure. The clip browser 605 is the same as the one described above by reference to FIG. 6.

The first stage 2605 illustrates the clip browser 605 in a list view mode. The browser 605 lists several video and audio clips. To create a custom role, the media editing application of some embodiments provides a role editor. In the example illustrated in FIG. 26, the role editor is activated by selecting any one of the different roles listed in the roles column. For example, in the first stage 2605, the user selects the role 2635 of the audio clip 2640. The selection causes a drop-down list 2235 to appear. The user then selects a selectable item 2690 from the drop-down list labeled "Edit-Roles".

As shown in the second stage 2610, the selection of the selectable item 2690 results in the display of a role editor 2645. The role editor 2645 includes a roles display section 2650 that lists different roles and a sub-roles display section 2655 that lists different sub-roles. The first display section includes a control 2660 for creating custom roles, and the second display section includes a control 2665 for creating sub-roles. An example of creating and assigning a sub-role to a media clip will be described below by reference to FIG. 27.

To create a custom role, the user selects the control 2660. The selection causes the media editing application to display a set of options 2270 and 2275 creating either an audio role or a video role, as illustrated in the third stage 2615. In some embodiments, the audio role can only be assigned to content that includes audio. Similarly, the media editing application prevents the video role being assigned to content that only includes audio. In some embodiments, the video role can be assigned to a still image, animation, title content, and video. In third stage 2615, the user selects the option 2670 for creating a new audio role.

The fourth stage 2620 shows the role editor 2645 after selecting the new audio role option 2670. In response to the selection, the role editor 2645 displays a new custom audio role 2680 in the first display section 2650. Here, the new audio role 2680 is given a default name. To modify the default name, the user selects the new audio role 2680 from the roles display area section 2650 and inputs a role name.

The fifth stage 2625 illustrates the role editor 2645 after inputting the name for the new audio role 2680. Specifically, the name of the audio role has been specified as "Background". The user then selects a button 2685 labeled "OK" to close the role editor 2645.

The sixth stage 2630 illustrates assigning the audio clip 2640 the new audio role 2680. To modify the role assigned to the audio clip 2640, the user selects the clip's role 2635 from the role column 2225. The selection causes the drop-down list 2235 to appear. The drop-down list 2235 includes the new audio role 2680 specified by the user with the role editor 2645. Lastly, the user assigns the custom role by selecting the new audio role 2680 from the drop-down list 2235.

Figure 27:
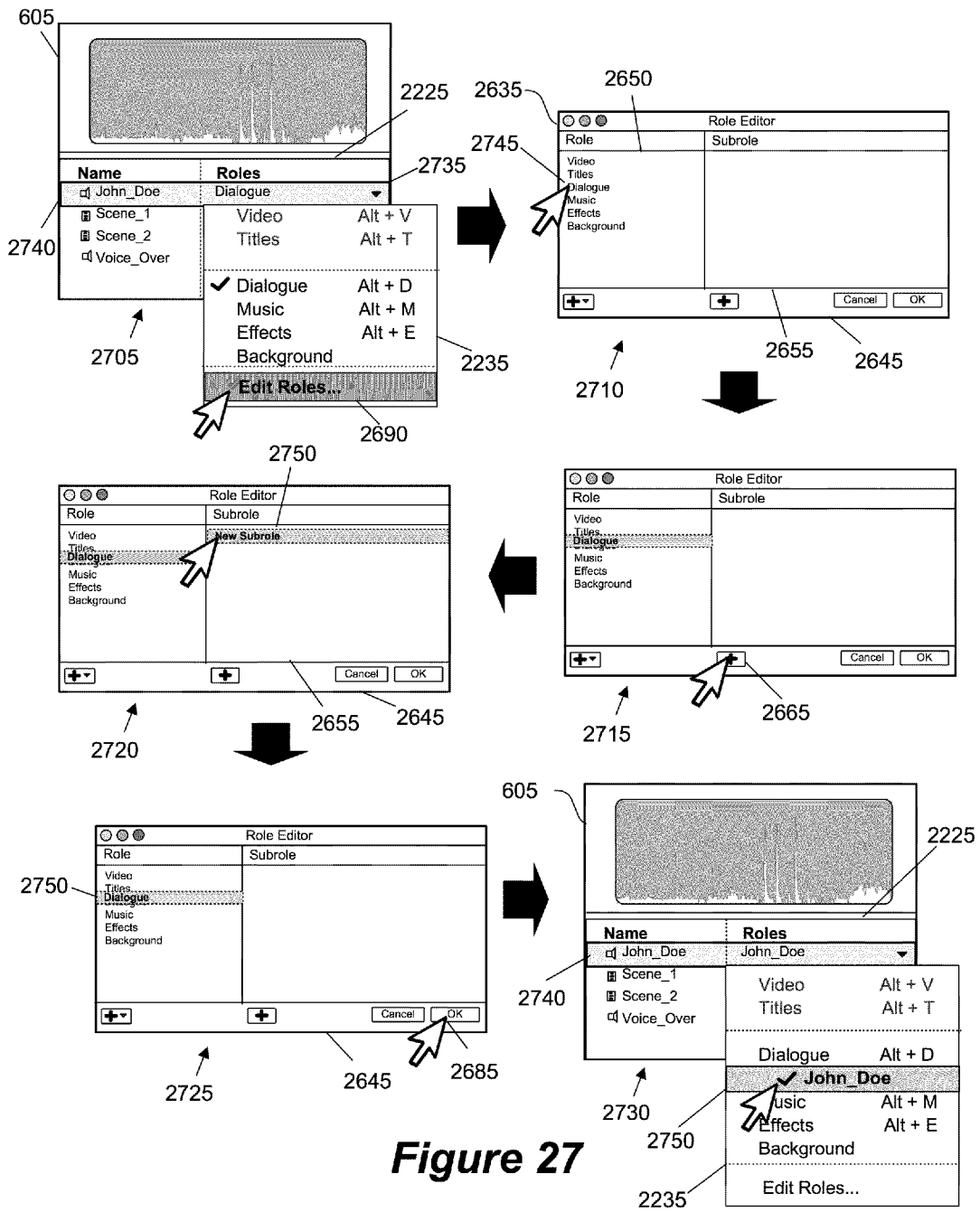
FIG. 27 provides an illustrative example of creating a sub-role to assign to an audio clip.

In some embodiment, the media editing application allows user to create sub-roles. Different from the previous example, the sub-roles are created under existing roles (e.g., provided by the media editing application or specified by users). Such sub-roles are particularly useful when there are many different clips that are assigned a same role. For example, there may be several clips that include dialogue with different actors. Instead of assigning all the clips the same "Dialog" role, the user can create sub-roles for different actors to easily distinguish one dialogue clip from another. FIG. 27 provides an illustrative example of creating a sub-role to assign to an audio clip. Specifically, this figure illustrates in six operational stages 2705-2730 how the role editor 2645 is used to create a sub-role of a "Dialogue" role.

Similar to the previous example, the first stage 2705 illustrates the clip browser 605 in a list view mode. The browser 605 lists several video and audio clips. The user selects the role 2735 of the audio clip 2740 from the roles column 2225. The selection causes a drop-down list 2235 to appear. The user then selects the selectable item 2690 from the drop-down list labeled "Edit-Roles".

As shown in the second stage 2710, the selection of the selectable item 2690 results in the display of the role editor 2645. To create a sub-role, the user first selects the "Dialogue" role 2745 from the roles display section 2650. Here, the "Dialogue" role 2745 does not include any sub-roles. This is illustrated in this second stage 2710, as the sub-roles display section 2655 does not list any sub-roles for the "Dialogue" role.

The third stage 2715 illustrates adding a new sub-role for the "Dialog" role 2745. As shown, the user selects the control 2665 for adding a new sub-role. The fourth stage 2720 shows the role editor 2645 after selecting the control 2665. In response to the selection, the role editor 2645 displays a new sub-role 2750 in the sub-role display section 2655. The new sub-role 2750 is given a default name. To modify the default name, the user selects the sub-role 2750 from the sub-role display area section 2655 and inputs a role name.

The fifth stage 2725 illustrates the role editor 2645 after inputting the name for the new sub-role 2750. Specifically, a name of an actor has been inputted for the new sub-role 2750. The user then selects the button 2685 labeled "OK" to close the role editor 2645.

The sixth stage 2730 illustrates assigning the audio clip 2740 the new sub-role 2750. To modify the role assigned to the audio clip 2740, the user selects the clip's role 2735 from the role column 2225 of the clip browser 605. The selection causes the drop-down list 2235 to appear. The drop-down list 2235 includes the new sub-role 2750 specified by the user with the role editor 2645. As the new role 2750 is a sub-role of the "Dialogue" role, it is nested under the "Dialogue" role in the drop-down list. Lastly, the user assigns the custom role by selecting the sub-role 2750 from the drop-down list 2235.

In the editing operations described above, the clip browser 605 is used to create a custom role and a sub-role. In some embodiments, the media editing application allows custom roles and/or sub-roles to be defined differently. For instance, the media editing application of some embodiments allows the role editor to be activated using the timeline search tool. Also, the custom roles and/or sub-roles can be assigned to any clips in the composite presentation, in some embodiments. In addition, the media editing applications of some embodiments provides different selectable items (e.g., menu item, tool bar button, etc.) to create custom roles and/or sub-roles.

In the example described above, the clips are assigned different roles (e.g., predefined roles, custom roles, sub-roles). In some embodiments, the roles are globally unique. That is, the roles can be used across multiple projects (e.g., composite presentations). This global uniqueness allows cross project merges to be easily achieved. For example, if a user of the media editing application modifies a role (e.g., renames the role), the change may be propagated to media content in different projects that are assigned that role.

Figure 28:
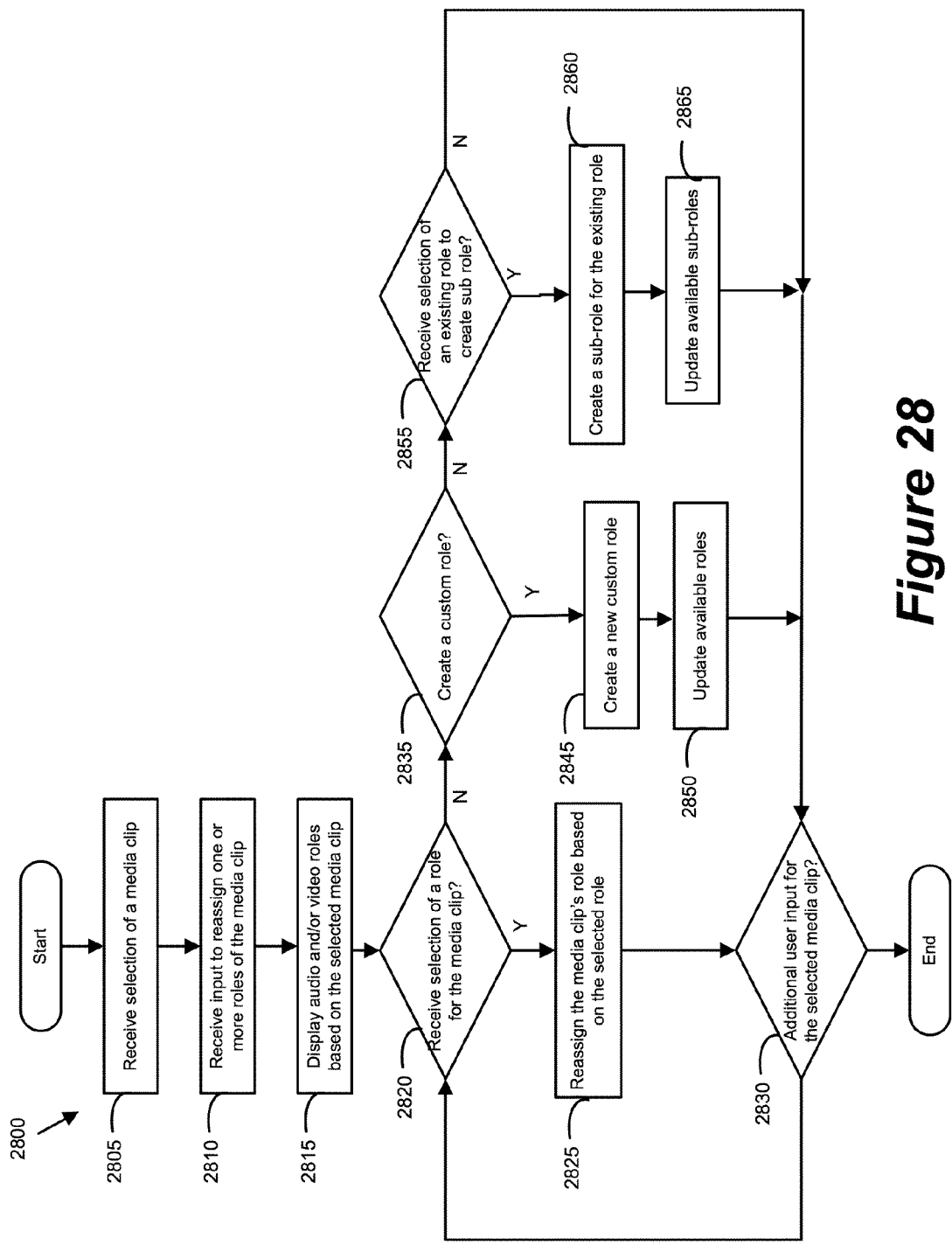
FIG. 28 conceptually illustrates a process that some embodiments perform to reassign roles.

FIG. 28 conceptually illustrates a process 2800 that some embodiments perform to reassign roles. In some embodiments, the process 2800 is performed by the media editing application. The process 2800 begins when it receives (at 2805) selection of a media clip. For example, the process 2800 might have received this selection through a clip browser or a composite display area. The process 2800 then receives (at 2810) input to reassign one or more roles of the media clip. As mentioned above, the media editing application of some embodiments provides a variety of different user interface tools to receive such an input. These tools include menu items and drop down lists (e.g., in the clip browser, in a clip inspector, etc.).

At 2815, the process 2800 displays audio and/or video roles based on the selected media clip. For example, when the media clip is an audio clip, the process 2800 of some embodiments displays only audio roles. In addition, when the media clip includes only video with no audio, some embodiments only display video roles. In some embodiments, both video and audio roles are displayed when the media clip is a video clip with audio content.

The process 2800 determines (at 2820) whether a role has been selected for the media clip. When the role has been selected, the process (at 2825) reassigns the media clip's role with the selected role. The process 2800 then proceeds to 2830, which is described below.

When the role has not been selected, the process 2800 determines (at 2835) whether an input has been received to create a custom role. If the input has been received, the process 2800 creates (at 2845) a new custom role. The process 2800 updates (at 2850) the available roles with the new custom role. The available roles are the pool of roles that the application's user can use to reassign roles. An example of creating such a custom role is described above by reference to FIG. 28. The process 2800 then proceeds to 2830, which is described below.

When an input to create a custom role has not been received, the process 2800 determines (at 2855) whether an input has been received to create a sub-role. Specifically, the process 2800 determines whether an existing role has been selected to create a new sub-role for the existing role. When the input has been received, the process 2800 creates (at 2860) a sub-role for existing role. The process 2800 then updates (at 2865) the available sub-roles. An example of creating such a sub-role is described above by reference to FIG. 27.

At 2830, the process 2800 determines whether addition input has been received for the selected media clip. When additional input has been received, the process 2800 returns to 2820, which is described above. Otherwise, the process 2800 ends.

Some embodiments perform variations on process 2800. For example, the specific operations of process 2800 may not be performed in the exact order shown and described. The specific operations may not be performed in one continuous series of operations, and different specific operations may be performed in different embodiments.

V. Editing Based on Roles

In some embodiments, the media editing application allows its user to perform different editing operations based on the assigned roles. For instance, the media editing application of some embodiments provides focus-editing tools to emphasize or de-emphasize different sets of clips based on the assigned roles. These focus editing features allow the application's user to change the appearance (e.g., minimize, highlight) of a set of clips that are assigned a particular role. In conjunction with the appearance change, or instead of it, the media editing application of some embodiments provides tools to enable or disable different sets of clips for playback based on the assigned roles. For example, the application's user can disable (e.g., mute) all dialogue clips to playback other types of content, enable only dialogue clips (i.e., solo the dialogue clips) to only playback the dialogue content, etc. Several examples of these focus-editing features will now be described by reference to FIGS. 29-34.

Figure 29:
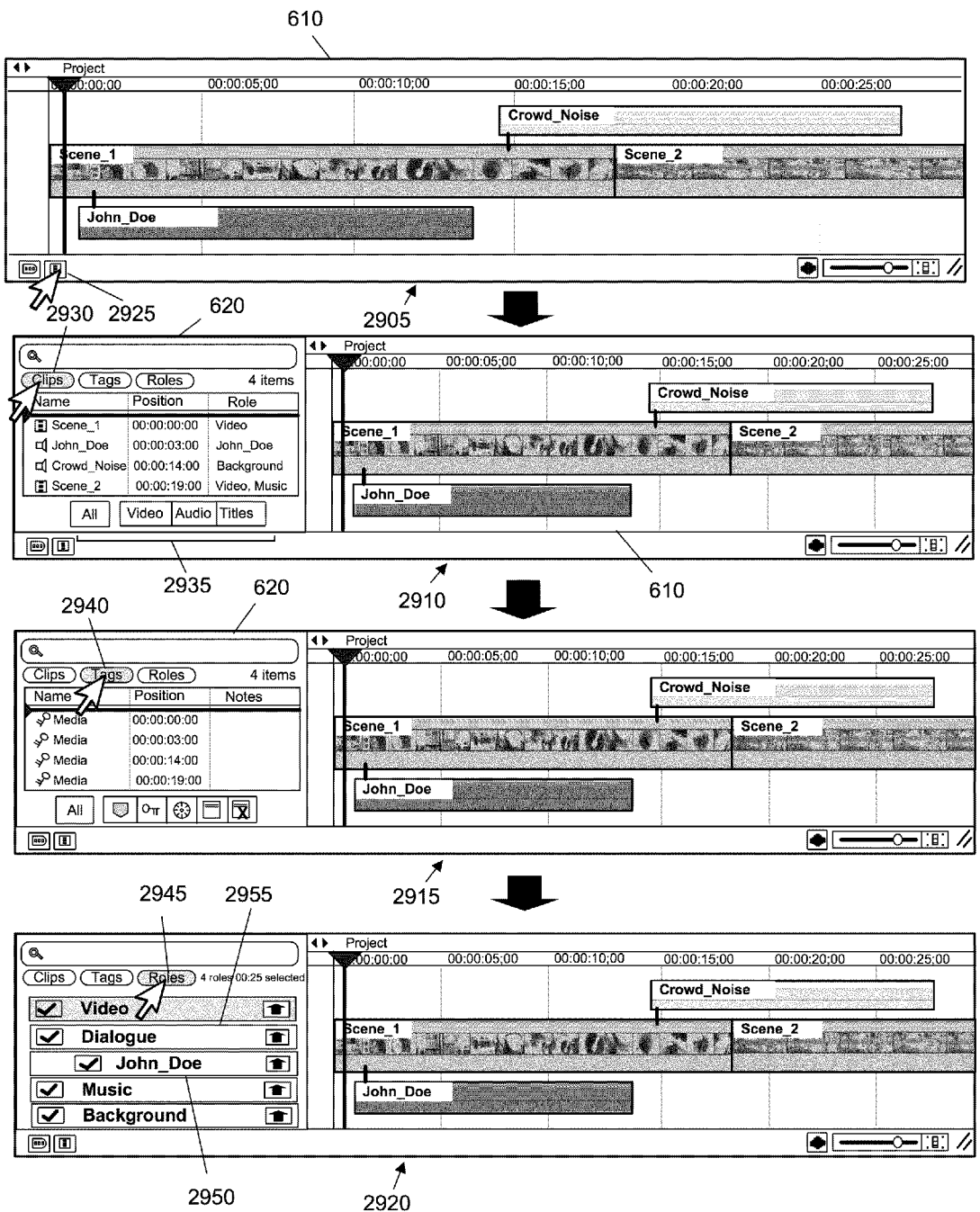
FIG. 29 provides an illustrative example of activating a timeline search tool with role-based focus editing tools.

FIG. 29 provides an illustrative example of activating the timeline search tool 620 with role-based focus editing tools. Specifically, this figure shows in four operational stages 2905-2920 how the timeline search tool 620 can be used to search for clips based on the assigned roles, as well as clip names and keywords. In the first stage 2905, the composite display area 610 displays representations of several clips in a composite presentation. The user might have added these clips to the composite presentation by dragging and dropping them from the clip browser (not shown) to the composite display area 610. As shown, the media editing application includes a control 2925 for showing or hiding the timeline search tool 620.

The selection of the control 2925 causes the media editing application to displays the timeline search tool 620, as illustrated in the second stage 2910. The timeline search tool 620 is displayed adjacent to the composite display area 610. However, the timeline search tool 620 may be displayed elsewhere, in some embodiments. For example, the timeline search tool may be provided in its own window separate from the composite display area 610.

The second stage 2910 shows the timeline search tool 620 in a clips view. Specifically, the timeline search tool 620 displays this clips view because the clips tab 2930 is activated. In the clips view, the timeline search tool 620 lists each clip or a duration of the clip that is added to the composite display area 610. One or more scrollbars may be displayed when the list of clips does not fit in the timeline search tool 620. In some embodiments, each particular clip in the list represents an index to the particular clip in the composite display area 610. The user can select any one of the indices to navigate to a position of a corresponding clip in the composite display area 610. In some embodiments, the selection of a clip in the timeline search tool 620 causes the corresponding clip to be selected in the composite display area 610.

In the example illustrated in FIG. 29, the clips are listed in chronological order starting with a first clip in the composite display area 610 and ending with a last clip. Also, each clip includes (1) a clip icon that indicates the type of clip (e.g., video, audio, title, etc.), (2) a clip name, and (3) time duration. A user can choose what types of clips are listed in the timeline search tool 620 by selecting one or more controls from a set of controls 2935. For example, the application's user can choose whether only video clips, audio clips, or title clips are displayed in the timeline search tool 620.

The third stage 2915 shows the selection of the keywords tab 2940 from the timeline search tool 620. The selection causes the timeline search tool 620 to display a keywords view. In the keywords view, the timeline search tool 620 lists each keyword that is associated with one or more ranges of a clip in the composite display area 610. In addition to keywords, some embodiments list other items, such as different markers (e.g., ratings marker, to-do markers, etc.), smart collections, etc. Not unlike the listing of clips in the clip view, each item (e.g., keyword, marker, smart collection) represents an index to the item in the composite display area. The user can select any one of the indices to navigate to a position of a corresponding item in the composite display area 610. In some embodiments, the selection of a keyword causes one or more clips or ranges of clips associated with the keyword to be selected in the composite display area 610.

The fourth stage 2920 shows the timeline search tool 620 after the selection of the roles tab 2945. The selection causes the timeline search tool 620 to display a roles view. In this roles view, the timeline search tool 620 lists each role that is assigned with one or more clips in the composite display area 610. In the example illustrated in FIG. 29, the list of roles also includes custom roles. For instance, the timeline search tool displays a "John_Doe" role, which is a sub-role 2950 of the "Dialogue" role 2955. Several examples of creating custom roles are described above by reference to FIGS. 26 and 27.

Figure 30:
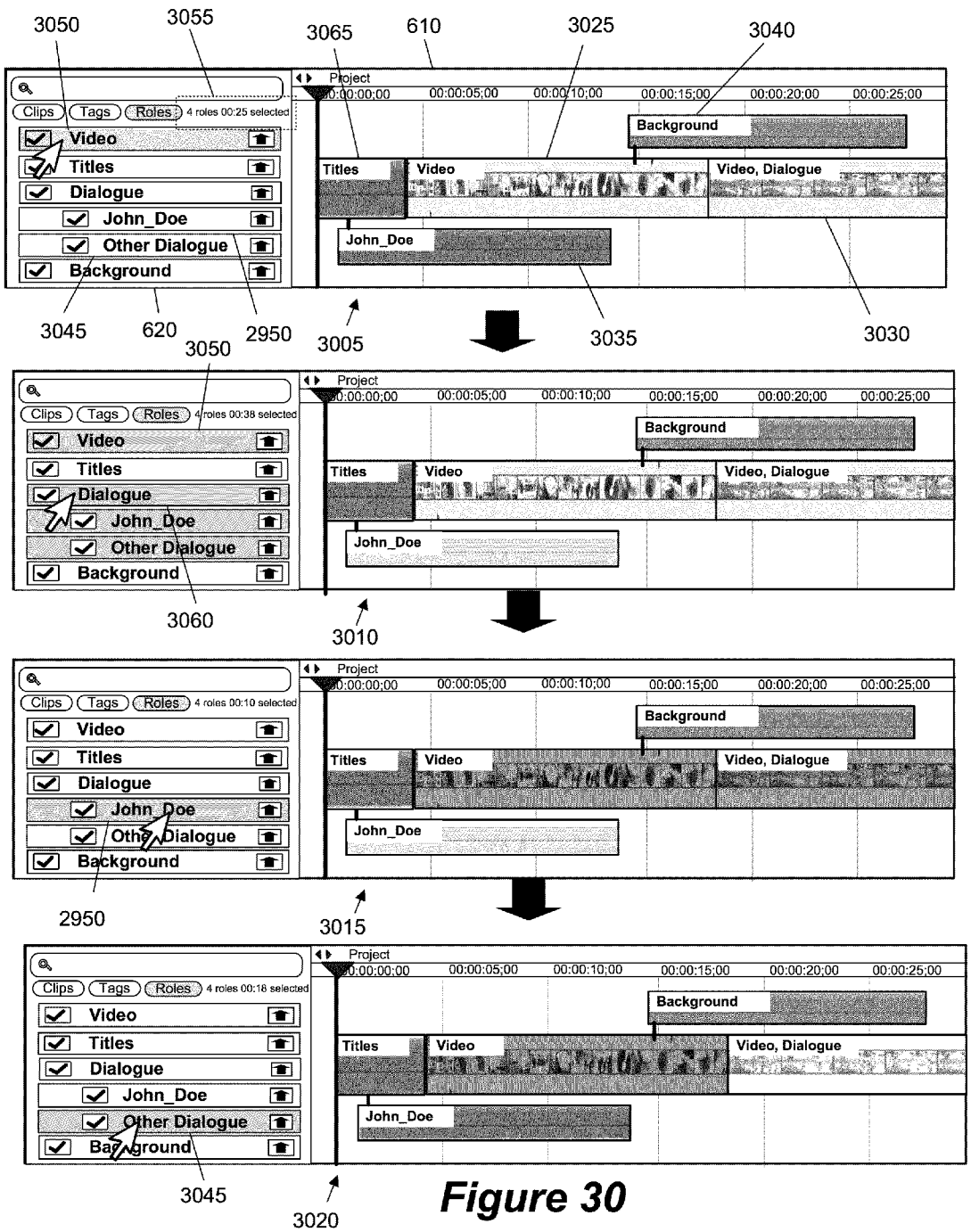
FIG. 30 illustrates an example of utilizing the timeline search tool to highlight clips in the composite display area.

FIG. 30 illustrates an example of utilizing the timeline search tool 620 to modify the appearance of clips in the composite display area 610. In particular, this figure shows in four operational stages 3005-3020 how one or more roles can be selected from timeline search tool 620 to highlight those clips associated with the selected roles. Different embodiments modify the appearance of clips in the composite display area differently. For example, the appearance of the clips can be modified by changing the color, transparency, 3D effect, etc.

In the first stage 3005, the composite display area 610 displays several media clips. Specifically, it displays (1) a title clip 3065 assigned the "Titles" role, (2) a video clip 3025 assigned the "Video" role, (3) a video clip 3030 assigned both the "Video" and "Dialogue" roles, (4) an audio clip 3035 assigned the "John_Doe" sub-role, and (5) an audio clip 3040 assigned the "Background" role. Each of the assigned roles is also listed in the timeline search tool 620. The user can select any one or more of these roles to highlight each clip that is associated with the selected roles.

In the roles view, the media editing application of some embodiments list other items. This is illustrated in FIG. 30 as timeline search tool 620 lists a selectable item 3045 labeled "Other Dialogue". This selectable item 3045 is different from the "John_Doe" role, which is a sub-role of the "Dialogue" role. In other words, the selectable item 3045 does not represent a sub-role of the "Dialogue" role specified by the application's user. Instead, the selectable item 3045 represents a sub-role provided by the media editing application to highlight other "Dialogue" clips that are not assigned the "John_Doe" sub-role 2950.

Referring to the first stage 3005, the user selects the "Video" role 3050 from the timeline search tool 620. The selection causes each of the two video clips 3025 and 3030 assigned the "Video" role to be highlighted in the composite display area 610. In the example illustrated in FIG. 30, the timeline search tool 620 includes a display area or field 3055 that displays information related to the selected role. For example, in the first stage 3005, the display area 3055 displays the total time of the two clips 3025 and 3030 in response to the selection of the "Video" role 3050. In some embodiments, the display area 3055 lists the total number of different roles assigned to the clips in the composite display area 3055. For example, when there are five different roles assigned to the clips in the composite display area 610, the display area 3055 may indicate that there are five roles.

In some embodiments, the media editing application allows concurrent selection of multiple roles from the timeline search tool 620. This is illustrated in the second stage 3010 of FIG. 30 as both the "Video" and "Dialogue" roles are selected at the same time. The user might have selected these roles by first selecting the "Video" role 3050 and then selecting the "Dialogue" role 3060 while holding down a modifier key (e.g., shift key or control key). In the second stage 3010, the section of the "Dialogue" role 3060 result in the selection of the "John_Doe" sub-role 2950 and the selectable item 3045. The "John_Doe" sub-role 3050 is selected because it is a sub-role of the "Dialogue" role 3060. The selectable item 3045 is also selected because this item represents other "Dialogue" clips that are not assigned the "John_Doe" sub-role.

The third stage 3015 illustrates the selection of the "John_Doe" sub-role 2950 from the timeline search tool 620. As shown, the selection causes the clip 3035 that is assigned the sub-role to be highlighted in the composite display area 610. The fourth stage 3020 illustrates the selection of the selectable item 3045 that represents the sub-role provided by the media editing application. In the fourth stage 3020, the selection of the selectable item 3045 causes all "Dialogue" clips that does not include the "John_Doe" sub-role (e.g., the video clip 3030) to be highlighted in the composite display area.

As mentioned above, the media editing application of some embodiments allows its users to create compound clips from multiple different clips. In some embodiments, a compound clip is any combination of clips (e.g., in the composite display area, in the clip browser) and nests clips within other clips. Compound clips, in some embodiments, can contain video and audio clip components, clips, and other compound clips.

Figure 31:
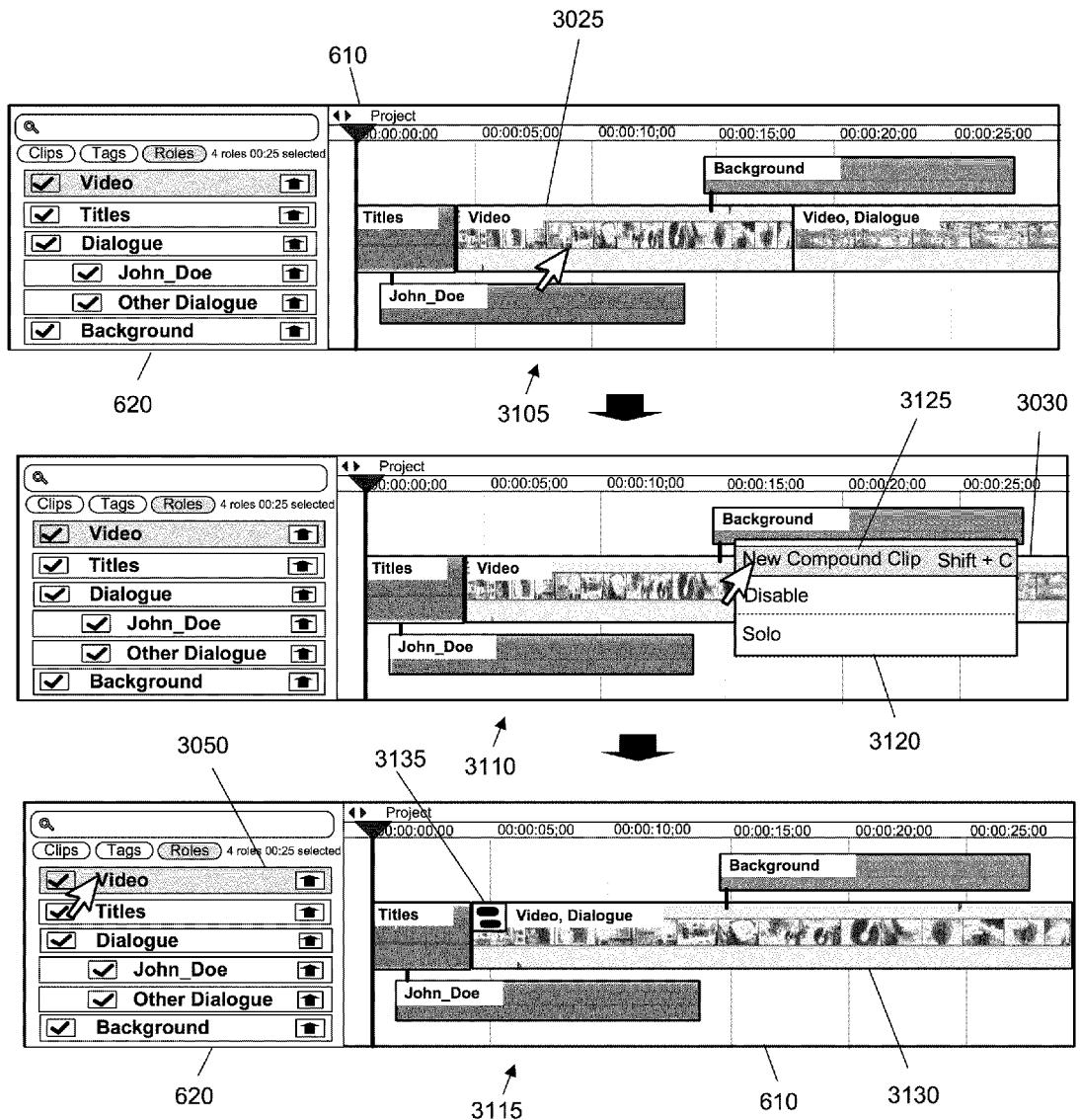
FIG. 31 illustrates and example of creating and highlighting a compound clip in the composite display area.

FIG. 31 provides an illustrative example of creating a compound clip in the composite display area 610 and highlighting the compound clip based on its assigned role. Three operational stages 3105-3115 are illustrated in this figure. In the first stage 3105, the composite display area 610 displays several clips. The user selects the video clip 3025 as a first clip for the compound clip. The video clip 3025 is assigned the "Video" role. The second stage 3110 shows the selection of the video clip 3030 along with the video clip 3025. The second stage 3110 also shows the activation of a context menu 3120. This menu 3120 includes an option 3125 to create a compound clip from the selected video clips 3025 and 3030.

As shown in the third stage 3115, the selection of the option 3125 causes the two clips 3025 and 3030 to be combined into one compound clip 3130. The compound clip 3130 includes a marking 3135, which provides an indication to the user that it is a compound clip. In some embodiments, the marking 3135 is a user-selectable item that when selected reveals or unpacks the two clips 3025 and 3030 in the composite display area 610.

As mentioned above, the roles of the nested clips are inherited by the compound clip. This is illustrated in the third stage 3115 as the compound clip 3130 is listed as having the "Video" role inherited from the clips 3025 and 3030, and the "Dialogue" role inherited from the clip 3030. The third stage also illustrates the selection of the "Video" role 3050 from the timeline search tool 620. As the compound clip has inherited the "Video" role from its nested clips, the selection causes the compound clip 3130 to be highlighted in the composite display area 610.

Figure 32:
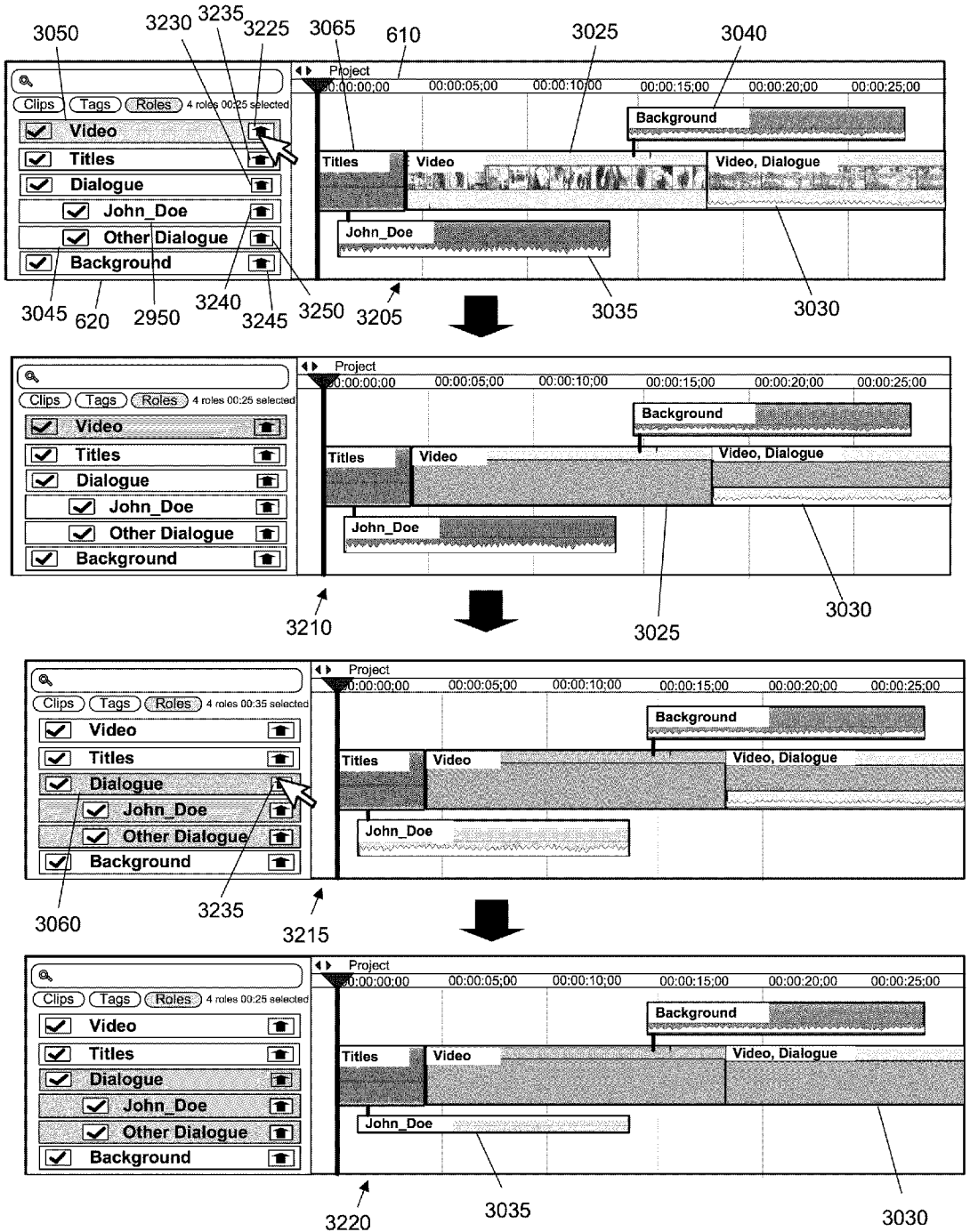
FIG. 32 illustrates minimizing clips in the composite display area based on the assigned roles.

In the previous example, several clips are highlighted in the composite display area based on the assigned roles. In some embodiments, the media editing application modifies the appearance of clips in the composite display area by minimizing different sets of clips based on the assigned roles. All of the examples described above for highlighting clips are applicable to minimizing clips as these features both modify the appearance of the clips. The minimization feature is particularly useful when the composite display area 610 includes many clips (e.g., video clips, audio clips, compound clips, etc.) that are part of the composite presentation. FIG. 32 illustrates minimizing clips in the composite display area based on the assigned roles. Four operational stages 3205-3220 of the media editing application are illustrated in this figure.

As shown in FIG. 32, the composite display area 610 displays several media clips. Specifically, it displays (1) the title clip 3065 assigned the "Titles" role, (2) the video clip 3025 assigned the "Video" role, (3) the video clip 3030 assigned both the "Video" and "Dialogue" roles, (4) the audio clip 3035 assigned the sub-role of "Dialogue" role, and (5) the audio clip 3040 assigned the "Background" role. The media editing application also displays each of these clips with a filmstrip representation and/or a waveform representation.

The timeline search tool 620 lists the different roles assigned to the clips in the composite display area 610. As shown, the timeline search tool 620 includes several buttons 3225-3250 for minimizing clips. Each of these buttons is associated with a particular role, sub-role, or selectable item. For example, the button 3225 is associated with the "Video Role" 3050, the button 3240 is associated with the sub-role 2950, and the button 3250 is associated with the selectable item 3045. The user can select any one of these buttons 3225-3250 to minimize or un-minimize each clip that is assigned a particular role that corresponds to the selected button. As an example, the user can select the button 3240 to minimize or un-minimize each clip that is assigned the sub-role 2950. The user can also select the button 3250 to minimize or un-minimize each "Dialogue" clip that is not assigned the sub-role 2950.

In some embodiments, the media editing application minimizes clips by modifying the height of clips and moving the clips closer to one another. This optimizes the workspace because the user does not have to scroll up and down the composite display area to find clips. In some embodiments, the media editing application also removes visual distractions (e.g., waveforms, filmstrip representation) from clips.

The first stage 3205 illustrates the selection of the button 3225 for minimizing all clips in the composite display area 610 that are assigned the "Video" role 3050. As shown in the second stage 3210 the selection causes the video clips 3025 and 3030 that are assigned the "Video" role to be minimized in the composite display area 610. In the example illustrated in FIG. 32, the video clips are minimized such that the clips' corresponding filmstrip representations are not visible in the composite display area. For example, the video clip 3025 is represented as horizontal bars that occupy less space than representations of other clips in the composite display area 610. As the video clip 3030 includes audio content, the video clip is represented only by its waveform representation.

The third stage 3215 illustrates the selection of the button 3235 for minimizing all clips in the composite display area 610 that are assigned the "Dialogue" role 3060. As shown in the fourth stage 3220, the selection causes the clips 3030 and 3035 that are assigned the "Dialogue" role to be minimized in the composite display area 610. In the example illustrated in FIG. 32, the clips 3030 and 3035 are minimized such that the clips' corresponding waveform representations are not visible in the composite display area. For example, the audio clip 3035 is represented as horizontal bar. Also, the waveform representation of the video clip 3030 is minimized as it is assigned the "Dialogue" role. This is in addition to the video clip's filmstrip representation that was minimized in the second stage 3210.

In some embodiments, the media editing application modifies the appearance of the clips that are assigned one or more roles in a different manner. For example, the media editing application of some embodiments modifies clips that are on a primary lane (also called a "spine") differently than those that are on anchor lanes.

Figure 33:
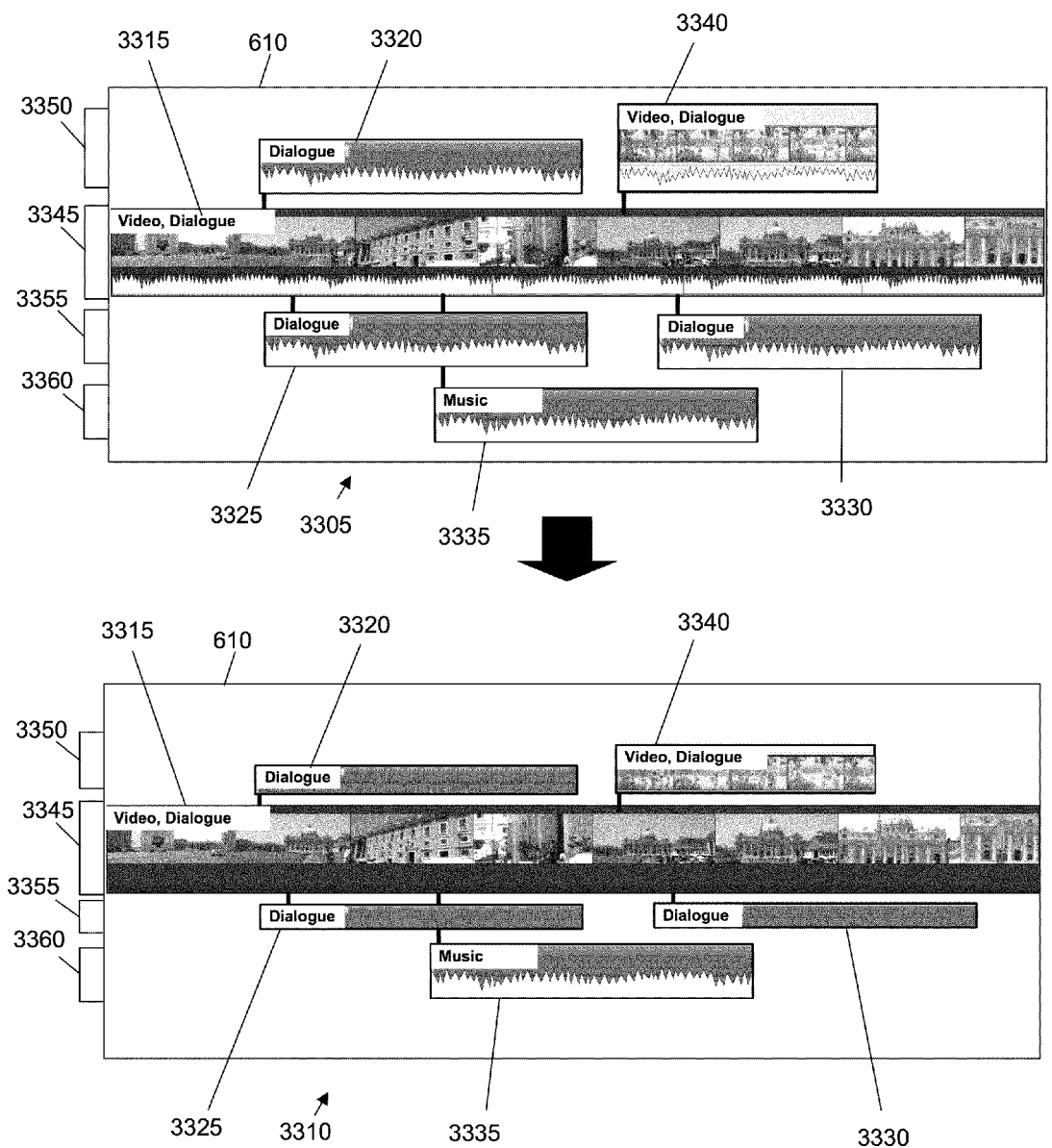
FIG. 33 provides an illustrative example of modifying clips that are assigned the same role differently.

FIG. 33 provides an illustrative example of modifying clips that are assigned the same role differently. Specifically, this figure illustrates in two operational stages 3305 and 3310 how the media editing application of some embodiments modifies the appearance of a clip that is on a primary lane differently than clips that are on anchor lanes.

The first stage 3305 illustrates the composite display area 610 prior to minimizing clips. As shown, the composite display area 610 displays a video clip 3315 in the primary lane 3345. This video clip 3315 or spine clip anchors several other clips 3320-3340 in the anchor lanes 3350-3360. Here, the video clips 3315 and 3340 are assigned both the "Video" and "Dialogue" roles. Each video clip is displayed with corresponding filmstrip and waveform representations. The audio clip 3340 is assigned the "Music" role, while the other audio clips 3320-3330 are assigned the "Dialogue" role. Each of the audio clips 3320-3335 is displayed with a corresponding waveform representation.

The second stage 3310 illustrates the composite display 610 after selecting a control (not shown) to minimize clips that are assigned the "Dialogue" role. As shown, the selection causes the video clip 3315 or spine clip to be modified differently than the anchor clips 3320-3340. Specifically, the size of each of the anchored clips 3320-3340 is modified such the corresponding waveform representation is not shown in the composite display area 610. Different from the anchor clips, the spine clip's size is not modified in the composite display area 610. Instead, the spine clip 3315 is shown in the composite display area 610 without the waveform representation.

One of ordinary kill in the art would understand that modifying a clip's representation and size are just two examples modifications. That is, the appearance of the clip can be modified using one or more different techniques. For example, the appearance of the clip can be modified by changing the color, transparency, 3D effect, etc.

Figure 34:
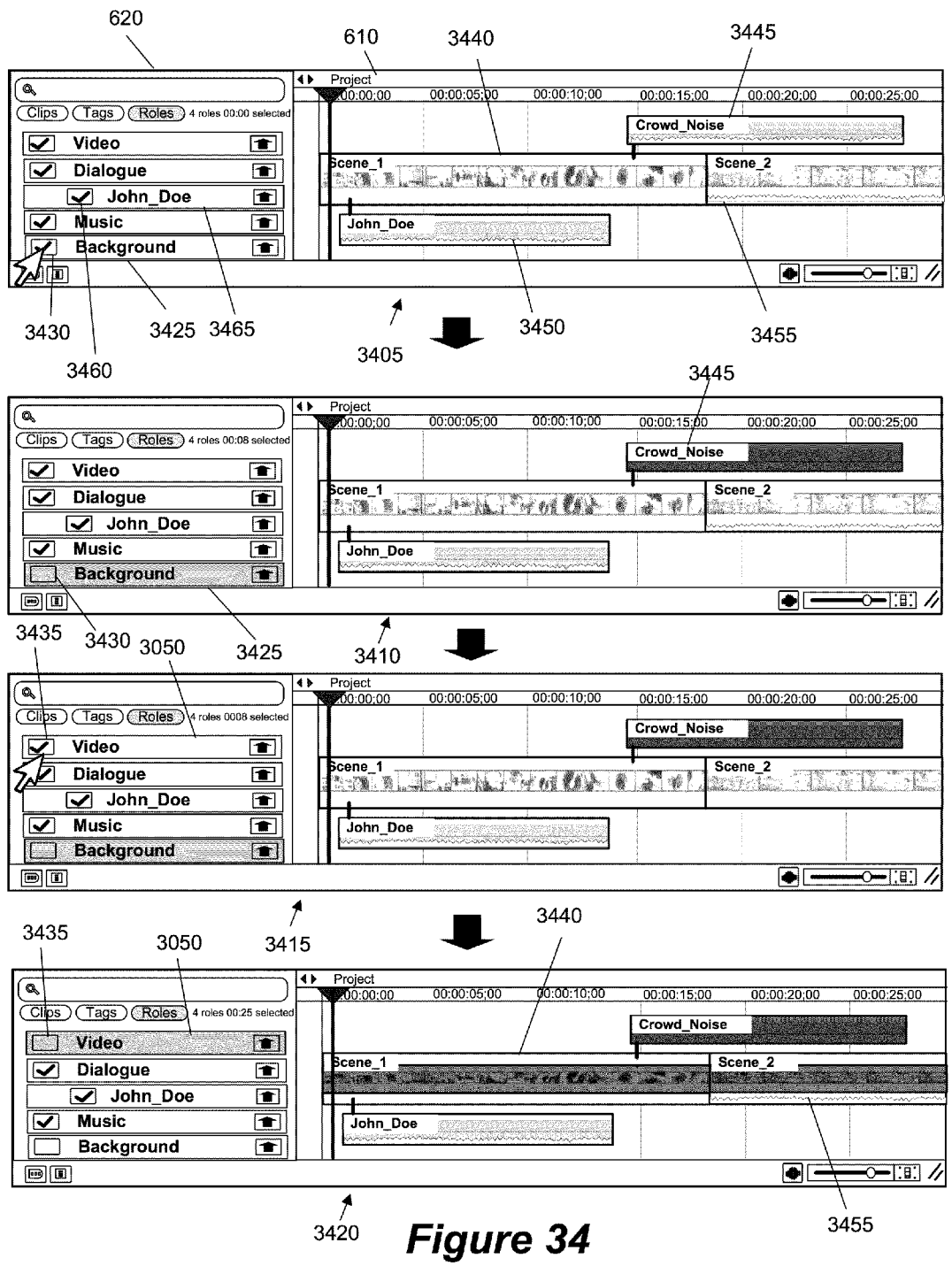
FIG. 34 provides illustrative examples of disabling several clips in the composite display area based on the assigned roles.

In conjunction with the appearance change, or instead of it, the media editing application of some embodiments provides tools to enable or disable different sets of clips for playback based on the assigned roles. In some embodiments, the clips can be disabled during playback. For example, the user can select a particular role during playback of a composite presentation and no clips that are assigned the particular role will be played back. FIG. 34 provides an illustrative example of disabling several clips in the composite display area 610 based on the assigned roles. Four operational stages 3405-3420 of the media editing application are illustrated in this figure.

As shown in FIG. 34, the composite display area 610 displays several media clips. Specifically, it displays (1) the video clip 3440 that is assigned the "Video" role, (2) the audio clip 3445 assigned the "Background" role, (3) the audio clip 3450 assigned a sub-role of the "Dialogue" role, and (4) the video clip 3455 assigned both the "Video" and "Dialogue" roles. The media editing application also displays each of these clips with a filmstrip representation and/or a waveform representation.

The timeline search tool 620 lists the different roles assigned to the clips in the composite display area 610. As shown, each particular role is associated with user selectable items (e.g., check box) for disabling clips that are assigned the particular role. For example, the user selectable item 3430 is associated with the "Background" role 3425, the user selectable item 3460 is associated with the sub-role 3465, etc. The user can select any one of these user-selectable items to disable or enable each clip that is assigned a particular role. As an example, the user can select the selectable item 3460 to playback or not playback each clip that is assigned the sub-role 3465.

The first stage 3405 illustrates the selection of the user selectable item 3430 to disable playback of all clips in the composite display area 610 that are assigned the "Background" role 3425. The second stage 3410 shows the media editing application after disabling each clip that is assigned the "Background" role. As shown, the selection of the user selectable item 3430 causes the audio clip 3445 to be disabled during playback of the composite presentation. In the example illustrated in FIG. 4, the media editing application indicates that the clip 3445 is disabled by modifying its appearance in the composite display area 610. Specifically, the clip 3445 is grayed out so that the application's user can distinguish the disabled clips from non-disabled clip. Here, the selectable item 3430 can be re-selected to enable the clip 3445. In some embodiments, the media editing application disables audio clips by muting the clips prior to mixing the audio of the composite presentation for playback.

The third stage 3415 illustrates the selection of the selectable item 3435 to disable all clips in the composite display area 610 that are assigned the "Video" role 3050. As shown in the fourth stage 3420, the selection causes the video clips 3440 and 3445 that are assigned the "Video" role to be disabled. Similar to the audio clip 3455, the media editing application indicates that these clips 3440 and 3455 are disabled by graying out the clips' filmstrip representation. In this example, the waveform representation of the video clip 3455 is not modified (e.g., not grayed out) as the audio portion is assigned the "Dialogue" role that is not disabled.

In some embodiments, the sub-roles are by default included in editing operations that are assigned to the parent. For instance, when the parent role is selected to disable clips, all clips that are assigned the parent's sub-roles are disabled. Similarly, when the parent role is selected to modify the appearance of clips, all clips that are assigned the parent's sub-roles are modified.

Figure 35:
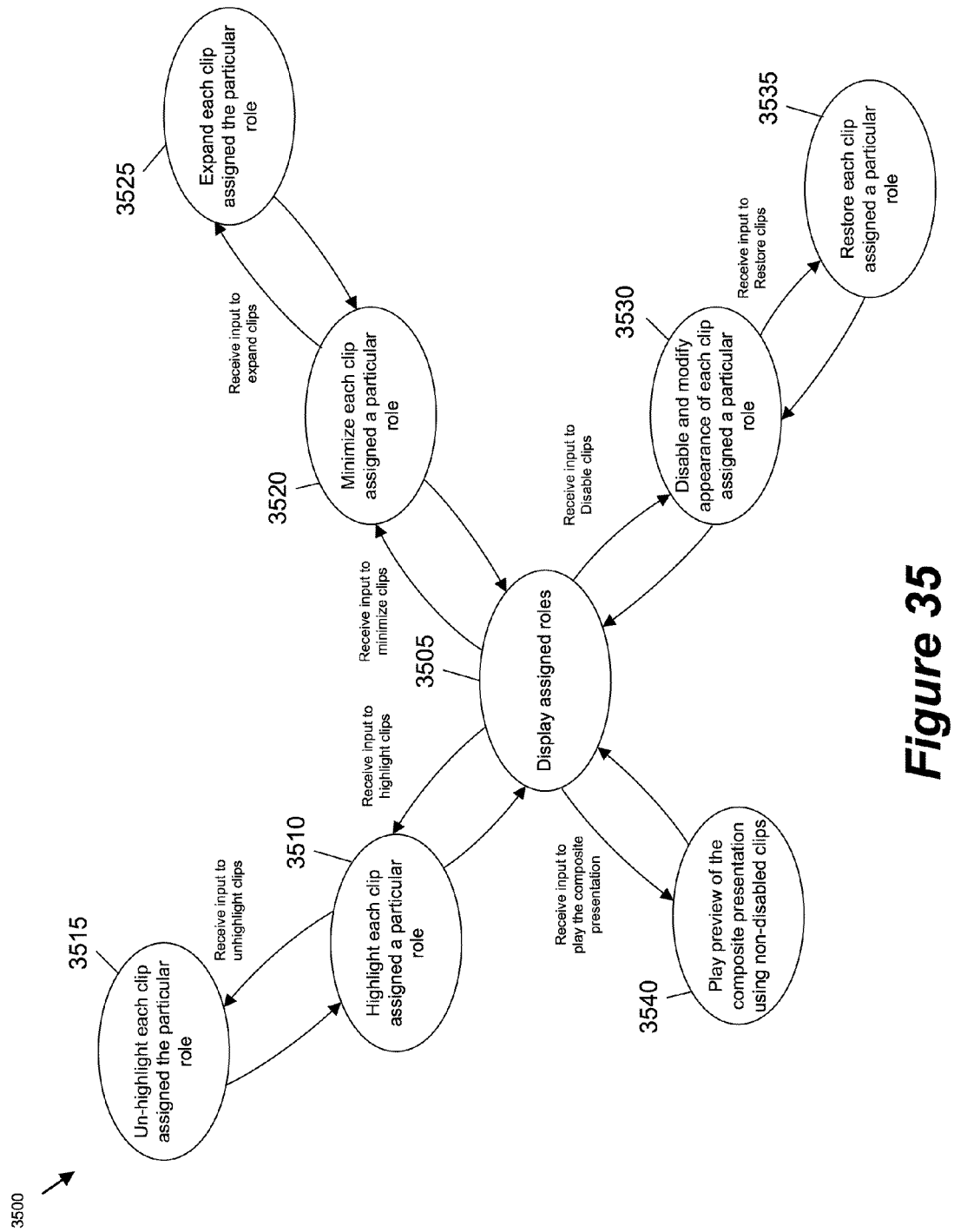
FIG. 35 conceptually illustrates a state diagram of a media-editing application of some embodiments.

FIG. 35 conceptually illustrates a state diagram 3500 of a media-editing application of some embodiments. One of ordinary skill in the art will recognize that the state diagram 3500 does not describe all states of the media-editing application, but instead specifically pertains to several example operations that are performed to highlight, minimize, and disable clips that define a composite presentation.

As shown in FIG. 35, the media editing application (at state 3505) displays the different roles assigned to clips in the composite presentation. As mentioned above, the different roles may be listed in the timeline search tool. Alternatively, the different roles can be displayed elsewhere, in some embodiments. For example, the roles tool may be provided in its own window or display area separate from the timeline search tool. At this state 3505, the media-editing application may be performing other tasks including importing or editing related tasks, organizing, playback operations, etc. In addition, at many of the other states, the application could be performing a wide variety of background tasks (e.g., transcoding, analysis, etc.).

At state 3510, the media editing application highlights each clip assigned a particular role based on user input. For example, the user might have selected the particular role from the roles tool to highlight clips. When an input is received to un-highlight clips, the media editing application transitions to state 3515. At this state, the media editing application un-highlights each clip that is assigned the particular role. Several examples of highlighting and un-highlighting clips are described above by reference to FIGS. 30-31.

When an input is received to minimize clips, the media editing application transitions to state 3520. At this state, the media editing application minimizes each clip that is assigned the particular role. In some embodiments, the media editing application minimizes each clip by modifying the size of the clip's representation. For example, the media editing application of some embodiments minimizes media clips such that the clips' filmstrip and/or waveform representations are not displayed in the composite display area. Alternatively, the media editing application may minimize each clip by hiding the clip in a display area (e.g., the composite display area).

At state 3525, the media editing application expands each clip that is assigned the particular role. Specifically, the media editing application expands one or more clips in response to a user input. For example, the user might have selected a user interface control that is associated with the particular role to expand the one or more clips.

When an input is received to disable clips, the media editing application transitions to state 3530. At this state, the media editing application disables each clip that is assigned the particular role. By disabling one or more of the clips, the media editing application allows the application's user to playback only those clips that are not disabled. This allows the user to see or hear what other non-disabled clips are contributing to the composite presentation. For example, the user can disable all the "Dialogue" clips and "Video" clips to playback only "Music" clips. At 3530, the media editing application of some embodiments also modifies the appearance of each disabled clip. Example of disabling several clips and modifying the appearance of the clips are described above by reference to FIG. 34.

When an input is received to restore the disabled clips, the media editing application transitions to state 3535. At this state, the media editing application restores (e.g., enables, restore appearance of) each clip that is assigned the particular role.

At state 3540, the media editing application plays a preview of the composite presentation using any non-disabled clips. The media editing application of some embodiments transitions to this state in any number of different ways. For example, the user can select a play button, input a shortcut key, select a menu item, etc. Also, the media editing application of some embodiments allows the user to drag a playhead along a timeline to display a preview of the composite presentation at a particular point in the presentation, or to play the preview starting from the particular point by selecting the play button.

In the examples described, different editing operations are performed based on the assigned roles. These examples include modifying appearance and disabling clips. In some embodiments, the media editing application allows the user to perform other editing operations using the assigned roles. One example is applying effects based on the assigned roles. For example, an echo or a reverb effect can be applied to each clip tagged with the "Dialogue" role. Similarly, a filter (e.g., color value adjustment, distortion, transition, blur, etc.) can be applied to all clips tagged with a particular role.

VI. Outputting a Composite Presentation Based on Roles

In some embodiments, the media editing application allows a composite presentation to be output to different files based on the assigned roles. The media editing application of some embodiments performs the multiple-file export operations in a single share operation. The application's user does not have to specify configuration for a second output file after exporting the first output file. That is, once a multi-track output has been specified, the media editing application performs one or more rendering passes to output the composite presentation to multiple files. Instead of, or conjunctive with this output feature, the media editing application of some embodiments allows its user to output one or more selected roles as a single file.

A. Outputting Roles to Different Files

Figure 36:
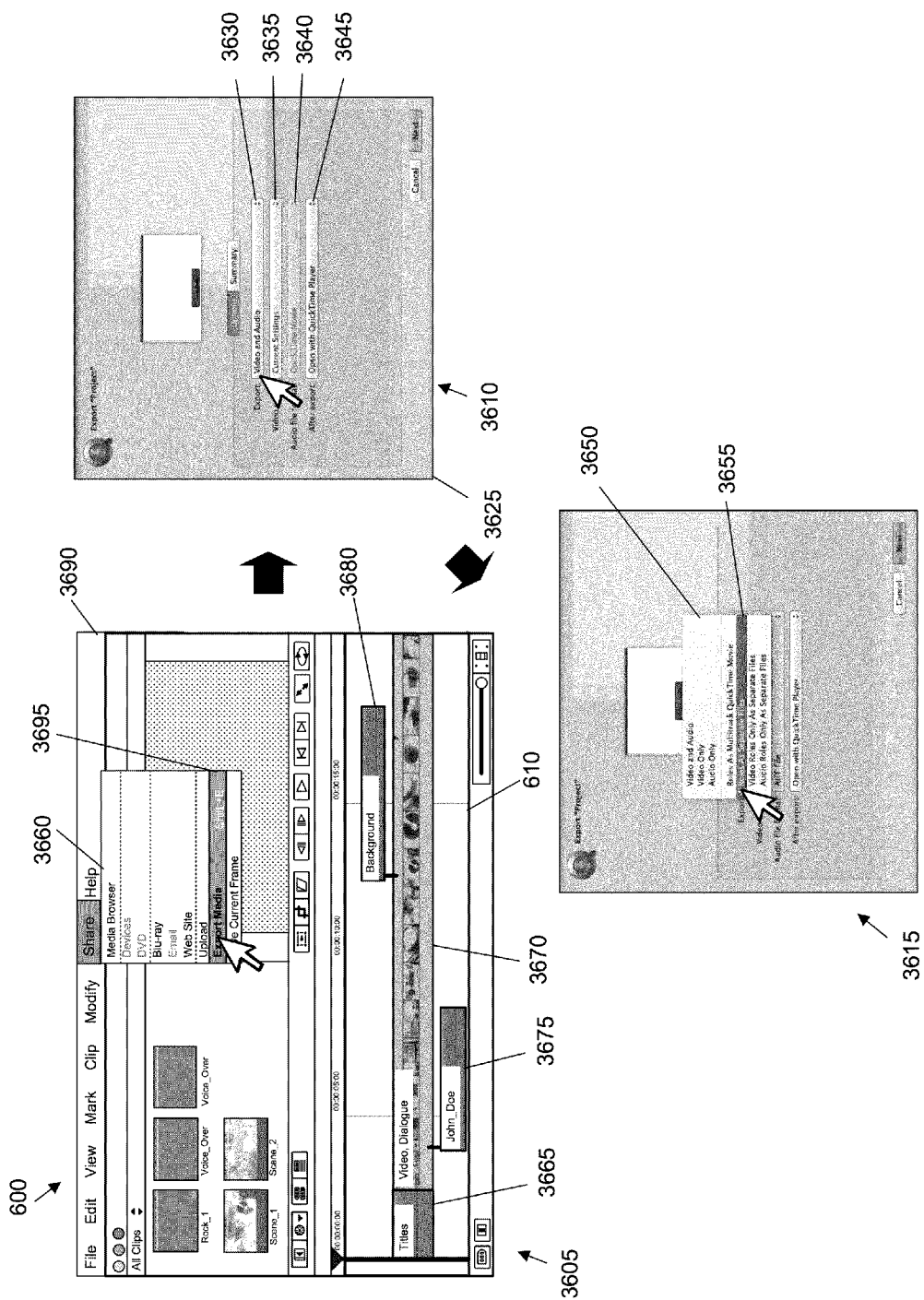
FIG. 36 provides an illustrative example of selecting an option to export the composite presentation to different files.

Several examples of outputting a composite presentation to different files will now be descried by reference to FIGS. 36-43. FIG. 36 provides an illustrative example of selecting an option to export the composite presentation to different files. Three operational stages 3605-3615 of the media editing application are illustrated in this figure. The media editing application is the same as the one described above by reference to FIG. 6.

The first stage 3605 illustrates the media editing application after the user has defined or created a composite presentation using the application's composite display area 610. Specifically, the user has arranged four media clips 3665-3680 clips in the composite display area 610 according to their sequence in the composite presentation. Each of the clips 3665-3680 is assigned a particular role. The title clip 3665 is assigned the "Titles" role, the compound clip 3670 is assigned both the "Video" and "Dialogue" roles, the audio clip 3675 is assigned the "John_Doe" sub-role, and the audio clip 3680 is assigned the "Background" role.

In the first stage 3605, the user selects a drop-down menu labeled "Share" from the menu bar 3690. The selection results in a display of a list of menu items 3660 for outputting the composite presentation. Here, the user selects a menu item 3695 labeled "Export Media". Alternatively, the user can select a shortcut key corresponding to the menu item 3695 to initiate the export operation.

As shown in the second stage 3610, the selection of the menu item 3695 causes the media editing application to display an export tool 3625. The export tool 3625 includes several different export options. Specifically, it includes an option 3635 to specify a video codec, an option 3640 to specify an output file format, and an option 3645 to open one or more files that are exported. The export tool 3625 also includes an option 3630 to specify what items to export for the composite presentation.

The third stage 3615 illustrates the selection of the option 3630. The selection causes a list of different export options 3650 to appear. In the example illustrated in FIG. 36, the different export options include (1) exporting both video and audio, (2) exporting video only, (3) exporting audio only, (4) exporting roles as a multitrack file (e.g., movie file), (5) exporting roles as separate files, (6) exporting video roles only as separate files, and (7) exporting audio roles only as separate file. The user can select any one of these options to output the composite presentation. As shown in the third stage 3615, the user selects an option 3655 to export roles as separate files.

Once a multi-file output has been selected, the media editing application of some embodiments allows the user to customize each output file. Examples of such customization include removing output files, adding additional output files, specifying one or more roles for each output file, and creating reusable presets. Several such examples will now be described by reference to FIGS. 37-39.

Figure 37:
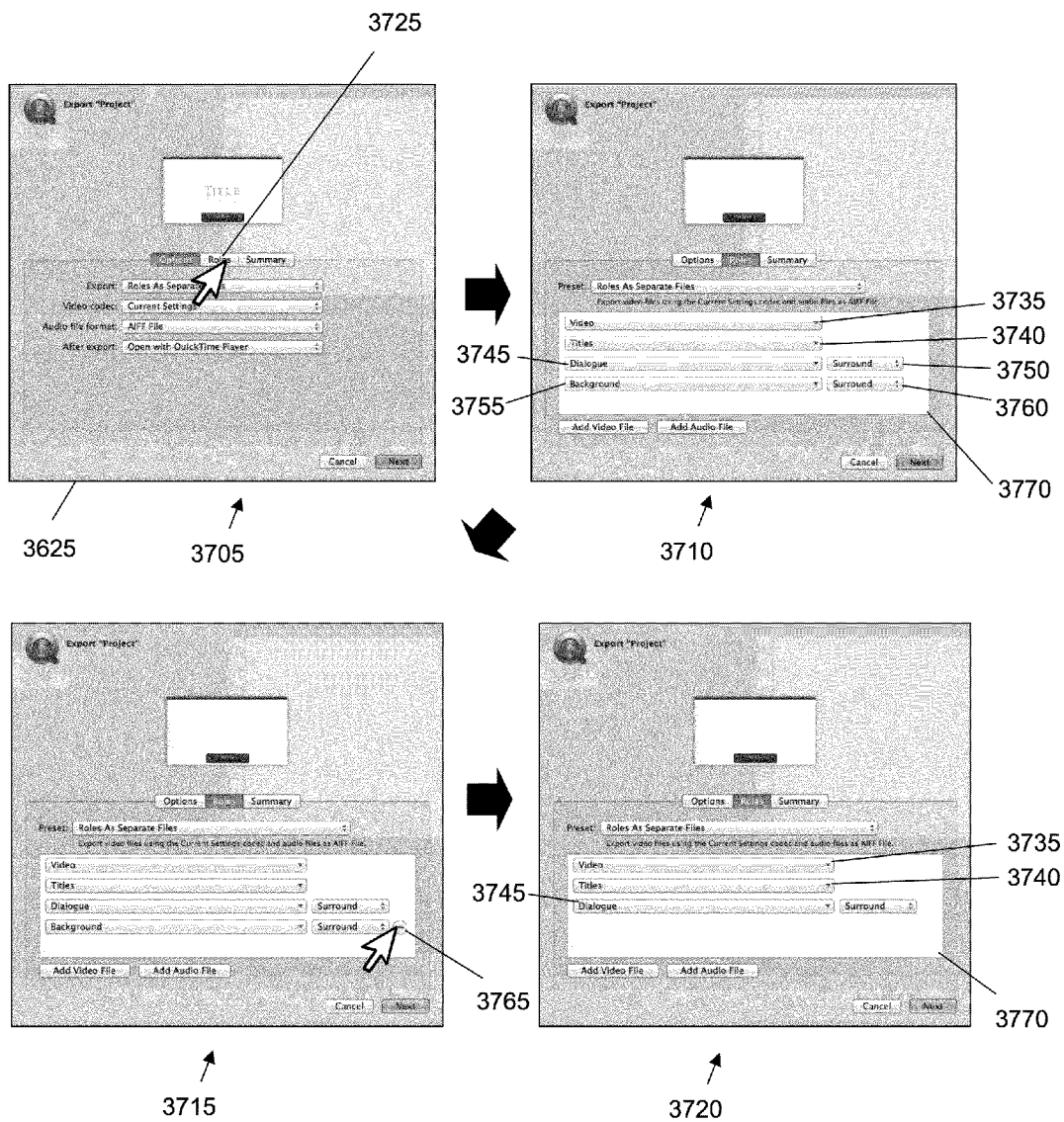
FIG. 37 provides an illustrative example of removing an output file.

FIG. 37 provides an illustrative example of removing an output file. Specifically, this figure illustrates in four operational stages 3705-3720 how the export tool 3625 can be used to remove an output file that corresponds to a particular role. The first stage 3705 illustrates the media editing application after the user has selected an option to output roles as separate files. To customize the output files, the user selects a "Roles" tab 3725 from the export tool 3625. The selection causes the export tool 3625 to display a roles view 3770.

The second stage 3710 illustrates the export tool 3625 displaying the roles view 3770. As shown, the roles view 3770 lists all roles that are assigned to one or more clips in the composite presentation. Specifically, each role is listed on a particular track (3735, 3740, 3745, or 3755) that represents one output file. In some embodiments, each particular track represents either a video track that is output as a video file or an audio track that is output as an audio file. In the example illustrated in FIG. 37, (1) the track 3735 represents a first video track for each video clip that is assigned the "Video" role; (2) the track 3740 represents a second video track for each video or titles clip that is assigned the "Titles" role; (3) the track 3745 represents a first audio track for each clip that is assigned the "Dialogue" role; and (4) the track 3755 represents a second audio track for each clip that is assigned the "Background" role. The roles on these tracks (3735, 3740, 3745, and 3755) correspond to the roles assigned to the clips in the composite display area of FIG. 36.

As shown in the second stage 3710, each of the audio tracks 3745 and 3755 includes an audio control (3750 or 3760) for specifying how the corresponding audio file is output. For example, the control (3750 or 3760) can be used to specify whether the output audio is mono, stereo, or surround sound. The second stage 3710 illustrates that the default audio output is surround sound for the audio tracks 3745 and 3755. However, different embodiments may have different default output and/or a different set of audio output options. For instance, the media editing application of some embodiments provides one or more controls to pan audio content based on the assigned role. In addition, the media editing application provides different meters to monitor the output audio based on the assigned roles. Other types of controls can include volume and/or gain control for each output audio track.

The third stage 3715 shows an example of how the audio track can 3755 can be removed with the media editing application, in some embodiments. To remove the audio track 3755, the user first moves a position indicator or cursor over the track. The movement causes a control 3765 to appear adjacent to the audio track 3755. The user then selects this control 3765 to remove the audio track 3755. By removing this audio track 3755, one or more "Background" clips that are in the composite presentation are not mixed and output as a separate audio file.

The fourth stage 3720 illustrates the export tool 3625 after removing the "Background" audio track 3755. As shown, the export tool 3625 displays three remaining tracks that are to be output as three separate files. Specifically, the roles view 3770 lists the video track 3735 for a first video file that includes each clip assigned the "Video" role, the video track 3740 for a second video file that includes each clip assigned the "Titles" role, and an audio track 3745 for an audio file that includes each clip assigned the "Dialogue" role.

Figure 38:
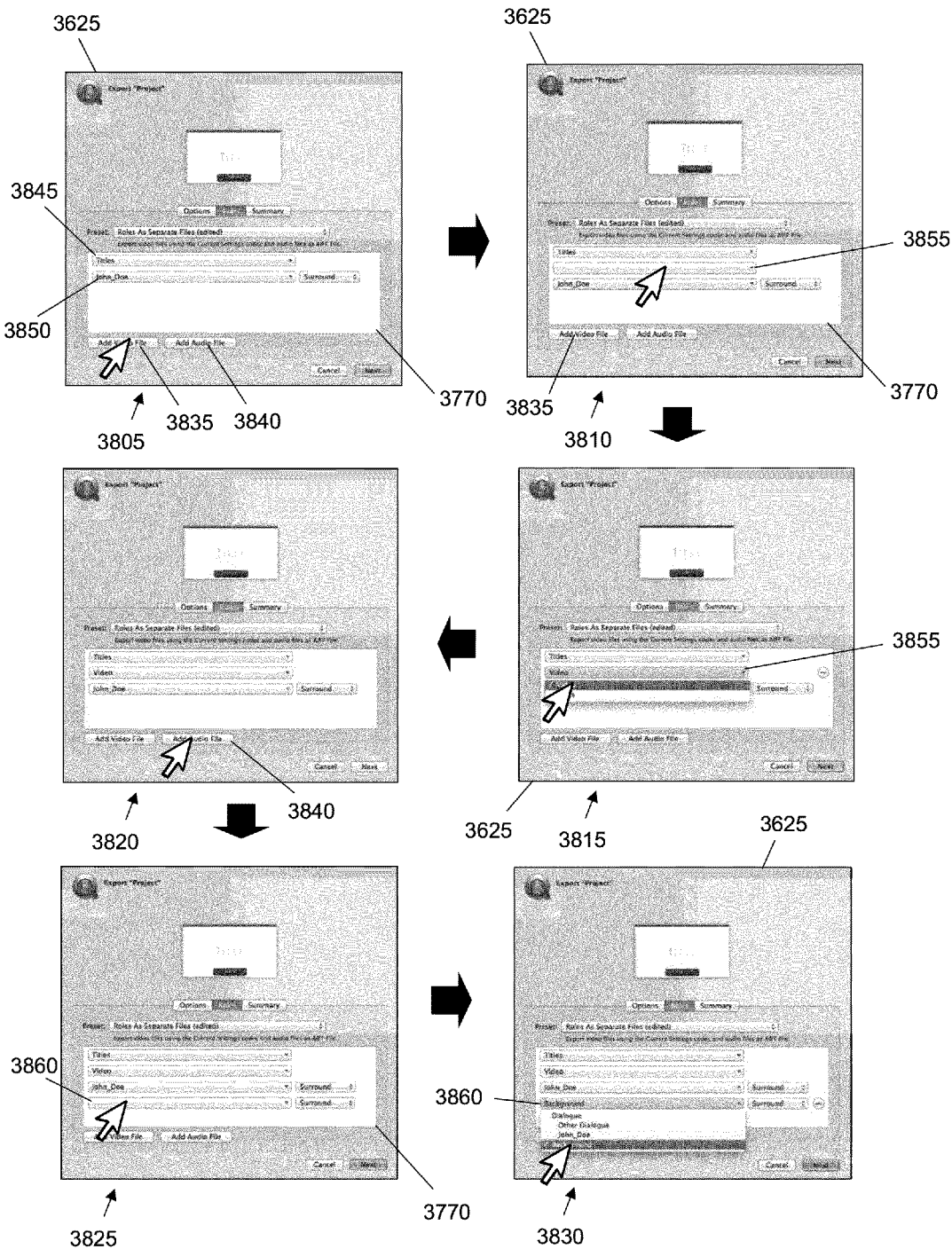
FIG. 38 provides an illustrative example of adding additional output tracks.

The previous figure illustrated an example of removing an output track. FIG. 38 provides an illustrative example of adding additional output tracks. Specifically, this figure illustrates in six operational stages 3805-3830 how the media editing application allows its user to add additional output video and audio tracks for different roles. As shown in FIG. 38, the export tool 3625 includes a button 3835 for adding video files and a button 3840 for adding audio files.

The first stage illustrates export tool 3625 displaying the roles view 3770. The roles view 3770 lists two different tracks 3845 and 3850 that are to be output as separate files. Specifically, the roles view 3770 lists the "Titles" track 3845 for an output video file, and a "John_Doe" track 3850 for an output audio file. To add an output video file, the user selects the button 3835.

The second stage 3810 illustrates the export tool 3625 after the selection of the button 3835. As shown, the selection causes a new video track 3855 to be displayed in the roles view 3770. This video track 3855 corresponds to a new video file. Here, the video track 3855 does not list any video role for the video file. To select a video role, the user selects the video track 3855.

The third stage 3815 illustrates the export tool 3625 after the selection of the video track 3855. The selection causes the video track 3855 to list available video roles. The user can select any one or more of these video roles. In some embodiments, the video roles listed in the video track 3855 correspond to the video roles that are assigned to one or more clips in the composite presentation. That is, the media editing application of some embodiments does not list any video role that is not assigned to at least one clip in the composite presentation. In the example illustrated in the third stage 3815, the list includes the "Video" role and the "Title" role. The user then selects the "Video" role to associate the role with the video track 3855.

The fourth stage 3820 illustrates adding a new audio track. To add the new audio track, the user selects the button 3840. As shown in the fifth stage 3825, the selection causes a new audio track 3860 to be displayed in the roles view 3770. This audio track 3860 corresponds to a new audio file. Here, the audio track does not list any audio role for the audio file. To select an audio role, the user selects the audio track 3860.

The sixth stage 3830 illustrates the export tool 3625 after the selection of the audio track 3860. The selection causes the audio track 3860 to list available audio roles. The user can select any one or more of these audio roles. In some embodiments, the audio roles listed in the audio track 3860 correspond to the audio roles that are assigned to one or more clips in the composite presentation. That is, the media editing application of some embodiments does not list any audio role that is not assigned to at least one clip in the composite presentation. In the example illustrated in the sixth stage 3830, the list includes the "Dialogue" role and the "Background" role. The list also includes each sub-role of the "Dialogue" role. The user then selects the "Background" role to associate the role with the audio track 3860.

As mentioned above, the sub-roles of some embodiments are by default included in editing operations that are assigned to the parent. In some embodiments, the media editing application includes sub-roles in export operations that are assigned to the parent. For instance, when the parent role is selected for an output file, all clips that are assigned the parent's sub-roles are exported to that output file.

Figure 39:
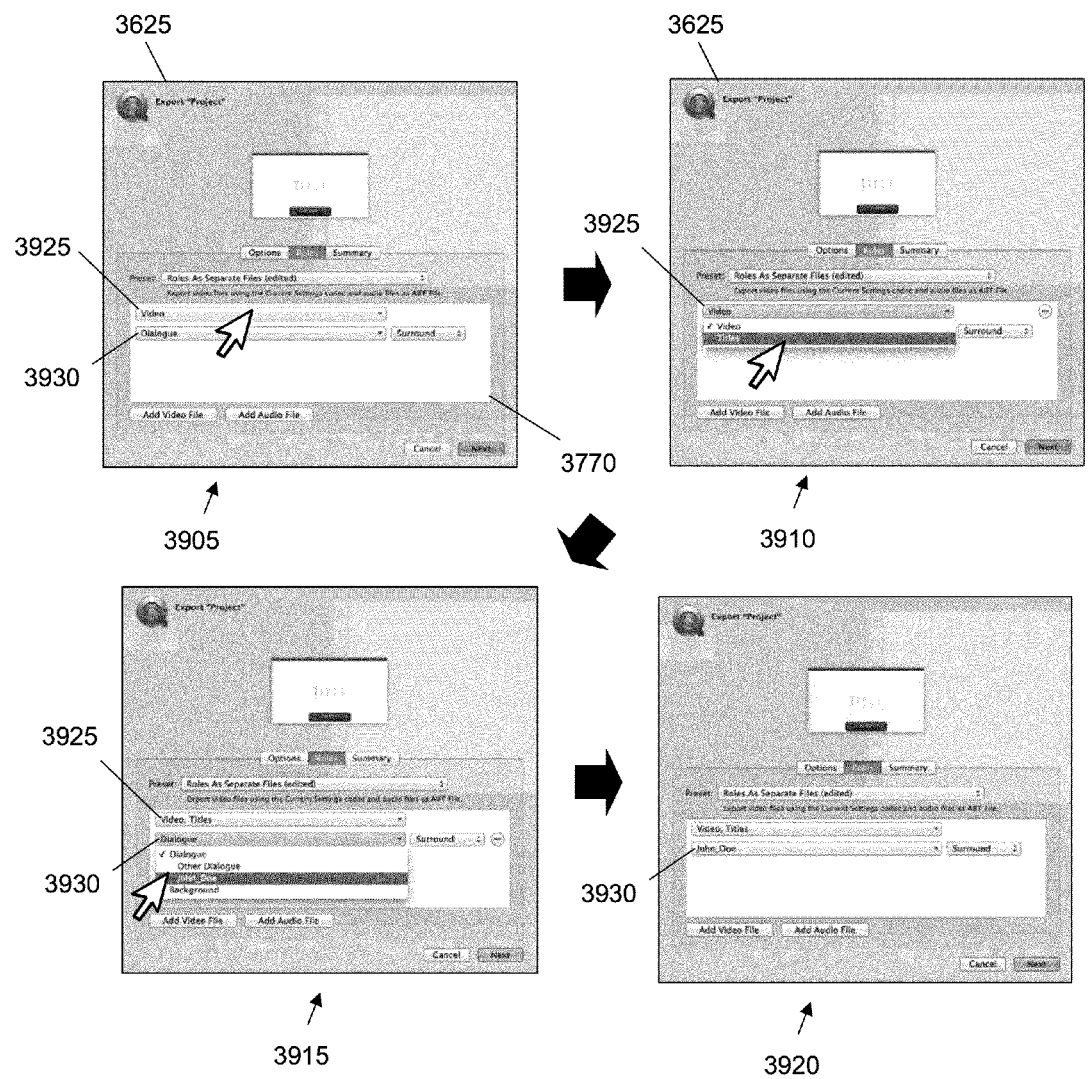
FIG. 39 provides an illustrative example of editing an existing track.

In the previous examples, one or more output files are added or removed using the export tool 3625. FIG. 39 provides an illustrative example of editing an existing track. Specifically, this figure shows in four operational stages 3905-3920 how the export tool 3625 can be used to reassign a role or assign multiple roles to a particular track.

The first stage 3905 illustrates the export tool 3625 displaying the roles view 3770. The roles view 3770 lists two different tracks that are to be output as separate files. Specifically, the roles view 3770 lists a video track 3925 to output a video file that includes each "Video" clip, and an audio track 3930 to output an audio file that includes each "Dialogue" clip. As shown in the first stage 3905, the user selects the video track 3925 to assign multiple roles to the track.

The second stage 3910 illustrates the export tool 3625 after selecting the video track 3925. The selection causes a list of different video roles to appear. In the example illustrated in the second stage 3910, the list includes the "Video" role and the "Title" role. The "Video" role is marked with a marking (e.g., a check mark) to indicate that the role is associated with the video track 3925. The user then selects the "Titles" role from the list to associate the "Title" role to the video track 3925. The selection of the "Titles" role does not disassociate the "Video" role. That is, the selection causes the media editing application to associate the "Titles" role without disassociating the "Video" role. This is shown in the third stage as the video track 3925 is labeled with both the "Video" and "Title" roles.

The third stage 3915 illustrates reassigning the role of the audio track 3930. As shown, the user selects the audio track 3930. The selection causes a list of different audio roles to appear. The list includes the "Dialogue" role and the "Background role. The list also includes several sub-roles of the "Dialogue" role. The user then selects the "John_Doe" sub-role from the list. The fourth stage 3920 illustrates the export tool after selecting the "John_Doe" sub-role. Specifically, it illustrates that the sub-role is associated with the audio track 3930, while the "Dialogue" role has been disassociated with the audio track.

In addition to customizing output files, the media editing application provides various tools to save output presets. These presets are particularly useful as they allow the application's user to quickly select a particular preset to output clips to one or more different files based on the assigned roles. In other words, the user can select the preset without having to redefine what one or more roles are associated with different output tracks. For example, a user can define any number of different presets and reuse the presets according to project needs (e.g., according to how a content producer wants clips in the composite presentation).

Figure 40:
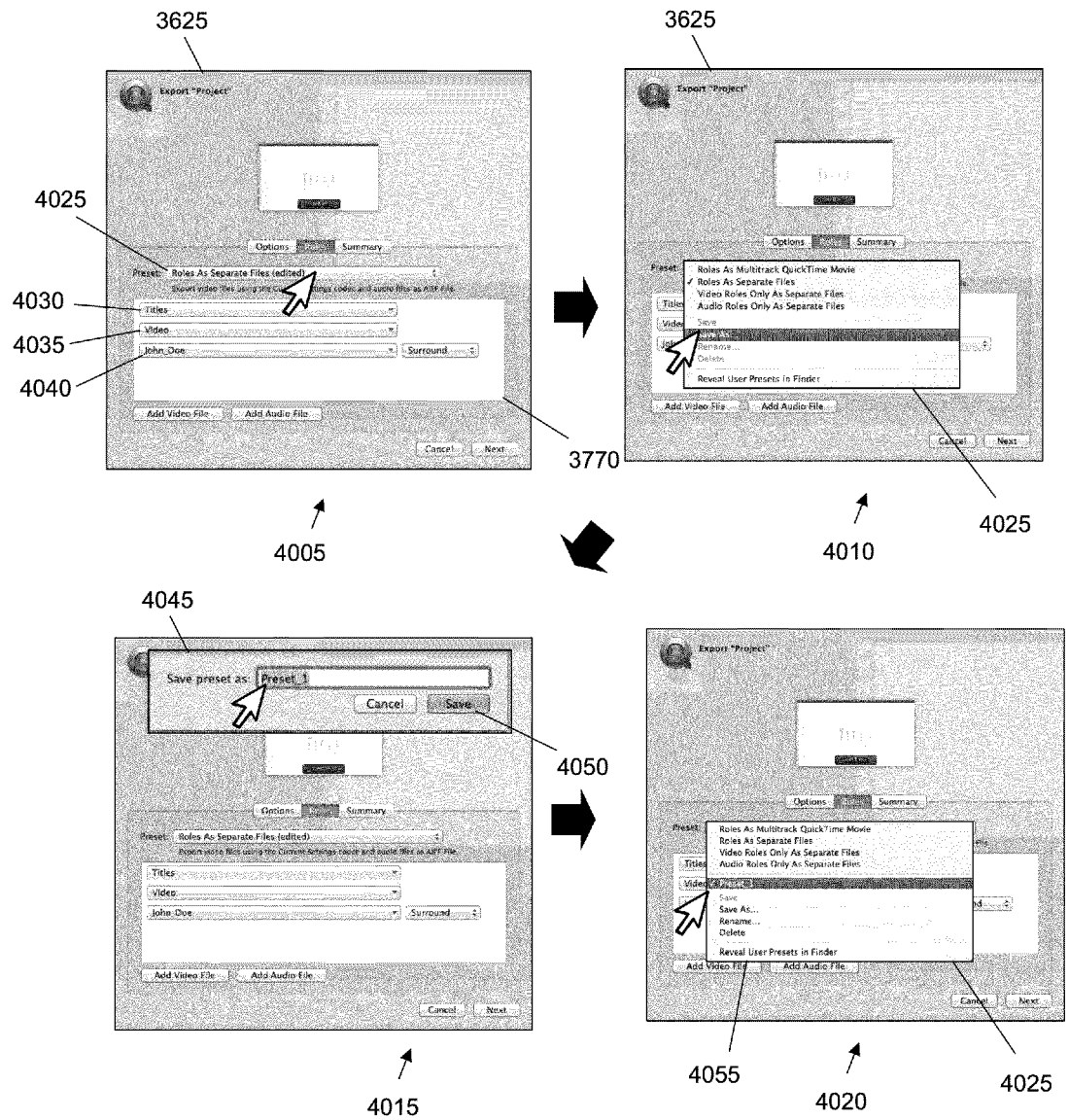
FIG. 40 provides an illustrative example of saving an output preset.

FIG. 40 provides an illustrative example of saving a preset. Specifically, this figure illustrates in four operational stages 4005-4020 how a user-defined output can be saved as a preset or template that can be reused to output composite presentations. As shown, the export tool 3625 includes a preset control 2925 for saving presets.

The first stage 4005 illustrates export tool 3625 displaying the roles view 3770. The roles view 3770 lists several different tracks that are to be output as separate files. Specifically, the roles view 3770 lists a video track 4030 to output a first video file that includes each "Titles" clip, a video track 4035 to output a second video file that includes each "Video" clip, and an audio track 4040 to output an audio file that includes each clip containing the voice of the actor "John_Doe".

As shown in the first stage 4005, the preset control 4025 indicates that the current output configuration is a modification to an existing output preset. Specifically, the preset control 4025 indicates that the output tracks 4030-4040 listed in the roles view 3770 are an edited version of the "Roles as Separate Files" preset. To save the current output configuration, the user selects the preset control 4025.

The second stage 4010 illustrates the export tool 3625 after the selection of the preset control 4025. As shown, the selection causes the preset control 4025 to display a list of different presets. As shown, the list includes several different presets provided by the media editing application. These presets include (1) roles as a multitrack file (e.g., movie file), (2) roles as separate files, (3) video roles only as separate files, and (4) audio roles as separate files. The preset control also includes a "Save" option to save the current output configuration, a "Save As" option to save the current output configuration using a particular name, a "Delete" option to delete an existing preset, a "Rename" option to rename an existing preset.

In the second stage 4010, the user selects the "Save As" option to save the current output configuration using a particular name. As shown in the third stage 4015, the selection causes a preset dialogue box 4045 to appear. The dialogue box 4045 includes a field for inputting a name for the preset. In the third stage 4015, the user inputs a name for the preset into this field. To save the preset, the user then selects a save button 4050 on the dialogue box 4045. In some embodiments, the preset is saved on a local drive. Alternatively, the media editing application allows the application's user to specify a particular location to store the preset. For example, the media editing application of some embodiments allows presets to be saved and accessed remotely on a network drive. In this manner, the saved presets can be shared amongst a group of users that may be editing media presentations on different computing devices.

As mentioned above, the media editing application provides different audio controls for outputting the audio content based on one or more roles. These controls include controls for channel configuration, volume level, gain, panning, etc. In some embodiments, the audio configuration specified with these controls is also saved as part of the preset.

The fourth stage 4020 illustrates the export tool after reselecting the preset control 4025. As shown, the selection causes the list of different presets to appear. Different from the second stage 4010, the list now includes the presets provided by the media editing application, as well as the preset specified by the application's user. That is, the preset control lists the preset that was saved in the third stage 4015. To view one or more preset files that have been saved, the user can select a "Reveal" option 4055. In some embodiments, the selection of this option 4055 causes a browser window to appear that displays different preset files in a preset directory.

Figure 41:
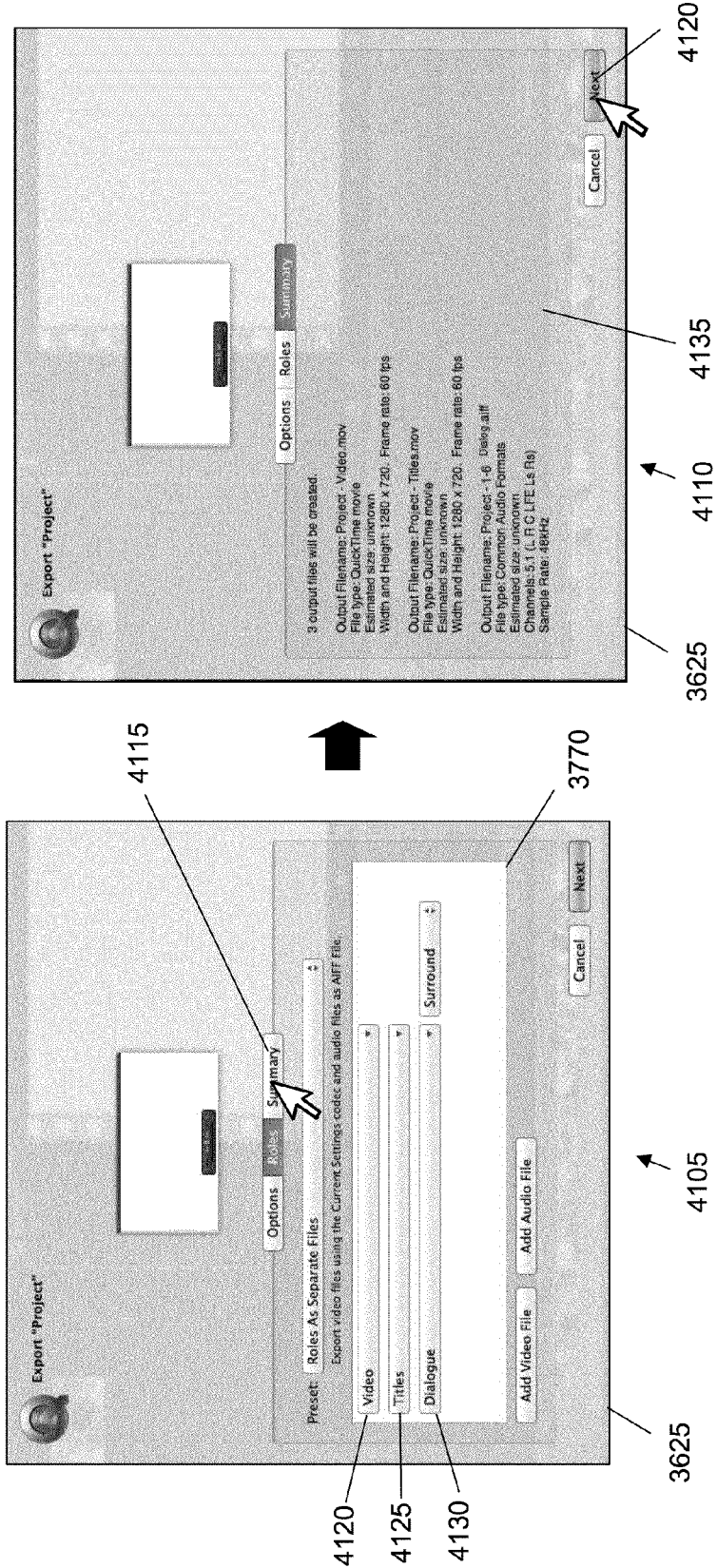
FIG. 41 provides an illustrative example of a summary view that displays different output files.

Based on the output configuration, the media editing application of some embodiments provides a summary of different output files. This summary allows the application's user to access the output files in order to make additional changes prior to outputting the composite presentation. FIG. 41 provides an illustrative example of a summary view that displays different output files. Two operational stages 4105 and 4110 of the media editing application are illustrated in this figure.

The first stage 4105 illustrates the export tool 3625 displaying the roles view 3770. The roles view 3770 lists several different tracks that are to be output as separate files. Specifically, the roles view 3770 lists a video track 4120 to output a first video file that includes each "Video" clip, a video track 4125 to output a second video file that includes each "Titles" clip, and an audio track 4130 to output an audio file that includes each "Dialogue" clip.

To display a summary of output file, the user selects a "Summary" tab 4115 from the export tool 3625. The selection causes the export tool 3625 to display a summary view 4135, as illustrated in the second stage 4110. The summary view 4135 provides a summary of each output file. In the example illustrated in FIG. 41, the summary view 4135 lists three output files that correspond to the three output tracks 4120-4130. Here, the media editing application has also specified a default name for the three output files. Specifically, each clip is named using the project name and corresponding role. However, the media editing application can use a different naming convention, in some embodiments.

As shown in the second stage 4110, the summary view 4135 lists other information related to each output file. Specifically, for each output video file, the summary view lists (1) the file type of the video file, (2) the estimated file size, (3), dimensions (e.g., 1280×720), and (4) video frame rate. In addition, for each output audio file, the summary view lists (1) the output audio format, (2) estimated size, (3) number of channels, and (4) sample rate. The user then selects a button 4120 from the export tool 3625 to output the composite presentation.

Figure 42:
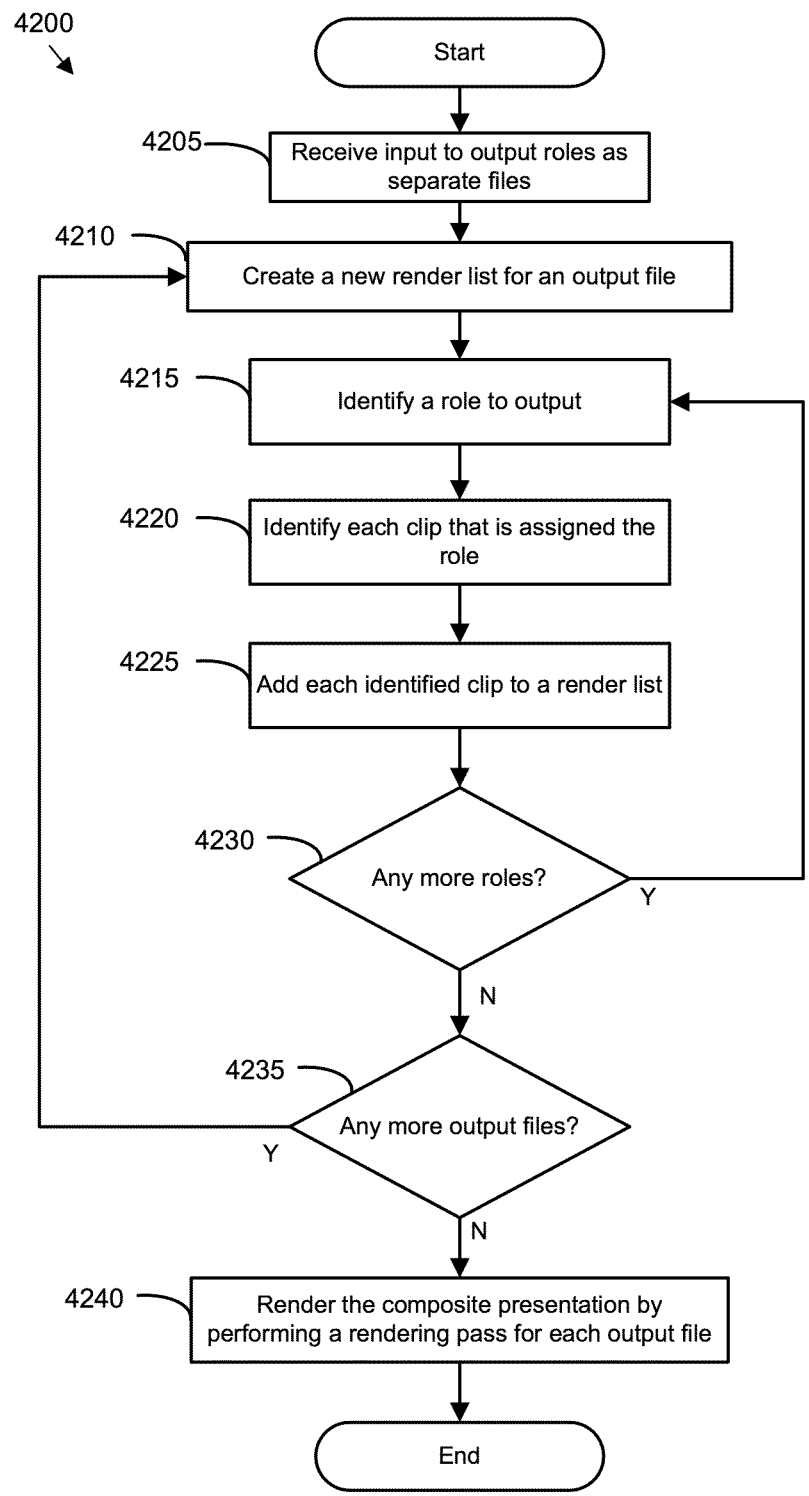
FIG. 42 conceptually illustrates a process that some embodiments perform to output a composite presentation to different files based on the assigned roles.

In some embodiments, the media editing application outputs a composite presentation to different files by performing multiple rendering passes. FIG. 42 conceptually illustrates a process 4200 that some embodiments perform to output a composite presentation to different files (e.g., audio file, video file) based on the assigned roles. In some embodiments, the process 4200 is performed by the media editing application.

The process 4200 begins when it receives (at 4205) input to output roles as separate files. The process 4200 then creates (at 4210) a render list (e.g., a render graph) for the output file. At 4215, the process 4200 identifies a role associated with the output file. The process 4200 then identifies (at 4220) each clip in the composite presentation that is assigned the identified role. The process 4200 then adds (at 4225) each identified clip to the render list.

At 4230, the process 4200 determines whether any other role is associated with the output file. When there is another role, the process 4200 returns to 4215, which is described above. Otherwise, the process 4200 determines (at 4235) whether there is any other output file. When there is another output file, the process 4200 returns to 4210, which is described above. Otherwise, the process 4200 renders (at 4240) the composite presentation by performing at least one rendering pass for each output file using the corresponding render list.

Figure 43:
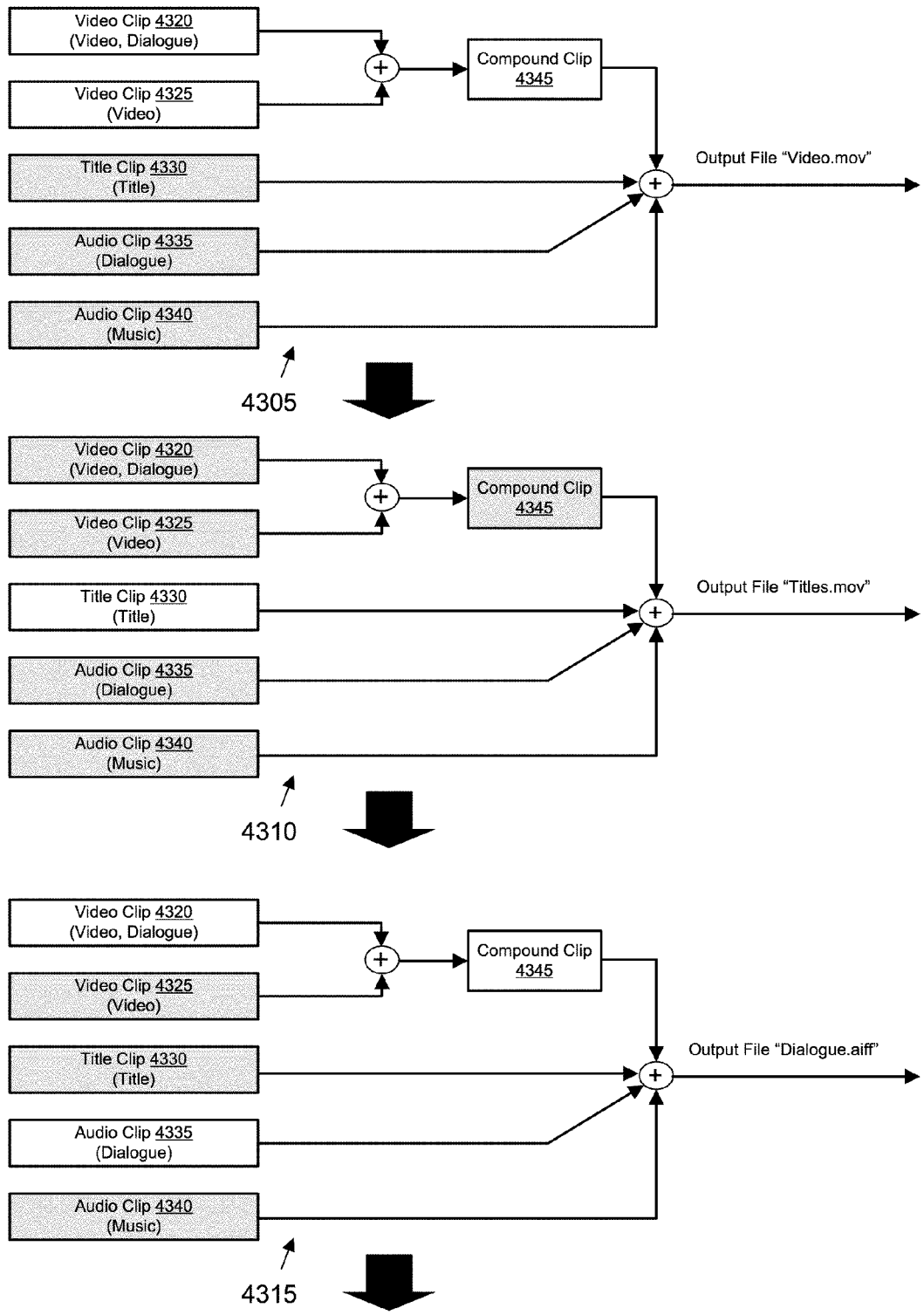
FIG. 43 illustrates several example data flow diagrams that illustrate performing multiple rendering passes to output a composite presentation to different files.

FIG. 43 illustrates several example data flow diagrams that illustrate performing multiple rendering passes to output a composite presentation to different files. Specifically, this figure shows in three operational stages 4305-4315 how the media editing application of some embodiments performs at least one rendering pass (e.g., using the render list or render graph) for each output file. In some embodiments, the rendering operation is initiated upon the application's user selecting a command to export the composite presentation. That is, with a single command (e.g., selection of an export button), the media editing application can output multiple files. This is different from the user selecting the export command for each output file.

As shown in FIG. 43, the composite presentation includes several clips 4320-4345. Specifically, the composite presentation includes a couple of audio clips 4335 and 4340, a title clip 4330, and a compound clip 4345 that comprises two video clips 4320 and 4325. The video clip 4320 includes a video component that is assigned a "Video" role and an audio component that is assigned a "Dialogue" role. As the video clip 4325 does not include audio, the video clip is only assigned a "Video" role. Also, the title clip 4330 is assigned the "Titles" role, the "Audio" clip 4335 is assigned the "Dialogue" role, and the audio clip 4340 is assigned the "Music" role.

The first stage 4305 illustrates performing at least a first pass to output a first file. In particular, this stage illustrates outputting a video file (i.e., "Video.mov") for all clips in the composite presentation that are assigned the "Video" role. As shown, the video clip 4320 and 4325 are combined to make the compound clip 4345. Specifically, the video content of these two clips 4320 and 4325 are combined to create the compound clip. In other words, the audio content of the video clip 4320 is not included in the resulting compound clip 4345. In some other embodiments, the audio content is excluded by disabling the audio (e.g., muting the audio). In some embodiments, the clips are combined according to their sequence within the compound clip. For example, the video clip 4320 may be presented in the composite presentation prior to the video clip 4325.

As shown in the first stage 4305, the compound clip is then output as part of the video file. Here, the other clips shown in the grey boxes are not being outputted as part of the output video file. In some embodiments, the compound clip 4345 is output according to its position within the sequence of the composite presentation. For instance, if the compound clip is presented three minutes into the presentation, the first three minutes might not display any video but will start displaying the compound clip's video thereafter. This may be achieved by disabling other clips in the composite presentation when compositing the clips for the composite presentation. Here, the output video file only includes video, as the audio component of the video clip 4320 is not assigned the "Video" role but the "Dialogue" role.

The second stage 4310 illustrates performing at least a second pass to output a second file. In particular, this stage illustrates outputting a video file (i.e., "Titles. mov") for all clips in the composite presentation that are assigned the "Title" role. Specifically, the title clip 4335 is output as part of the output video file. In some embodiments, the output video file may include other parts that do not present any video (e.g., display a blank screen). Similar to the compound clip, the title clip 4330 may be output by disabling one or more other clips in the composite presentation.

The third stage 4315 illustrates performing at least a third pass to output a third file. In particular, this stage illustrates outputting an audio file (i.e., "Dialogue.aiff") for all audio content in the composite presentation that is assigned the "Dialogue" role. Specifically, the audio content of the video clip is mixed for the compound clip. In some embodiments, the audio component is mixed according to its position within the compound clip. For example, the resulting mix for the compound clip may include a portion or duration that is silent due to the video clip 4325 having no audio content. The compound clip's audio is then mixed with the audio clip 4335 but not with audio clip 4340. This is because the audio clip 4335 is assigned the "Dialogue" role, while the audio clip is assigned the "Music" role.

In some embodiments, the media editing application disable (e.g., mutes) one or more clips in the composite presentation when outputting the audio file that contains a mixed audio signal. For example, the audio clip 4340 may be muted in order to output the audio file. In some embodiments, the output audio file includes audio having a duration that is the same as the duration of the composite presentation. For example, if only the first minute of the composite presentation includes "Dialogue" content, then the remaining duration of the output audio file may not include any audio.

B. Outputting Multiple Roles as a Single File

Figure 44:
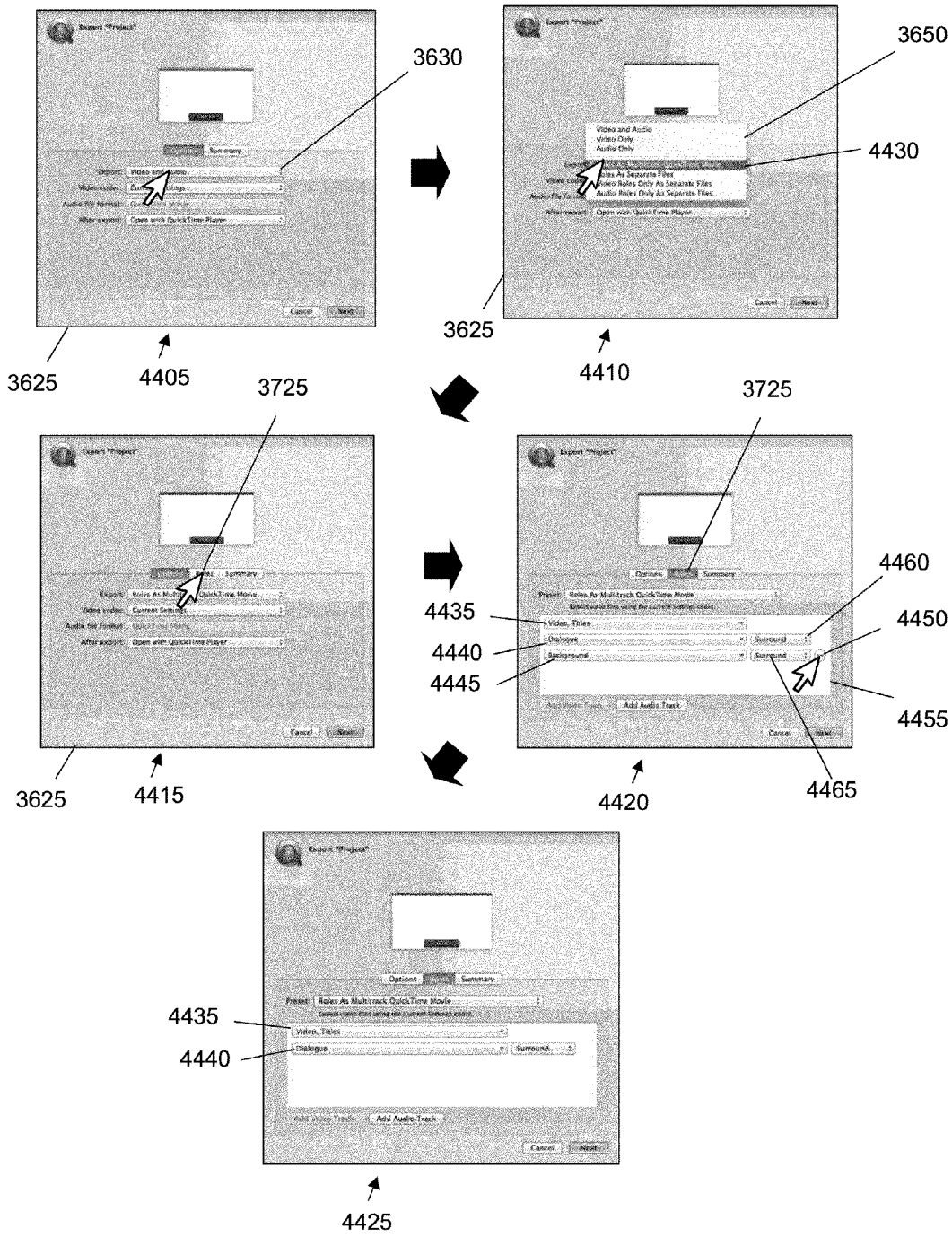
FIG. 44 provides an illustrative example of specifying a configuration for outputting multiple roles as a single file.

As mentioned above, the media editing application of some embodiments allows its user to output one or more selected roles as a single file. Several such examples will now be described by reference to FIGS. 44-47. FIG. 44 provides an illustrative example of specifying a configuration for outputting multiple roles as a single file. Specifically, this figure shows in five operational stages 4405-4425 how the export tool can be used to select different roles for the output file.

The first stage 4405 shows the export tool 3625. The application's user might have activated this tool using a menu bar, a tool bar button, or a shortcut key. As show, the export tool 3625 includes several different export options. Each of these options is described above by reference to FIG. 36. In the first stage 4405, the user selects the option 3630 to specify what items to export for the composite presentation.

The second stage 4410 illustrates the export tool after the selection of the option 3630. The selection causes a list of different export options 3650 to appear. The different export options include (1) exporting both video and audio, (2) exporting video only, (3) exporting audio only, (4) exporting roles as a multitrack file (e.g., movie file), (5) exporting roles as separate files, (6) exporting video roles only as separate files, and (7) exporting audio roles only as separate file. The user can select any one of these options to output the composite presentation. As shown in the second stage 4410, the user selects an option 4430 to export roles as a single file.

The third stage 4415 illustrates the export tool 3625 after the user has selected an option to output roles as a single file. Once a single file output has been selected, the media editing application of some embodiments allows the user to customize each output file. Examples of such customization include removing or adding one or more roles for the output file, specifying output configuration, etc. In some embodiments, the media editing application allows the user to save the output configuration as a preset that can be reused to output composite presentations. As shown in the fourth stage 4420, the user selects a "Roles" tab 3725 from the export tool 3625 to customize the output file.

As shown in the fourth stage 4420, the selection of the roles tab 3725 causes the export tool 3625 to display a roles view 4455. This roles view 4455 displays all roles that are assigned to one or more clips in the composite presentation. The roles listed in this roles view 4455 represent those that will be included in the output file. That is, the clips in the composite presentation that are assigned these roles will be combined and output as one file.

The fourth stage 4420 illustrates that the roles are displayed on different tracks 4435-4445. Specifically, each of the tracks displays one or more of the roles. The application's user can use each of these tracks to remove a particular role from a particular track, add an additional role to the particular track, remove the particular track from the roles view 4455, etc. To allow the user to easily output video content, all of the video roles (i.e., "Video", "Titles") are listed in a video track 4435. The user can select this video track to remove any one of the roles, or remove the entire video track.

In some embodiments, the media editing application provides a separate track for each audio role and provides an audio control for the separate track. For example, in the fourth stage 4420, all of the audio roles (i.e., "Dialogue", "Background") are displayed on separate audio tracks 4440 and 4445. Also, each of the audio tracks 4440 and 4445 includes an audio control (4460 or 4465) for specifying how the corresponding audio content is output. Here, the control (4460 or 4465) can be used to specify whether the output audio is mono, stereo, or surround sound. However, the media editing application in some embodiments provide different controls (e.g., audio level control, pan control, etc.). Alternatively, or conjunctively, the media editing application may provide video roles in separate video tracks to individually control (e.g., the color of, brightness of, etc.) the output video content.

The fourth stage 4420 shows an example of how the media editing application of some embodiments allows the user to remove the audio track 4445. To remove the audio track 4445, the user first moves a position indicator or cursor over the track. The movement causes a control 4450 to appear adjacent to the audio track 4445. The user then selects this control 4450 to remove the audio track 4445. By removing this audio track 4445, one or more "Background" clips that are in the composite presentation are not mixed and output as part of the output file.

The fifth stage 4425 illustrates the export tool 3625 after removing the "Background" audio track 4445. As shown, the export tool 3625 displays two remaining tracks that are to be output as one output file. Specifically, the roles view 4455 displays the video track 4435 that is associated with the "Video" and "Titles" roles, and the audio track 4440 that is associated with the "Dialogue" role. As mentioned above, the roles listed in this roles view 4455 represent those clips that will be included in the output file. That is, the clips in the composite presentation that are assigned these roles will be combined to output the one output file.

As shown in FIG. 44, the export tool includes the preset control 4025. The user can use this preset control to save the current output configuration. Once saved, the user can use the preset to output the same composite presentation or any other composite presentation associated with the media editing application. An example of saving a preset is described above by reference to FIG. 40.

Figure 45:
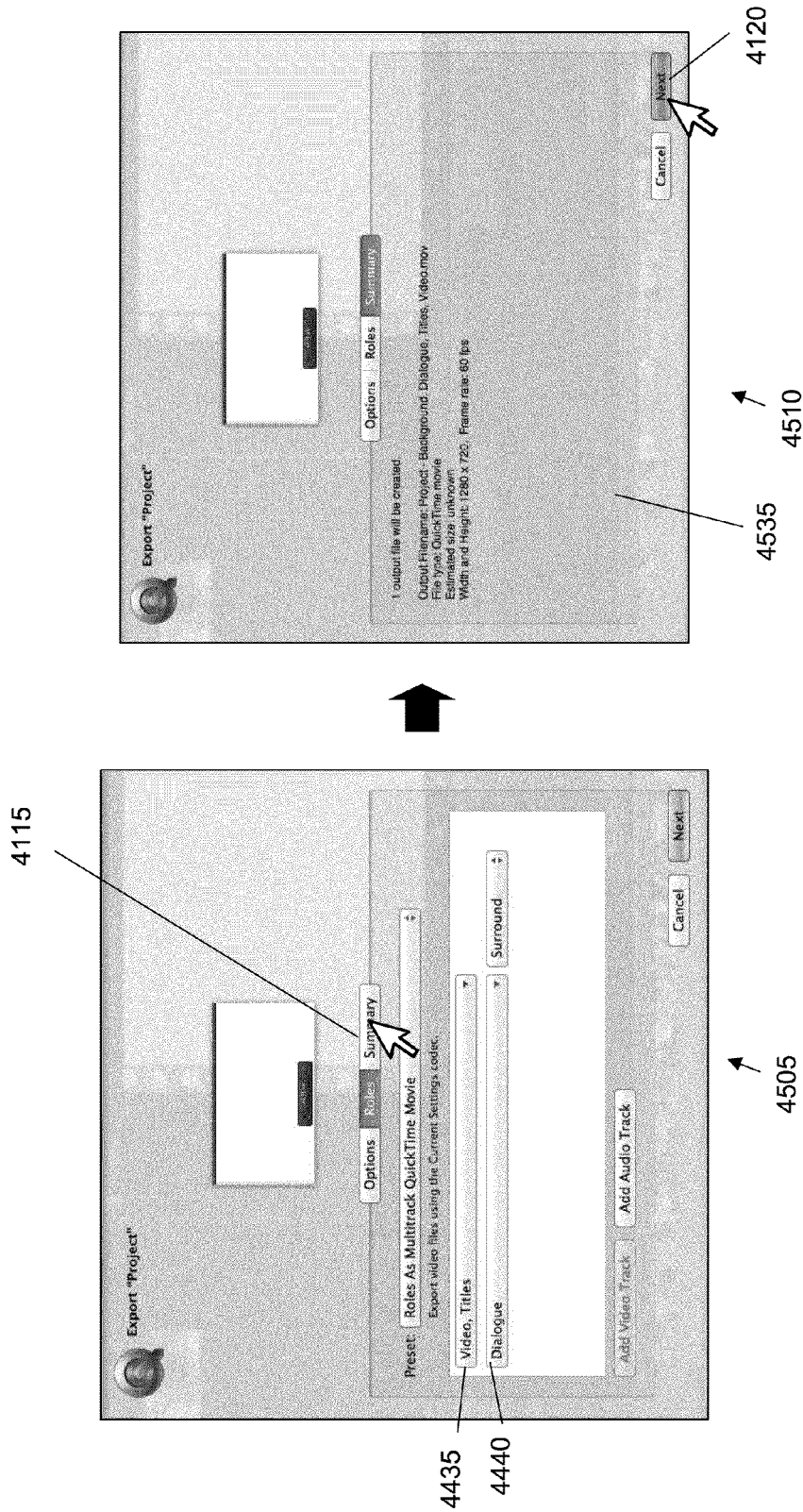
FIG. 45 provides an illustrative example of a summary view that displays a summary of an output file associated with multiple roles.

Based on the output configuration, the media editing application of some embodiments provides a summary of the single output file. This summary allows the application's user to access the output file in order make additional changes prior to outputting the composite presentation. FIG. 45 provides an illustrative example of a summary view that displays a summary of the output file. Two operational stages 4505 and 4510 of the media editing application are illustrated in this figure.

The first stage 4505 illustrates the export tool 3625 displaying the roles view. The roles view 3770 lists several different tracks that are to be output as a single output file. Specifically, the roles view 3770 lists the video track 4435 that is associated with the "Video" and "Titles" roles; and the audio track 4440 that is associated with the "Dialogue" role. To display a summary of output file, the user selects a "Summary" tab 4115 from the export tool 3625. The selection causes the export tool 3625 to display a summary view 4535, as illustrated in the second stage 4510.

The summary view 4535 provides a summary of the output file. As shown, the media editing application has also specified a default name for the output file. Specifically, the output file is named using the project name and roles associated with the tracks 4435 and 4440. However, the media editing application can use a different naming convention, in some embodiments. As shown in the second stage 4510, the summary view 4535 lists other information related to the output file. Specifically, the summary view lists (1) the file type of the output file, (2) the estimated file size, (3), dimensions (e.g., 1280×720), and (4) video frame rate.

Figure 46:
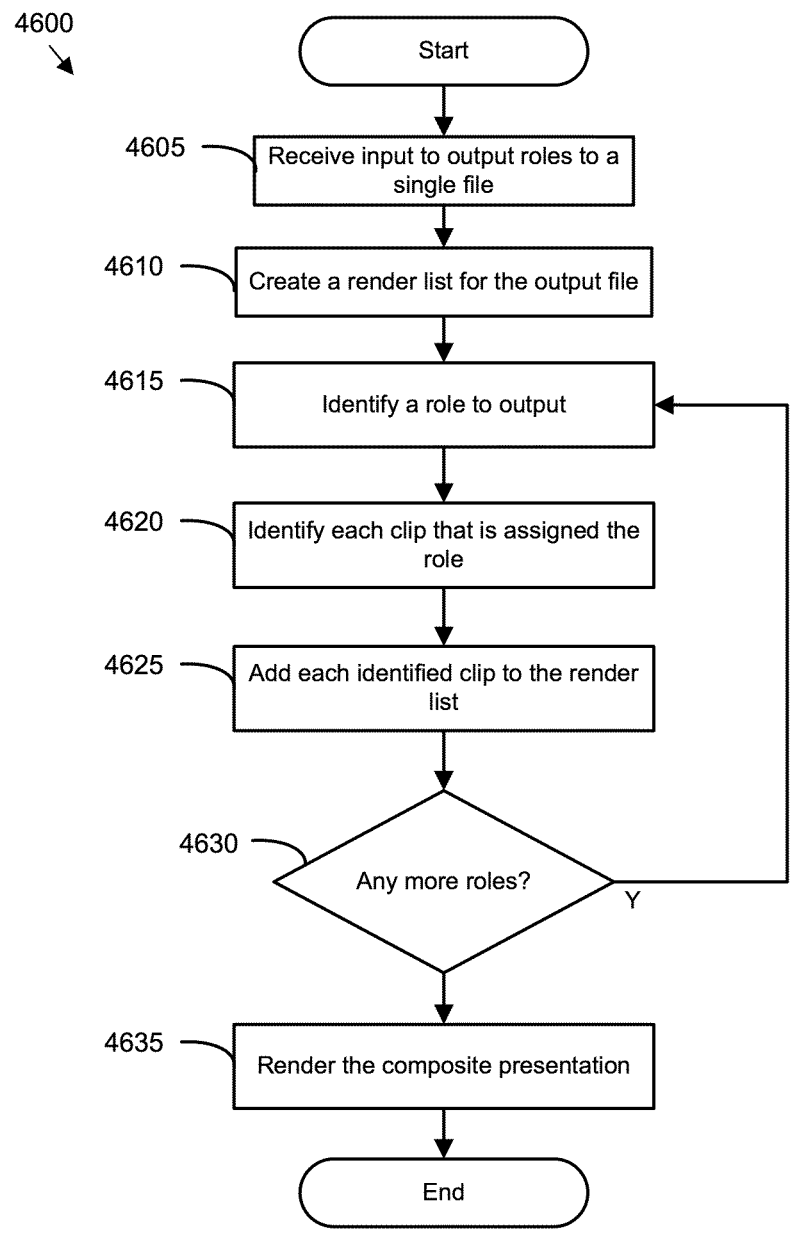
FIG. 46 conceptually illustrates a process that some embodiments perform to output a composite presentation to a single file based on the assigned roles.

FIG. 46 conceptually illustrates a process 4600 that some embodiments perform to output a composite presentation to a single file based on the assigned roles. In some embodiments, the process 4600 is performed by the media editing application.

The process 4600 begins when it receives (at 4605) input to output roles as a single file. The process 4600 then creates (at 4610) a render list (e.g., a render graph) for the output file. At 4615, the process 4600 identifies a role associated with the output file. The process 4600 then identifies (at 4620) each clip in the composite presentation that is assigned the identified role. The process 4600 then adds (at 4625) each identified clip to the render list.

At 4630, the process 4600 determines whether any other role is associated with the output file. When there is another role, the process 4600 returns to 4615, which is described above. Otherwise, the process 4600 renders (4635) the composite presentation using the render list.

Figure 47:
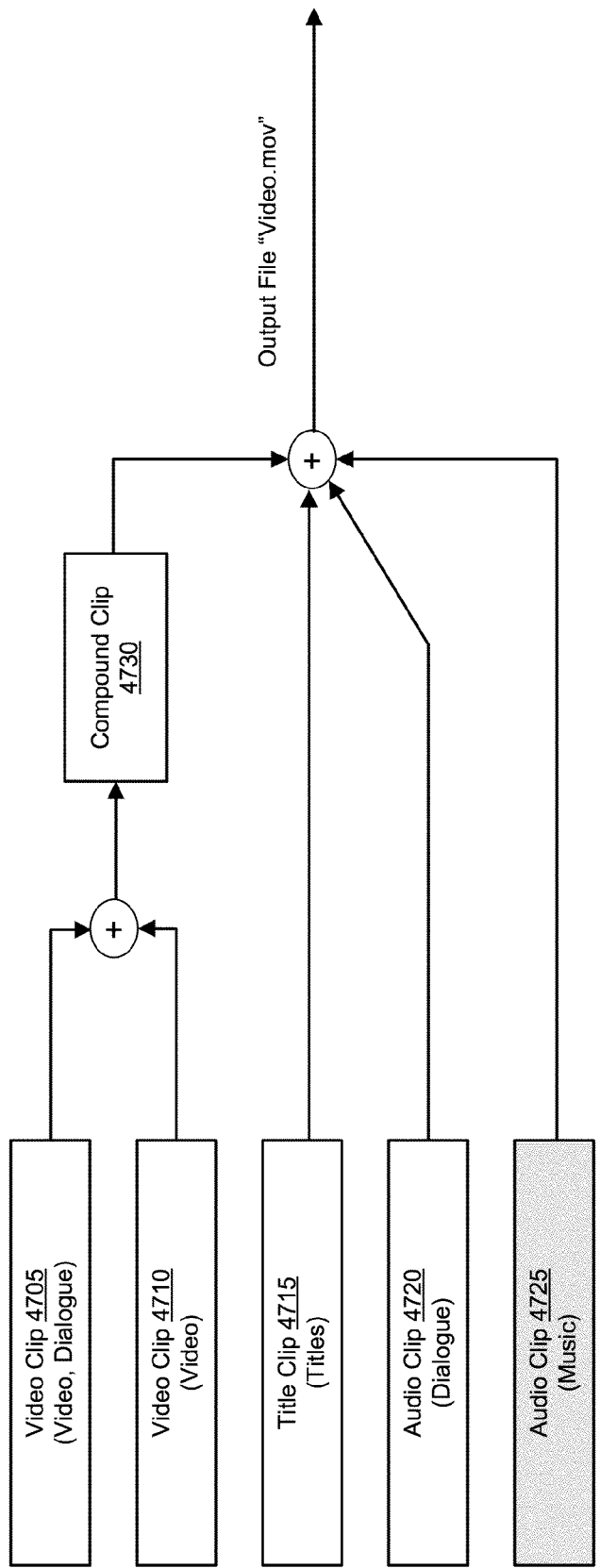
FIG. 47 illustrates an example data flow diagram that illustrates outputting a composite presentation to a single file.

FIG. 47 illustrates an example data flow diagram that illustrates outputting a composite presentation to a single file. Specifically, this figure illustrates outputting a single video file (e.g., a QuickTime movie) by compositing clips that are assigned the "Video" role, "Titles", and the "Dialogue" role. As shown in FIG. 47, the composite presentation includes several clips 4705-4725. Specifically, the composite presentation includes a couple of audio clips 4720 and 4725, a title clip 4715, and a compound clip 4730 that comprises two video clips 4705 and 4710. The video clip 4705 includes a video component that is assigned the "Video" role and an audio component that is assigned the "Dialogue" role. As the video clip 4710 does not include audio, the video clip is only assigned the "Video" role. Also, the title clip 4715 is assigned the "Titles" role, the "Audio" clip 4720 is assigned the "Dialogue" role, and the audio clip 4725 is assigned the "Music" role.

As shown in FIG. 47, the video clips 4705 and 4710 are combined to make the compound clip 4730. The compound clip 4730 is then combined with the title clip 4730 and the audio clip 4720 to output the single video file. Different from the example illustrated in FIG. 43, the single output video file includes both video and audio content. As the audio clip 4725 is assigned the "Music" role, the audio signal of this audio clip is not included in the output video file. This is illustrated in FIG. 47 as the box representing the audio clip 4725 is grayed out.

In some embodiments, the media editing application disable (e.g., mutes) one or more clips in the composite presentation when outputting the video file. For example, the audio clip 4725 may be muted in order to output the video file. In some embodiments, the output video file includes content with a duration that is the same as the duration of the composite presentation. For example, if the duration of the composite presentation is five minutes, then the output file includes the same duration.

VII. Software Architecture

Figure 48:
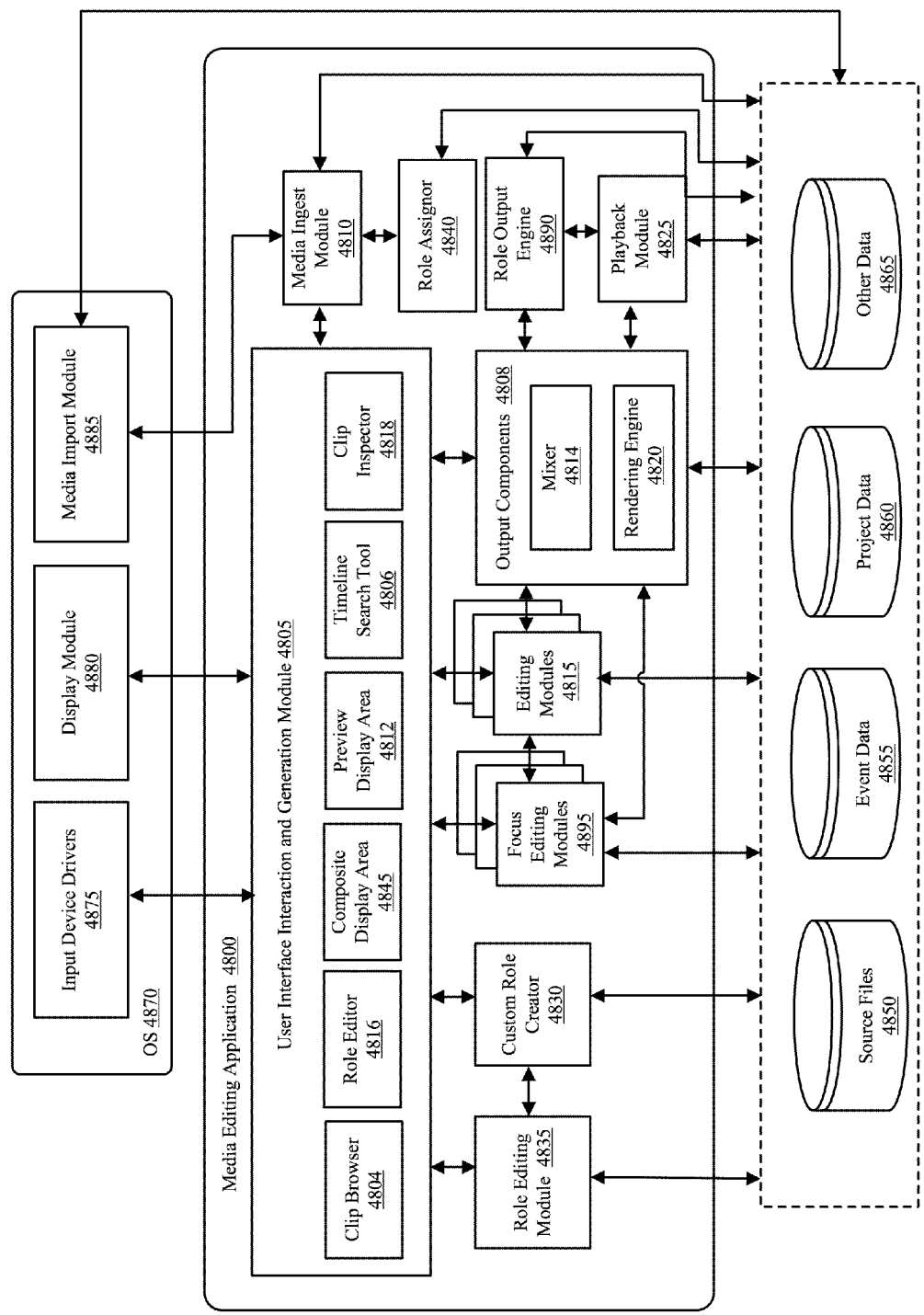
FIG. 48 conceptually illustrates the software architecture of a media editing application of some embodiments.

In some embodiments, the processes described above are implemented as software running on a particular machine, such as a computer or a handheld device, or stored in a machine readable medium. FIG. 48 conceptually illustrates the software architecture of a media editing application 4800 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 4800 includes a user interface (UI) interaction and generation module 4805, a role output engine 4890, a media ingest module 4810, editing modules 4815, a set of output components 4808, a playback module 4825, a role assignor 4840, a role editing module 4835, a custom role creator 4830, and a set of focus editing modules 4895. The set of output components 4808 includes a mixer 4814 and a rendering engine 4820. As shown, the user interface interaction and generation module 4805 generates a number of different UI elements, including a clip browser 4804, a role editor 4816, a composite display area 4845, a timeline search tool 4806, a preview display area 4812, and a clip inspector 4818.

The figure also illustrates stored data associated with the media-editing application: source files 4850, event data 4855, project data 4860, and other data 4865. In some embodiments, the source files 4850 store media files (e.g., video files, audio files, combined video and audio files, etc.) imported into the application. The source files 4850 of some embodiments also store transcoded versions of the imported files.

The event data 4855 stores the information used by some embodiments to populate the clip browser 4804 and/or the clip library (not shown). In other words, the event data contain information used to provide the thumbnails view (e.g., filmstrip view) and the list view. The event data 4855 may be a set of clip object data structures stored as one or more SQLite database (or other format) files in some embodiments. Several examples of such data structures related to the event data are described above by reference to FIG. 13.

The project data 4860 stores the project information (e.g., timeline sequences) used by some embodiments to specify a composite presentation in the timeline 4845. The project data 4860 may also be a set of clip object data structures stored as one or more SQLite database (or other format) files in some embodiments. Several examples of such data structures related to a composite presentation (e.g., timeline sequence) are described above by reference to FIG. 16.

In some embodiments, the four sets of data 4850-4865 are stored in a single physical storage (e.g., an internal hard drive, external hard drive, etc.). In some embodiments, the data may be divided between multiple physical storages. For instance, the source files might be stored on an external hard drive with the event data, project data, and other data on an internal drive. Some embodiments store event data with their associated source files and render files in one set of folders, and the project data with associated render files in a separate set of folders.

FIG. 48 also illustrates an operating system 4870 that includes input device driver(s) 4875, display module 4880, and media import module 4885. In some embodiments, as illustrated, the device drivers 4875, display module 4880, and media import module 4885 are part of the operating system 4870 even when the media editing application 4800 is an application separate from the operating system 4870.

The input device drivers 4875 may include drivers for translating signals from a keyboard, mouse, touchpad, tablet, touchscreen, etc. A user interacts with one or more of these input devices, each of which send signals to its corresponding device driver. The device driver then translates the signals into user input data that is provided to the UI interaction and generation module 4805.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 4880 translates the output of a user interface for a display device. That is, the display module 4880 receives signals (e.g., from the UI interaction and generation module 4805) describing what should be displayed and translates these signals into pixel information that is sent to the display device. The display device may be an LCD, plasma screen, CRT monitor, touchscreen, etc.

The media import module 4885 receives media files (e.g., audio files, video files, etc.) from storage devices (e.g., external drives, recording devices, etc.) through one or more ports (e.g., a USB port, Firewire port, etc.) of the device on which the application 4800 operates and translates this media data for the media-editing application or stores the data directly onto a storage of the device.

The UI interaction and generation module 4805 of the media editing application 4800 interprets the user input data received from the input device drivers 4875 and passes it to various modules, including the role editing module 4835, the editing modules 4815, the rendering engine 4820, the playback module 4825, the role editor 4816, the set of focus editing modules 4895, and the mixer 4814. The UI interaction and generation module 4805 also manages the display of the UI, and outputs this display information to the display module 4880. This UI display information may be based on information from the editing modules 4815, the playback module 4825, and the data 4850-4865. In some embodiments, the UI interaction and generation module 4805 generates a basic GUI and populates the GUI with information from the other modules and stored data.

As shown, the UI interaction and generation module 4805, in some embodiments, generates a number of different UI elements. These elements, in some embodiments, including the clip browser 4804, the role editor 4816, the composite display area 4845, the timeline search tool 4806, and the clip inspector 4818. All of these UI elements are described in many different examples above. For example, several operations performed with the clip browser 4804 are described above by reference to FIGS. 9-11. Several example operations performed with the role editor 4816 are described above by reference to FIGS. 26 and 27. Several example operations performed with the composite display area 4845 are described above by reference to FIGS. 14 and 15. Furthermore, several example operations performed with the timeline search tool 4806 are described above by reference to FIGS. 29-34.

The media ingest module 4810 manages the import of source media into the media-editing application 4800. Some embodiments, as shown, receive source media from the media import module 4885 of the operating system 4870. The media ingest module 4810 receives instructions through the UI interaction and generation module 4805 as to which files should be imported, then instructs the media import module 4885 to enable this import (e.g., from an external drive, from a camera, etc.). The media ingest module 4810 stores these source files 4850 in specific file folders associated with the application. In some embodiments, the media ingest module 4810 also manages the creation of event data structures upon import of source files and the creation of the clip and asset data structures contained in the events.

As shown, the media ingest module 4810 of some embodiment operates in conjunction with the role assignor 4840. In some embodiments, the role assignor 4840 assigns different roles to media content imported into the media editing application. As mentioned above, these roles can include video roles (e.g., "Video", "Titles") and audio roles ("Dialogue", "Music", "Effect"). Different embodiments assign roles to media content differently. For instance, the media editing application of some embodiments may analyze any one or more of the following: the metadata of a piece of content, the source directory from which the content is imported, and the library from which the content is imported. Several different examples of how a media editing application can categorize content during import are described above by reference to FIGS. 7 and 8.

The editing modules 4815 include a variety of modules for editing media in the clip browser as well as in the timeline. The editing modules 4815 handle the creation of projects, addition and subtraction of clips from projects, trimming or other editing processes within the timeline, application of effects and transitions, or other editing processes. In some embodiments, the editing modules 4815 create and modify project and clip data structures in both the event data 4855 and the project data 4860.

The rendering engine 4820 handles the rendering of images for the media-editing application. In some embodiments, the rendering engine 4820 manages the creation of images for the media-editing application. When an image is requested by a destination within the application (e.g., the playback module 4825) the rendering engine 4820 outputs the requested image according to the project or event data. The rendering engine 4820 retrieves the project data or event data that identifies how to create the requested image and generates a render list (e.g., a render graph that is a series of nodes indicating either images to retrieve from the source files or operations to perform on the source files).

To create one or more render lists, the rendering engine of some embodiments operates in conjunction with the role output engine 4890. This role output engine 4890 identifies what clips to render based on the roles assigned to the clips. For example, when only the "Dialogue" role has been selected, the rendering engine 4820 of some embodiments uses this role output engine 4890 to identify clips in the composite presentation that are assigned the role. The clips may be identified for a multi-track output or a single-track output. Many examples of performing such output operations are described above by reference to FIGS. 36-8.

In some embodiments, the mixer 4814 receives several audio signals of different clips and outputs a mixed audio signal. The mixer 4814 of some embodiments is utilized in a number of different instances during the non-linear editing process. For example, the mixer may be utilized in generating a composite presentation from multiple different clips. The mixer can also act as the master to output a mixed audio signal.

Similar to the rendering engine, the mixer 4814 of some embodiments operates in conjunction with the roles output engine 4890 to mix clips for playback. That is, the role output engine 4890 identifies what clips to mix based on the roles assigned to the clips. For example, when only the "Music" role is enabled and all other roles are disabled, the rendering engine 4820 of some embodiments uses this role output engine 4890 to identify clips in the composite presentation that are assigned the role. In this manner, the mixer 4814 mixes a composite audio signal that includes only audio signal from "Music" clips.

The playback module 4825 handles the playback of images (e.g., in a preview display area 4812 of the user interface). Some embodiments do not include a playback module and the rendering engine directly outputs its images for integration into the GUI, or directly to the display module 4880 for display at a particular portion of the display device.

The role editing module 4835 allows roles to be modified. In some embodiments, this module 4835 makes a query for available roles that are displayed (e.g., in the clip browser 4804, the Role Editor 4816, the timeline search tool 4806, the clip inspector 4818, etc.). The user then selects one of the available roles (e.g., video role, audio role) to assign the selected role to a piece of content. The role editing module 4835 then updates the role assigned to the piece of content (e.g., by modifying the role attribute of a component associated with a clip object).

The custom role creator 4830 allows the application's user to create custom roles. In some embodiments, the custom role creator 4830 operates in conjunction with the role editor 4816 to create custom roles including sub-roles. For example, when the user specifies a new custom role, the custom role creator updates the available roles. Several example of creating custom roles are described above by reference to FIGS. 26 and 27.

The focus editing modules 4895 allows the application's user to focus on certain clips in a composite presentation on the assigned roles. This focus-editing feature may entail changing the appearance of the clips in the composite display area 4845 and/or disabling the clips in the composite display area. In some embodiments, the editing module identifies what roles are assigned to different clips in the composite presentation to disable and/or modify the appearance of one or more clips. Several focus-editing examples are described above by reference to FIGS. 29-35.

While many of the features of the media-editing application 4800 have been described as being performed by one module (e.g., the UI interaction and generation module 4805, the media ingest module 4810, etc.), one of ordinary skill in the art will recognize that the functions described herein might be split up into multiple modules. Similarly, functions described as being performed by multiple different modules might be performed by a single module in some embodiments (e.g., the playback module 4825 might be part of the UI interaction and generation module 4805).

VIII. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 49:
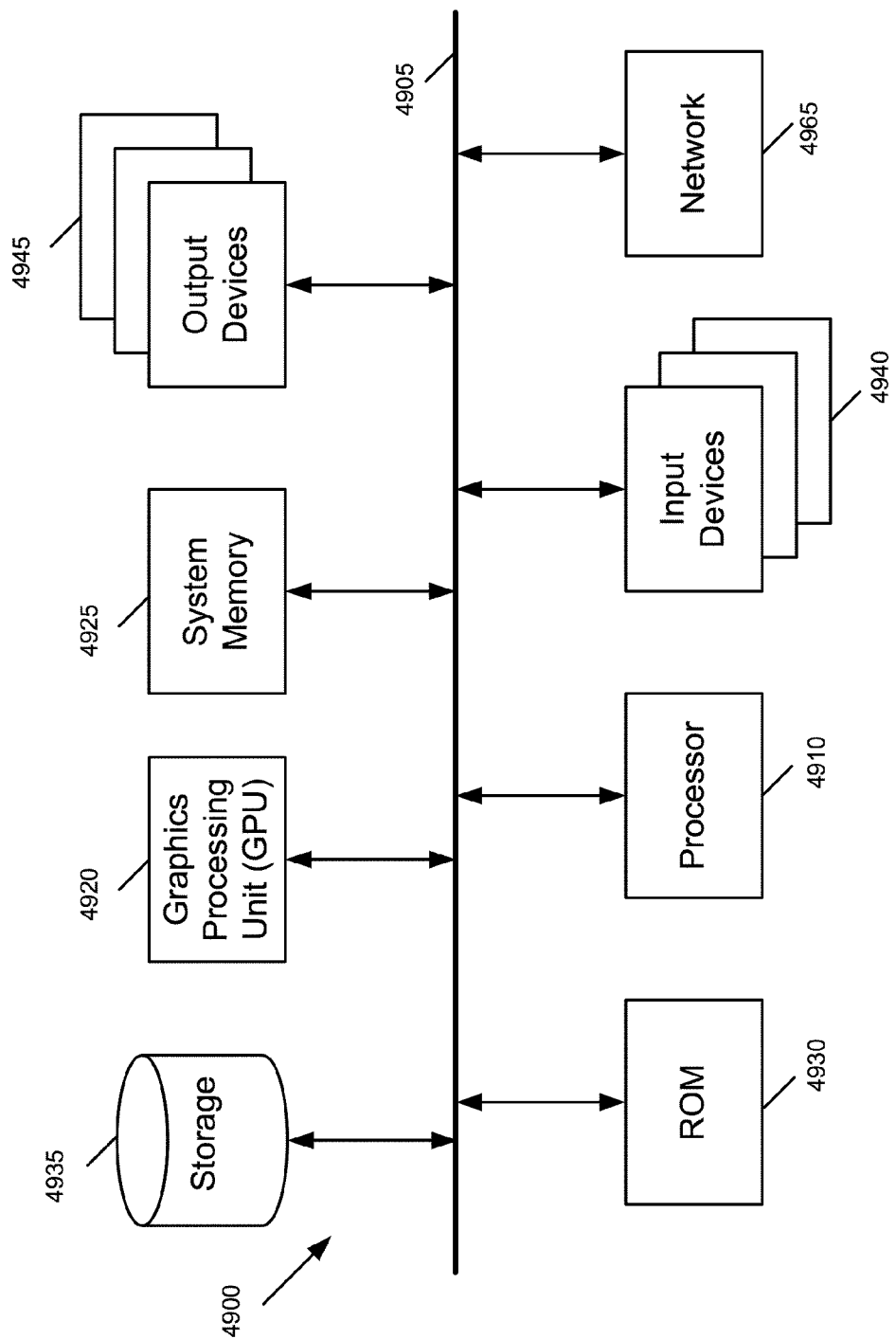
FIG. 49 illustrates a computer system with which some embodiments of the invention are implemented.

FIG. 49 illustrates a computer system with which some embodiments of the invention are implemented. Such a computer system includes various types of computer readable media and interfaces for various other types of computer readable media. Computer system 4900 includes a bus 4905, at least one processing unit (e.g., a processor) 4910, a graphics processing unit (GPU) 4920, a system memory 4925, a read-only memory 4930, a permanent storage device 4935, input devices 4940, and output devices 4945.

The bus 4905 collectively represents all system, peripheral, and chipset buses that communicatively connect the numerous internal devices of the computer system 4900. For instance, the bus 4905 communicatively connects the processor 4910 with the read-only memory 4930, the GPU 4920, the system memory 4925, and the permanent storage device 4935.

From these various memory units, the processor 4910 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 4920. The GPU 4920 can offload various computations or complement the image processing provided by the processor 4910.

The read-only-memory (ROM) 4930 stores static data and instructions that are needed by the processor 4910 and other modules of the computer system. The permanent storage device 4935, on the other hand, is a read-and-write memory device. This device is a non-volatile memory unit that stores instructions and data even when the computer system 4900 is off. Some embodiments of the invention use a mass storage device (such as a magnetic or optical disk and its corresponding disk drive) as the permanent storage device 4935.

Other embodiments use a removable storage device (such as a floppy disk, flash drive, or ZIP® disk, and its corresponding disk drive) as the permanent storage device. Like the permanent storage device 4935, the system memory 4925 is a read-and-write memory device. However, unlike storage device 4935, the system memory is a volatile read-and-write memory such as a random access memory. The system memory stores some of the instructions and data that the processor needs at runtime. In some embodiments, the invention's processes are stored in the system memory 4925, the permanent storage device 4935, and/or the read-only memory 4930. For example, the various memory units include instructions for processing multimedia items in accordance with some embodiments. From these various memory units, the processor 4910 retrieves instructions to execute and data to process in order to execute the processes of some embodiments.

The bus 4905 also connects to the input and output devices 4940 and 4945. The input devices enable the user to communicate information and commands to the computer system. The input devices 4940 include alphanumeric keyboards and pointing devices (also called "cursor control devices"). The output devices 4945 display images generated by the computer system. The output devices include printers and display devices, such as cathode ray tubes (CRT) or liquid crystal displays (LCD).

Finally, as shown in FIG. 49, bus 4905 also couples the computer 4900 to a network 4965 through a network adapter (not shown). In this manner, the computer can be a part of a network of computers (such as a local area network ("LAN"), a wide area network ("WAN"), an intranet, or a network of networks such as the Internet. Any or all components of computer system 4900 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

While the invention has been described with reference to numerous specific details, one of ordinary skill in the art will recognize that the invention can be embodied in other specific forms without departing from the spirit of the invention. In addition, a number of the Figures (including FIGS. 7, 28, 42, and 47) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process.

What is claims is:

1. A non-transitory machine readable medium storing a media-editing application having a user interface (UI), the media-editing application for execution by at least one processing unit, the UI comprising:
    a timeline for displaying a representation of a composite presentation comprising a plurality of media clips, each media clip assigned a set of one or more roles from a plurality of different roles; and
    a timeline focus tool for displaying selectable items representing the plurality of different roles, wherein a selection of a particular selectable item representing a particular role changes an appearance of each media clip that is assigned the particular role from a first appearance to a second different appearance in the timeline.

2. The non-transitory machine readable medium of claim 1, wherein the timeline displays the representation of the composite presentation by displaying a representation of each media clip, wherein the selection of the particular selectable item changes the appearance of each media clip by minimizing or highlighting the representation of the media clip in the timeline.

3. The non-transitory machine readable medium of claim 1, wherein the selection of the particular selectable item further causes each media clip assigned the particular role to be disabled during a playback of the composite presentation.

4. The non-transitory machine readable medium of claim 1, wherein the plurality of media clips comprises at least one audio clip, wherein each audio clip is assigned one of a plurality of different audio roles.

5. The non-transitory machine readable medium of claim 4, wherein the plurality of different audio roles comprises at least one of a dialogue role, a music role, and an effect role.

6. The non-transitory machine readable medium of claim 1, wherein the plurality of media clips comprises at least one video clip, wherein each video clip is assigned one of a plurality of different video roles.

7. The non-transitory machine readable medium of claim 6, wherein the plurality of different video roles comprises at least one of a title role and a video role.

8. The non-transitory machine readable medium of claim 1, wherein the plurality of different roles comprises at least a first role that is a sub-role of a second role, wherein a selection of a first selectable item representing the first role changes the appearance of each media clip in the timeline assigned the first role, wherein a selection of a second selectable item representing the second role changes the appearance of each media clip in the timeline assigned the first role or the second role.

9. The non-transitory machine readable medium of claim 1, wherein the timeline is further for displaying a compound clip defined by multiple media clips, wherein a selection of the particular selectable item representing the particular role changes an appearance of the compound clip when at least one of the multiple media clips in the compound clip is assigned the particular role.

10. The non-transitory machine readable medium of claim 1, wherein the UI further comprises a timeline search tool for searching for media clips in the composite presentation based on names of the media clips or keywords associated with one or more of the media clips.

11. The non-transitory machine readable medium of claim 10, wherein the timeline focus tool is provided as part of the timeline search tool.

12. For a media-editing application, a method of editing a composite presentation, the method comprising:
- displaying, in a timeline, a representation of the composite presentation comprising a plurality of media clips, each media clip assigned a set of one or more roles from a plurality of different roles;
- displaying selectable items representing the plurality of different roles;
- receiving a selection of a particular selectable item representing a particular role; and
- changing, in response to the selection, an appearance of each media clip that is assigned the particular role from a first appearance to a second different appearance in the timeline.

13. The method of claim 12, wherein displaying the representation of the composite presentation comprises displaying a representation of each media clip, wherein changing the appearance of each media clip comprises minimizing or highlighting the representation of the media clip in the timeline.

14. The method of claim 12 further comprising disabling, in response to the selection, each media clip assigned the particular role.

15. The method of claim 14 further comprising:
- receiving an input to play a preview of the composite presentation; and
- playing the preview by playing back only each media clip in the composite presentation that is not disabled.

16. A method of defining a media-editing application comprising a user interface (UI), the method comprising:
- defining a timeline for displaying a representation of a composite presentation comprising a plurality of media clips, each media clip assigned a set of one or more roles from a plurality of different roles; and
- defining a timeline focus tool for displaying selectable items representing the plurality of different roles, wherein a selection of a particular selectable item representing a particular role changes an appearance of each media clip that is assigned the particular role from a first appearance to a second different appearance in the timeline.

17. The method of claim 16, wherein the timeline displays the representation of the composite presentation by displaying a representation of each media clip, wherein the selection of the particular selectable item changes the appearance of each media clip by minimizing or highlighting the representation of the media clip in the timeline.

18. The method of claim 16, wherein the selection of the particular selectable item further causes each media clip that is assigned the particular role to be disabled during a playback of the composite presentation.

* * * * *